(12) United States Patent
Ichimura

(10) Patent No.: US 12,093,786 B2
(45) Date of Patent: Sep. 17, 2024

(54) INFORMATION PROCESSING DEVICE AND INFORMATION PROCESSING METHOD

(71) Applicant: KABUSHIKI KAISHA TOSHIBA, Tokyo (JP)

(72) Inventor: Kouichi Ichimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 17/446,450

(22) Filed: Aug. 30, 2021

(65) Prior Publication Data

US 2022/0253738 A1 Aug. 11, 2022

(30) Foreign Application Priority Data

Feb. 1, 2021 (JP) .................................. 2021-014180

(51) Int. Cl.
*G06N 10/40* (2022.01)
*G02F 3/00* (2006.01)
*G06F 15/80* (2006.01)
*G06N 10/00* (2022.01)

(52) U.S. Cl.
CPC ............. *G06N 10/40* (2022.01); *G06F 15/80* (2013.01); *G06N 10/00* (2019.01); *G02F 3/00* (2013.01)

(58) Field of Classification Search
None
See application file for complete search history.

(56) References Cited

U.S. PATENT DOCUMENTS

| 6,800,837 B1 | 10/2004 | Ichimura et al. |
| 2019/0089115 A1 | 3/2019 | Ichimura |
| 2019/0089155 A1 | 3/2019 | Cui et al. |

(Continued)

FOREIGN PATENT DOCUMENTS

| JP | 2001-209083 A | 8/2001 |
| JP | 2019-56752 A | 4/2019 |

OTHER PUBLICATIONS

N.Y. Yao et al., "Scalable architecture for a room temperature solid-state quantum information processor," Nature Communications, vol. 3, Art. 800, 8 pages (2012).

(Continued)

*Primary Examiner* — Robert E. Tallman
(74) *Attorney, Agent, or Firm* — Finnegan, Henderson, Farabow, Garrett & Dunner, LLP

(57) ABSTRACT

According to one embodiment, an information processing device includes a qubit pair structure body including a plurality of qubit pairs. The qubit pairs are arranged in m rows and n columns. The qubit pairs include first, and second qubit pairs, and first to sixth adjacent qubit pairs. The qubit pair structure body includes first to eighth spin chains. The first and fifth spin chains include a first eigenenergy, and not include the second, third, and fourth eigenenergies. The second and sixth spin chains include a second eigenenergy, and not include the first, third, and fourth eigenenergies. The third and seventh spin chains include a third eigenenergy, and not include the first, second, and fourth eigenenergies. The fourth spin chain and the eighth spin chain include a fourth eigenenergy, not include the first, second, and third eigenenergies. The first to fourth eigenenergies are different from each other.

13 Claims, 22 Drawing Sheets

(56) References Cited

U.S. PATENT DOCUMENTS

2021/0255856 A1* 8/2021 Cao .................. G06F 9/3001
2021/0279631 A1* 9/2021 Pichler .............. G06N 10/60
2021/0383189 A1* 12/2021 Cong ................ G06N 3/045

OTHER PUBLICATIONS

Wayne M. Itano et al., "Quantum Zeno Effect," Physical Review, vol. 41, No. 5, pp. 2295-2300 (1990).

* cited by examiner

————————  $(|+1_e\rangle, |+1/2_n\rangle)$
————————  $(|+1_e\rangle, |-1/2_n\rangle)$ ————————  $(|0_e\rangle, |+1/2_n\rangle)$
————————  $(|0_e\rangle, |-1/2_n\rangle)$ ————————  $(|-1_e\rangle, |-1/2_n\rangle)$
————————  $(|-1_e\rangle, |+1/2_n\rangle)$

| Z | I | \|g⟩ | $C_D NOT_Z$ | $C_D NOT_Z$ | $C_D NOT_Z$ | $C_D NOT_Z$ | M | I |
| X | \|g⟩ | H | $C_X NOT_D$ | $C_X NOT_D$ | $C_X NOT_D$ | $C_X NOT_D$ | H | M |

INFORMATION PROCESSING DEVICE AND INFORMATION PROCESSING METHOD

CROSS-REFERENCE TO RELATED APPLICATIONS

This application is based upon and claims the benefit of priority from Japanese Patent Application No. 2021-014180, filed on Feb. 1, 2021; the entire contents of which are incorporated herein by reference.

FIELD

Embodiments described herein relate generally to an information processing device and an information processing method.

BACKGROUND

For example, it is desirable to increase the processing efficiency of an information processing device.

DETAILED DESCRIPTION

Figure 1:
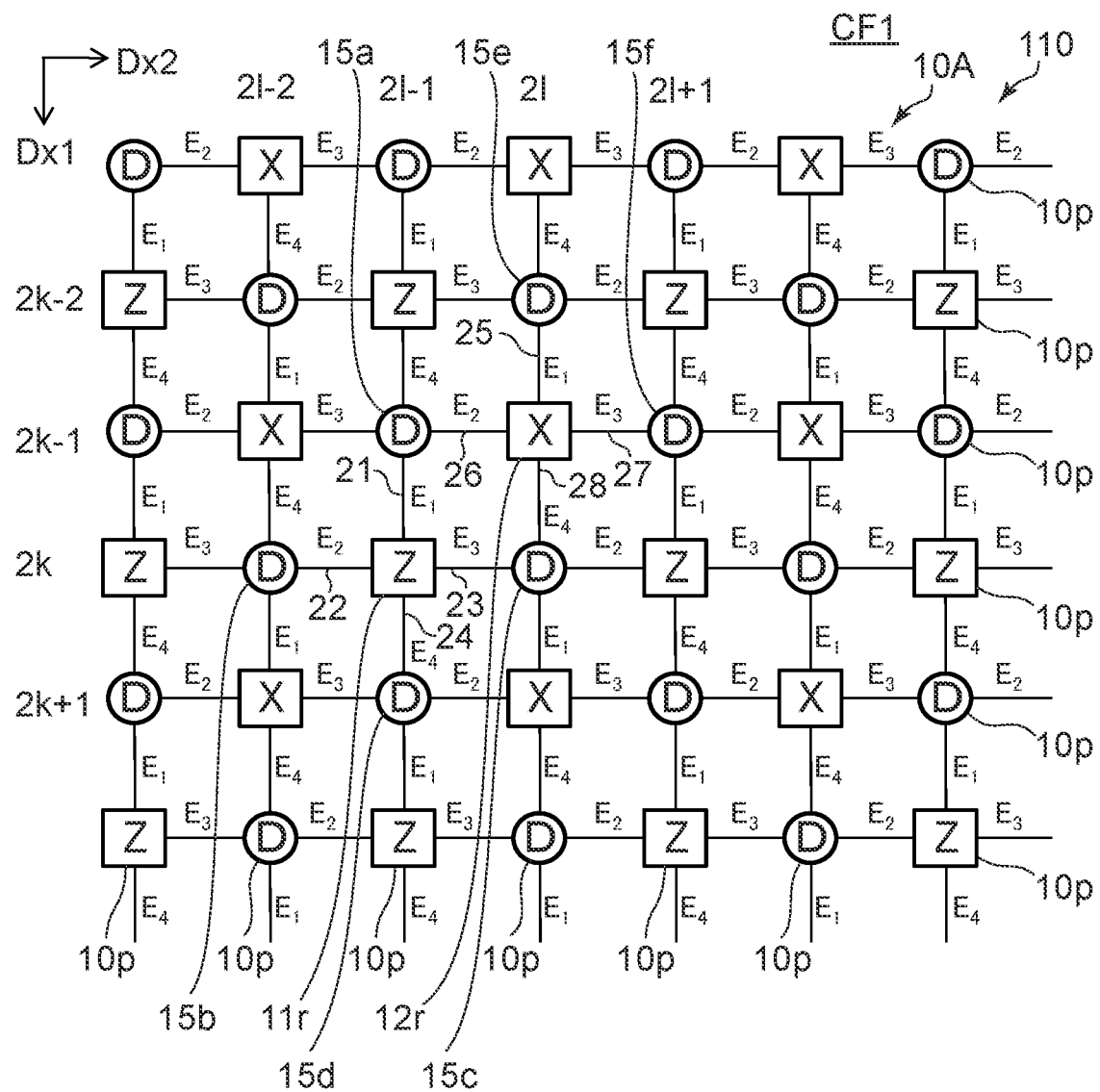
FIG. 1 is a schematic view illustrating an information processing device according to a first embodiment.

According to one embodiment, an information processing device includes a qubit pair structure body including a plurality of qubit pairs. The qubit pairs are arranged in m rows and n columns (m being an integer not less than 3, and n being an integer not less than 3). The qubit pairs include a first qubit pair at a $2k$th row and a $(2l-1)$th column, a second qubit pair at a $(2k-1)$th row and a $2l$th column, a first adjacent qubit pair at a $(2k-1)$th row and a $(2l-1)$th column, a second adjacent qubit pair at a $2k$th row and a $(2l-2)$th column, a third adjacent qubit pair at a $2k$th row and a $2l$th column, a fourth adjacent qubit pair at a $(2k+1)$th row and a $(2l-1)$th column, a fifth adjacent qubit pair at a $(2k-2)$th row and a $2l$th column, and a sixth adjacent qubit pair at a $(2k-1)$th row and a $(2l+1)$th column. $k$ is an integer not less than 1 and not more than a maximum integer not greater than $m/2$. $l$ is an integer not less than 1 and not more than a maximum integer not greater than $n/2$. The qubit pair structure body includes a first spin chain between the first qubit pair and the first adjacent qubit pair, a second spin chain between the first qubit pair and the second adjacent qubit pair, a third spin chain between the first qubit pair and the third adjacent qubit pair, a fourth spin chain between the first qubit pair and the fourth adjacent qubit pair, a fifth spin chain between the second qubit pair and the fifth adjacent qubit pair, a sixth spin chain between the second qubit pair and the first adjacent qubit pair, a seventh spin chain between the second qubit pair and the sixth adjacent qubit pair, and an eighth spin chain between the second qubit pair and the third adjacent qubit pair. The first spin chain and the fifth spin chain include a first eigenenergy. The second spin chain and the sixth spin chain include a second eigenenergy. The third spin chain and the seventh spin chain include a third eigenenergy. The fourth spin chain and the eighth spin chain include a fourth eigenenergy. The first eigenenergy, the second eigenenergy, the third eigenenergy, and the fourth eigenenergy are different from each other. The first spin chain and the fifth spin chain do not include the second, third, and fourth eigenenergies. The second spin chain and the sixth spin chain do not include the first, third, and fourth eigenenergies. The third spin chain and the seventh spin chain do not include the first, second, and fourth eigenenergies. The fourth spin chain and the eighth spin chain do not include the first, second, and third eigenenergies.

According to one embodiment, an information processing device include a qubit pair structure body including a plurality of qubit pairs. The qubit pairs are arranged in m rows and n columns (m being an integer not less than 3, and n being an integer not less than 3). The qubit pairs include a first qubit pair at a 2kth row and a (2l–1)th column, a second qubit pair at a (2k–1)th row and a 2lth column, a first adjacent qubit pair at a (2k–1)th row and a (2l–1)th column, a second adjacent qubit pair at a 2kth row and a (2l–2)th column, a third adjacent qubit pair at a 2kth row and a 2lth column, a fourth adjacent qubit pair at a (2k+1)th row and a (2l–1)th column, a fifth adjacent qubit pair at a (2k–2)th row and a 2lth column, and a sixth adjacent qubit pair at a (2k–1)th row and a (2l+1)th column. k is an integer not less than 1 and not more than a maximum integer not greater than m/2. l is an integer not less than 1 and not more than a maximum integer not greater than n/2. A distance between the first qubit pair and the first adjacent qubit pair and a distance between the second qubit pair and the fifth adjacent qubit pair are a first distance. A distance between the first qubit pair and the second adjacent qubit pair and a distance between the second qubit pair and the first adjacent qubit pair are a second distance. A distance between the first qubit pair and the third adjacent qubit pair and a distance between the second qubit pair and the sixth adjacent qubit pair are a third distance. A distance between the first qubit pair and the fourth adjacent qubit pair and a distance between the second qubit pair and the third adjacent qubit pair are a fourth distance. The first distance, the second distance, the third distance, and the fourth distance are different from each other.

According to one embodiment, an information processing device includes a qubit pair structure body including a plurality of qubit pairs. The qubit pairs are arranged in m rows and n columns (m being an integer not less than 3, and n being an integer not less than 3). The qubit pairs include a first qubit pair at a 2kth row and a (2l–1)th column, a second qubit pair at a (2k–1)th row and a 2lth column, a first adjacent qubit pair at a (2k–1)th row and a (2l–1)th column, a second adjacent qubit pair at a 2kth row and a (2l–2)th column, a third adjacent qubit pair at a 2kth row and a 2lth column, a fourth adjacent qubit pair at a (2k+1)th row and a (2l–1)th column, a fifth adjacent qubit pair at a (2k–2)th row and a 2lth column, and a sixth adjacent qubit pair at a (2k–1)th row and a (2l+1)th column. k is an integer not less than 1 and not more than a maximum integer not greater than m/2. l is an integer not less than 1 and not more than a maximum integer not greater than n/2. The first qubit pair includes a first structure body that includes at least one of a first element or a first isotope. The second qubit pair includes a second structure body that includes at least one of a second element or a second isotope. The first adjacent qubit pair, the second adjacent qubit pair, the third adjacent qubit pair, the fourth adjacent qubit pair, the fifth adjacent qubit pair, and the sixth adjacent qubit pair include a third structure body that includes at least one of a third element or a third isotope. The first structure body is different from the third structure body. The first structure body is different from the second structure body. The second structure body is different from the third structure body.

According to one embodiment, an information processing device includes a qubit pair structure body including a plurality of qubit pairs. The qubit pairs are arranged in m rows and n columns (m being an integer not less than 3, and n being an integer not less than 3). The qubit pairs include a first qubit pair at a 2kth row and a (2l–1)th column, a second qubit pair at a (2k–1)th row and a 2lth column, a first adjacent qubit pair at a (2k–1)th row and a (2l–1)th column, a second adjacent qubit pair at a 2kth row and a (2l–2)th column, a third adjacent qubit pair at a 2kth row and a 2lth column, a fourth adjacent qubit pair at a (2k+1)th row and a (2l–1)th column, a fifth adjacent qubit pair at a (2k–2)th row and a 2lth column, and a sixth adjacent qubit pair at a (2k–1)th row and a (2l+1)th column. k is an integer not less than 1 and not more than a maximum integer not greater than m/2. l is an integer not less than 1 and not more than a maximum integer not greater than n/2. The qubit pair structure body includes a first spin chain between the first qubit pair and the first adjacent qubit pair, a second spin chain between the first qubit pair and the second adjacent qubit pair, a third spin chain between the first qubit pair and the third adjacent qubit pair, a fourth spin chain between the first qubit pair and the fourth adjacent qubit pair, a fifth spin chain between the second qubit pair and the fifth adjacent qubit pair, a sixth spin chain between the second qubit pair and the first adjacent qubit pair, a seventh spin chain between the second qubit pair and the sixth adjacent qubit pair, and an eighth spin chain between the second qubit pair and the third adjacent qubit pair. The first spin chain and the eighth spin chain include a first eigenenergy. The second spin chain and the seventh spin chain include a second eigenenergy. The fourth spin chain and the fifth spin chain include a third eigenenergy. The third spin chain and the sixth spin chain include a fourth eigenenergy. The first eigenenergy, the second eigenenergy, the third eigenenergy, and the fourth eigenenergy are different from each other. The first spin chain and the eighth spin chain do not include the second, third, and fourth eigenenergies. The second spin chain and the seventh spin chain do not include the first, third, and fourth eigenenergies. The fourth spin chain and the fifth spin chain do not include the first, second, and fourth eigenenergies. The third spin chain and the sixth spin chain do not include the first, second, and third eigenenergies.

According to one embodiment, an information processing device includes a qubit pair structure body including a plurality of qubit pairs. The qubit pairs are arranged in m rows and n columns (m being an integer not less than 3, and n being an integer not less than 3). The qubit pairs include a first qubit pair at a 2kth row and a (2l–1)th column, a second qubit pair at a (2k–1)th row and a 2lth column, a first adjacent qubit pair at a (2k–1)th row and a (2l–1)th column, a second adjacent qubit pair at a 2kth row and a (2l–2)th column, a third adjacent qubit pair at a 2kth row and a 2lth column, a fourth adjacent qubit pair at a (2k+1)th row and a (2l–1)th column, a fifth adjacent qubit pair at a (2k–2)th row and a 2lth column, and a sixth adjacent qubit pair at a (2k–1)th row and a (2l+1)th column. k being an integer not less than 1 and not more than a maximum integer not greater than m/2. l is an integer not less than 1 and not more than a maximum integer not greater than n/2. A distance between the first qubit pair and the first adjacent qubit pair and a distance between the second qubit pair and the third adjacent qubit pair are a first distance. A distance between the first qubit pair and the second adjacent qubit pair and a distance between the second qubit pair and the sixth adjacent qubit pair are a second distance. A distance between the first qubit pair and the fourth adjacent qubit pair and a distance between the second qubit pair and the fifth adjacent qubit pair are a third distance. A distance between the first qubit pair and the third adjacent qubit pair and a distance between the second qubit pair and the first adjacent qubit pair are a fourth distance. The first distance, the second distance, the third distance, and the fourth distance are different from each other.

According to one embodiment, an information processing device includes a qubit pair structure body including a plurality of qubit pairs. The qubit pairs are arranged in m rows and n columns (m being an integer not less than 3, and n being an integer not less than 3). The qubit pairs include a first qubit pair at a 2kth row and a (2l−1)th column, a second qubit pair at a (2k−1)th row and a 2lth column, a first adjacent qubit pair at a (2k−1)th row and a (2l−1)th column, a second adjacent qubit pair at a 2kth row and a (2l−2)th column, a third adjacent qubit pair at a 2kth row and a 2lth column, a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column. k is an integer not less than 1 and not more than a maximum integer not greater than m/2. l is an integer not less than 1 and not more than a maximum integer not greater than n/2. The first qubit pair includes a first structure body that includes at least one of a first element or a first isotope. The second qubit pair includes a second structure body that includes at least one of a second element or a second isotope. The first adjacent qubit pair, the second adjacent qubit pair, the third adjacent qubit pair, the fourth adjacent qubit pair, the fifth adjacent qubit pair, and the sixth adjacent qubit pair include a third structure body that includes at least one of a third element or a third isotope. The first structure body is different from the third structure body. The first structure body is different from the second structure body. The second structure body is different from the third structure body.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in reference to a drawing thereinabove are marked with like reference numerals, and a detailed description is omitted as appropriate.

First Embodiment

FIG. 1 is a schematic view illustrating an information processing device according to a first embodiment.

As shown in FIG. 1, the information processing device 110 according to the embodiment includes a qubit pair structure body 10A. In the example of FIG. 1, the qubit pair structure body 10A includes a first configuration CF1.

The qubit pair structure body 10A includes multiple qubit pairs 10p. The multiple qubit pairs 10p are arranged in m rows and n columns. "m" is an integer that is not less than 3. "n" is an integer that is not less than 3. For example, the multiple qubit pairs 10p are arranged along a first-axis direction Dx1 and a second-axis direction Dx2. The second-axis direction Dx2 crosses the first-axis direction Dx1.

In FIG. 1, the multiple qubit pairs 10p are labeled by the characters "Z", "X", or "D". The characters "Z", "X", or "D" may correspond to the function of the processing performed by the information processing device 110. Examples of the functions are described below.

The quantum states that are provided in the multiple qubit pairs 10p can correspond to qubits used in information processing. Examples of the multiple qubit pairs 10p are described below.

The multiple qubit pairs 10p include a first qubit pair 11r at the 2kth row and the (2l−1)th column, a second qubit pair 12r at the (2k−1)th row and the 2lth column, a first adjacent qubit pair 15a at the (2k−1)th row and the (2l−1)th column, a second adjacent qubit pair 15b at the 2kth row and the (2l−2)th column, a third adjacent qubit pair 15c at the 2kth row and the 2lth column, a fourth adjacent qubit pair 15d at the (2k+1)th row and the (2l−1)th column, a fifth adjacent qubit pair 15e at the (2k−2)th row and the 2lth column, and a sixth adjacent qubit pair 15f at the (2k−1)th row and the (2l+1)th column. "k" is an integer that is not less than 1 and not more than the maximum integer not greater than m/2. "l" is an integer that is not less than 1 and not more than the maximum integer not greater than n/2.

The qubit pair structure body 10A includes first to eighth spin chains 21 to 28. The first to eighth spin chains 21 to 28 include, for example, columns that include multiple electron spins. Examples of these spin chains are described below.

The first spin chain 21 is located between the first qubit pair 11r and the first adjacent qubit pair 15a.

The second spin chain 22 is located between the first qubit pair 11r and the second adjacent qubit pair 15b.

The third spin chain 23 is located between the first qubit pair 11r and the third adjacent qubit pair 15c.

The fourth spin chain 24 is located between the first qubit pair 11r and the fourth adjacent qubit pair 15d.

The fifth spin chain 25 is located between the second qubit pair 12r and the fifth adjacent qubit pair 15e.

The sixth spin chain 26 is located between the second qubit pair 12r and the first adjacent qubit pair 15a.

The seventh spin chain 27 is located between the second qubit pair 12r and the sixth adjacent qubit pair 15f.

The eighth spin chain 28 is located between the second qubit pair 12r and the third adjacent qubit pair 15c.

The first spin chain 21 and the fifth spin chain 25 include a first eigenenergy $E_1$. The first spin chain 21 and the fifth spin chain 25 may include multiple energies. The first eigenenergy $E_1$ may be one of the multiple energies.

The second spin chain 22 and the sixth spin chain 26 include a second eigenenergy $E_2$. The second spin chain 22 and the sixth spin chain 26 may include multiple energies. The second eigenenergy $E_2$ may be one of the multiple energies.

The third spin chain 23 and the seventh spin chain 27 include a third eigenenergy $E_3$. The third spin chain 23 and the seventh spin chain 27 may include multiple energies. The third eigenenergy $E_3$ may be one of the multiple energies.

The fourth spin chain 24 and the eighth spin chain 28 include a fourth eigenenergy $E_4$. The fourth spin chain 24 and the eighth spin chain 28 may include multiple energies. The fourth eigenenergy $E_4$ may be one of the multiple energies.

The first to fourth eigenenergies $E_1$ to $E_4$ are, for example, fermion mode eigenenergies. The first eigenenergy $E_1$, the second eigenenergy $E_2$, the third eigenenergy $E_3$, and the fourth eigenenergy $E_4$ are different from each other. For example, the first eigenenergy $E_1$ is different from the second eigenenergy $E_2$, different from the third eigenenergy $E_3$, and different from the fourth eigenenergy $E_4$. For example, the second eigenenergy $E_2$ is different from the third eigenenergy $E_3$ and different from the fourth eigenenergy $E_4$. For example, the third eigenenergy $E_3$ is different from the fourth eigenenergy $E_4$.

The first spin chain 21 and the fifth spin chain 25 do not include the second eigenenergy $E_2$, the third eigenenergy $E_3$, and the fourth eigenenergy $E_4$.

The second spin chain 22 and the sixth spin chain 26 do not include the first eigenenergy $E_1$, the third eigenenergy $E_3$, and the fourth eigenenergy $E_4$.

The third spin chain 23 and the seventh spin chain 27 do not include the first eigenenergy $E_1$, the second eigenenergy $E_2$, and the fourth eigenenergy $E_4$.

The fourth spin chain 24 and the eighth spin chain 28 do not include the first eigenenergy $E_1$, the second eigenenergy $E_2$, and the third eigenenergy $E_3$.

For example, a qubit gate operation can be performed efficiently by the qubit pair structure body 10A that includes such spin chains. For example, by using different energies, the resonance of the qubit operations can be selectively performed efficiently at the desired positions. Thereby, an information processing device can be provided in which the processing efficiency can be increased. Examples of the qubit gate operations are described below.

In the example as shown in FIG. 1, the second qubit pair 12r is adjacent to the first qubit pair 11r in a direction that is oblique to the first-axis direction Dx1 and the second-axis direction Dx2. According to the embodiment, the second qubit pair 12r may not be adjacent to the first qubit pair 11r in a direction that is oblique to the first-axis direction Dx1 and the second-axis direction Dx2.

For example, when the first qubit pair 11r corresponds to the qubit pair 10p at the 2kth row and the (2l−1)th column, the second qubit pair 12r may correspond to the qubit pair 10p at the (2i−1)th row and the 2jth column. "i" is an integer that is not less than 1 and not more than the maximum integer not greater than m/2. "j" is an integer that is not less than 1 and not more than the maximum integer not greater than n/2. In such a case, the multiple qubit pairs 10p may include fifth to eighth adjacent qubit pairs in addition to the first to fourth adjacent qubit pairs 15a to 15d described above. In such a case, the fifth adjacent qubit pair corresponds to the qubit pair 10p at the (2i−2)th row and the 2jth column. The sixth adjacent qubit pair corresponds to the qubit pair 10p at the (2i−1)th row and the (2j−1)th column. The seventh adjacent qubit pair corresponds to the qubit pair 10p at the (2i−1) row and the (2j+1)th column. The eighth adjacent qubit pair corresponds to the qubit pair 10p at the 2ith row and the 2jth column. The fifth to eighth spin chains 25 to 28 described above may be set between the second qubit pair 12r and such fifth to eighth adjacent qubit pairs. The fifth to eighth spin chains 25 to 28 may include the first to fourth eigenenergies $E_1$ to $E_4$ described above.

The relationship of the first configuration CF1 relating to the combination of the first qubit pair 11r at the 2kth row and the (2l−1)th column and the second qubit pair 12r at the (2k−1)th row and the 2lth column in the description described above may hold for all integers that are not less than 1 and not more than the maximum integer not greater than m/2 and all integers that are not less than 1 and not more than the maximum integer not greater than n/2.

In the first configuration CF1, the differences between the first to fourth eigenenergies $E_1$ to $E_4$ may be formed by the distance differences between the multiple qubit pairs 10p.

Figure 2:
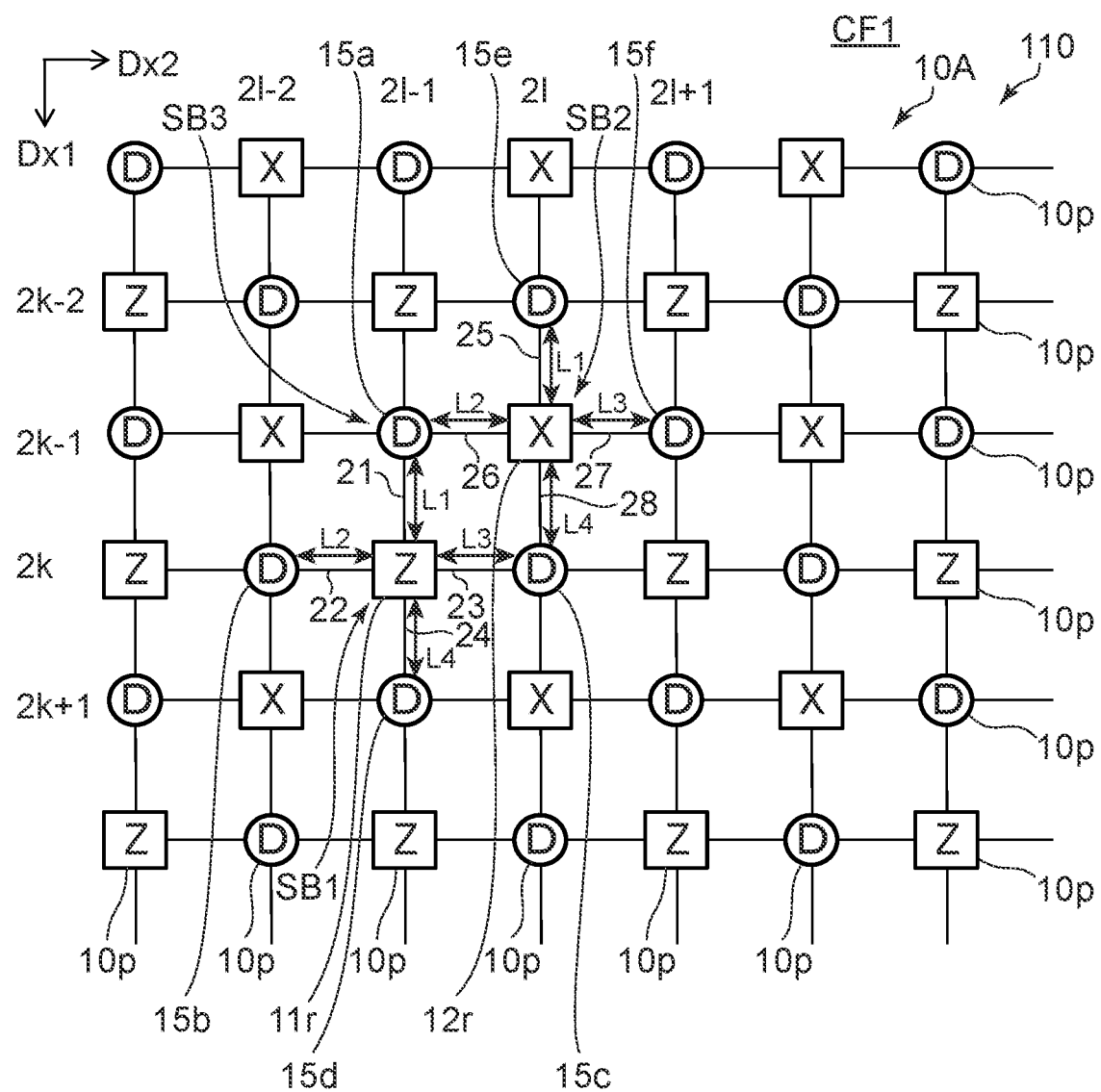
FIG. 2 is a schematic view illustrating the information processing device according to the first embodiment.

FIG. 2 is a schematic view illustrating the information processing device according to the first embodiment.

As shown in FIG. 2, the information processing device 110 includes the first qubit pair 11r, the second qubit pair 12r, and the first to sixth adjacent qubit pairs 15a to 15f described above.

The distance between the first qubit pair 11r and the first adjacent qubit pair 15a and the distance between the second qubit pair 12r and the fifth adjacent qubit pair 15e are taken as a first distance L1.

The distance between the first qubit pair 11r and the second adjacent qubit pair 15b and the distance between the second qubit pair 12r and the first adjacent qubit pair 15a are taken as a second distance L2. The distance between the first qubit pair 11r and the third adjacent qubit pair 15c and the distance between the second qubit pair 12r and the sixth adjacent qubit pair 15f are taken as a third distance L3.

The distance between the first qubit pair 11r and the fourth adjacent qubit pair 15d and the distance between the second qubit pair 12r and the third adjacent qubit pair 15c are taken as a fourth distance L4.

For example, the first distance L1, the second distance L2, the third distance L3, and the fourth distance L4 are different from each other. For example, the first distance L1 is different from the second distance L2, different from the third distance L3, and different from the fourth distance L4. The second distance L2 is different from the third distance L3 and different from the fourth distance L4. The third distance L3 is different from the fourth distance L4. The eigenenergy differences may be generated by such distance differences.

For example, the first qubit pair 11r includes a first structure body SB1. The first structure body SB1 includes at least one of a first element or a first isotope. The second qubit pair 12r includes a second structure body SB2. The second structure body SB2 includes at least one of a second element or a second isotope. The first adjacent qubit pair 15a, the second adjacent qubit pair 15b, the third adjacent qubit pair 15c, the fourth adjacent qubit pair 15d, the fifth adjacent qubit pair 15e, and the sixth adjacent qubit pair 15f include a third structure body SB3. The third structure body SB3 includes at least one of a third element or a third isotope. The first structure body SB1 is different from the third structure body SB3. The first structure body SB1 is different from the second structure body SB2. The second structure body SB2 is different from the third structure body SB3. As described below, the energy (transition energy) differences of the quantum states of broker qubits may be generated by such multiple qubit pairs 10p.

In the information processing device according to the embodiment, the qubit pair structure body 10A may include the following second configuration.

Figure 3:
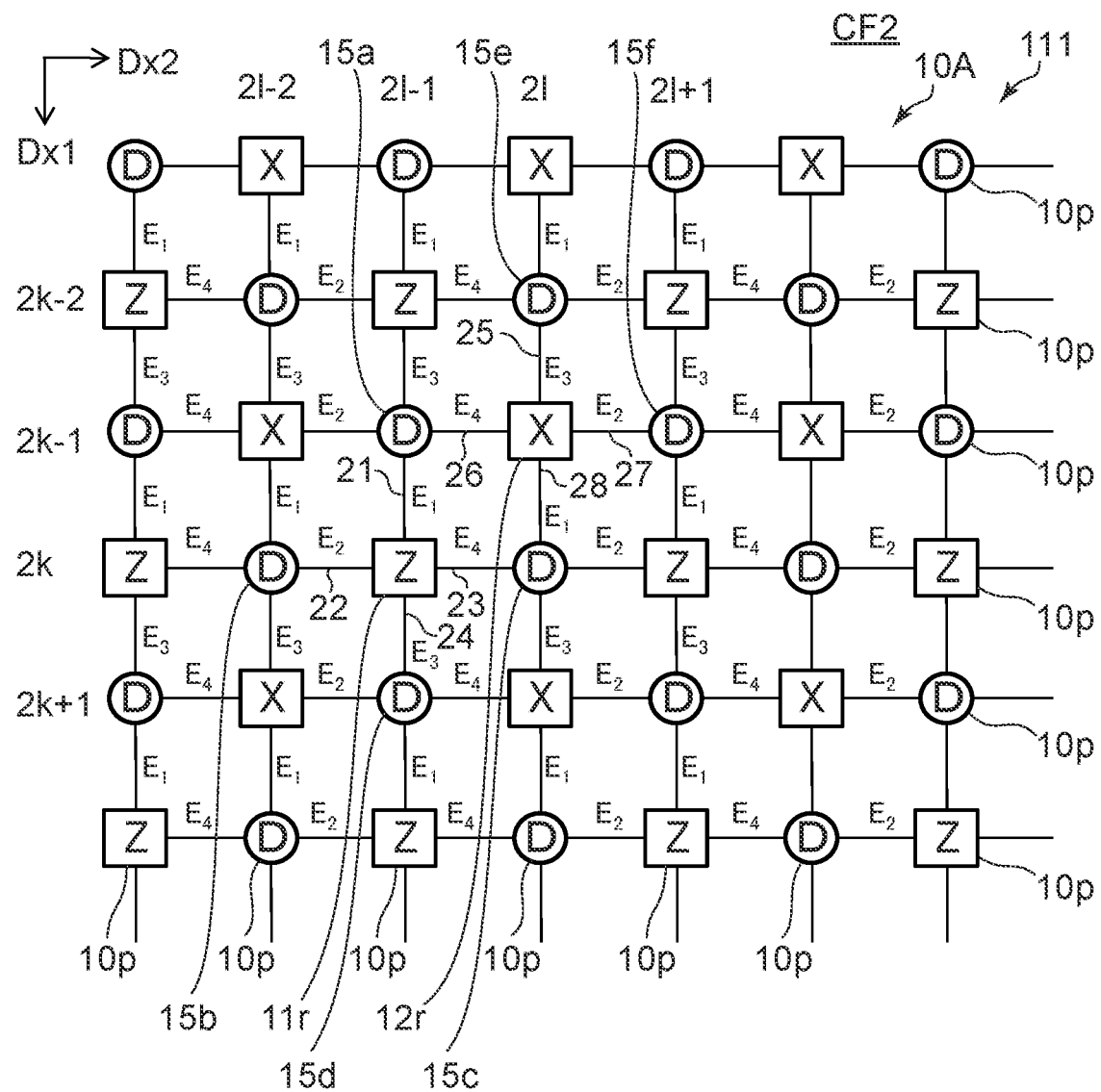
FIG. 3 is a schematic view illustrating an information processing device according to the first embodiment.

FIG. 3 is a schematic view illustrating an information processing device according to the first embodiment.

In the information processing device 111 according to the embodiment as shown in FIG. 3, the qubit pair structure body 10A may include the second configuration CF2. In the second configuration CF2 as well, the qubit pair structure body 10A includes the multiple qubit pairs 10p. The multiple qubit pairs 10p are arranged in m rows and n columns. "m" is an integer that is not less than 3. "n" is an integer that is not less than 3.

The multiple qubit pairs 10p includes the first qubit pair 11r at the 2kth row and the (2l−1)th column, the second qubit pair 12r at the (2k−1)th row and the 2lth column, the first adjacent qubit pair 15a at the (2k−1)th row and the (2l−1)th column, the second adjacent qubit pair 15b at the 2kth row and the (2l−2)th column, the third adjacent qubit pair 15c at the 2kth row and the 2lth column, the fourth adjacent qubit pair 15d at the (2k+1)th row and the (2l−1)th column, the fifth adjacent qubit pair 15e at the (2k−2)th row and the 2lth column, and the sixth adjacent qubit pair 15f at the (2k−1)th row and the (2l+1)th column. "k" is an integer that is not less than 1 and not more than the maximum integer not greater than m/2. "l" is an integer that is not less than 1 and not more than the maximum integer not greater than n/2.

The qubit pair structure body 10A includes the first spin chain 21 between the first qubit pair 11r and the first adjacent qubit pair 15a, the second spin chain 22 between the first qubit pair 11r and the second adjacent qubit pair 15b, the third spin chain 23 between the first qubit pair 11r and the third adjacent qubit pair 15c, the fourth spin chain 24 between the first qubit pair 11r and the fourth adjacent qubit pair 15d, the fifth spin chain 25 between the second qubit pair 12r and the fifth adjacent qubit pair 15e, the sixth spin chain 26 between the second qubit pair 12r and the first adjacent qubit pair 15a, the seventh spin chain 27 between the second qubit pair 12r and the sixth adjacent qubit pair 15f, and the eighth spin chain 28 between the second qubit pair 12r and the third adjacent qubit pair 15c.

The first spin chain 21 and the eighth spin chain 28 include the first eigenenergy $E_1$.

The second spin chain 22 and the seventh spin chain 27 include the second eigenenergy $E_2$.

The fourth spin chain 24 and the fifth spin chain 25 include the third eigenenergy $E_3$.

The third spin chain 23 and the sixth spin chain 26 include the fourth eigenenergy $E_4$.

The first eigenenergy $E_1$, the second eigenenergy $E_2$, the third eigenenergy $E_3$, and the fourth eigenenergy $E_4$ are different from each other.

The first spin chain 21 and the eighth spin chain 28 do not include the second eigenenergy $E_2$, the third eigenenergy $E_3$, and the fourth eigenenergy $E_4$.

The second spin chain 22 and the seventh spin chain 27 do not include the first eigenenergy $E_1$, the third eigenenergy $E_3$, and the fourth eigenenergy $E_4$.

The third spin chain 23 and the sixth spin chain 26 do not include the first eigenenergy $E_1$, the second eigenenergy $E_2$, and the third eigenenergy $E_3$.

The fourth spin chain 24 and the fifth spin chain 25 do not include the first eigenenergy $E_1$, the second eigenenergy $E_2$, and the fourth eigenenergy $E_4$.

For example, two-qubit gate operations can be performed efficiently by the qubit pair structure body 10A that includes such spin chains.

In the example as shown in FIG. 3, the second qubit pair 12r is adjacent to the first qubit pair 11r in a direction that is oblique to the first-axis direction Dx1 and the second-axis direction Dx2. According to the embodiment, the second qubit pair 12r may not be adjacent to the first qubit pair 11r in a direction that is oblique to the first-axis direction Dx1 and the second-axis direction Dx2.

The relationship of the second configuration CF2 relating to the combination of the first qubit pair 11r at the 2kth row and the (2l−1)th column and the second qubit pair 12r at the (2k−1)th row and the 2lth column in the description described above may hold for all integers that are not less than 1 and not more than the maximum integer not greater than m/2 and all integers that are not less than 1 and not more than the maximum integer not greater than n/2.

In the second configuration CF2, the differences between the first to fourth eigenenergies $E_1$ to $E_4$ may be formed by the distance differences between the multiple qubit pairs 10p.

Figure 4:
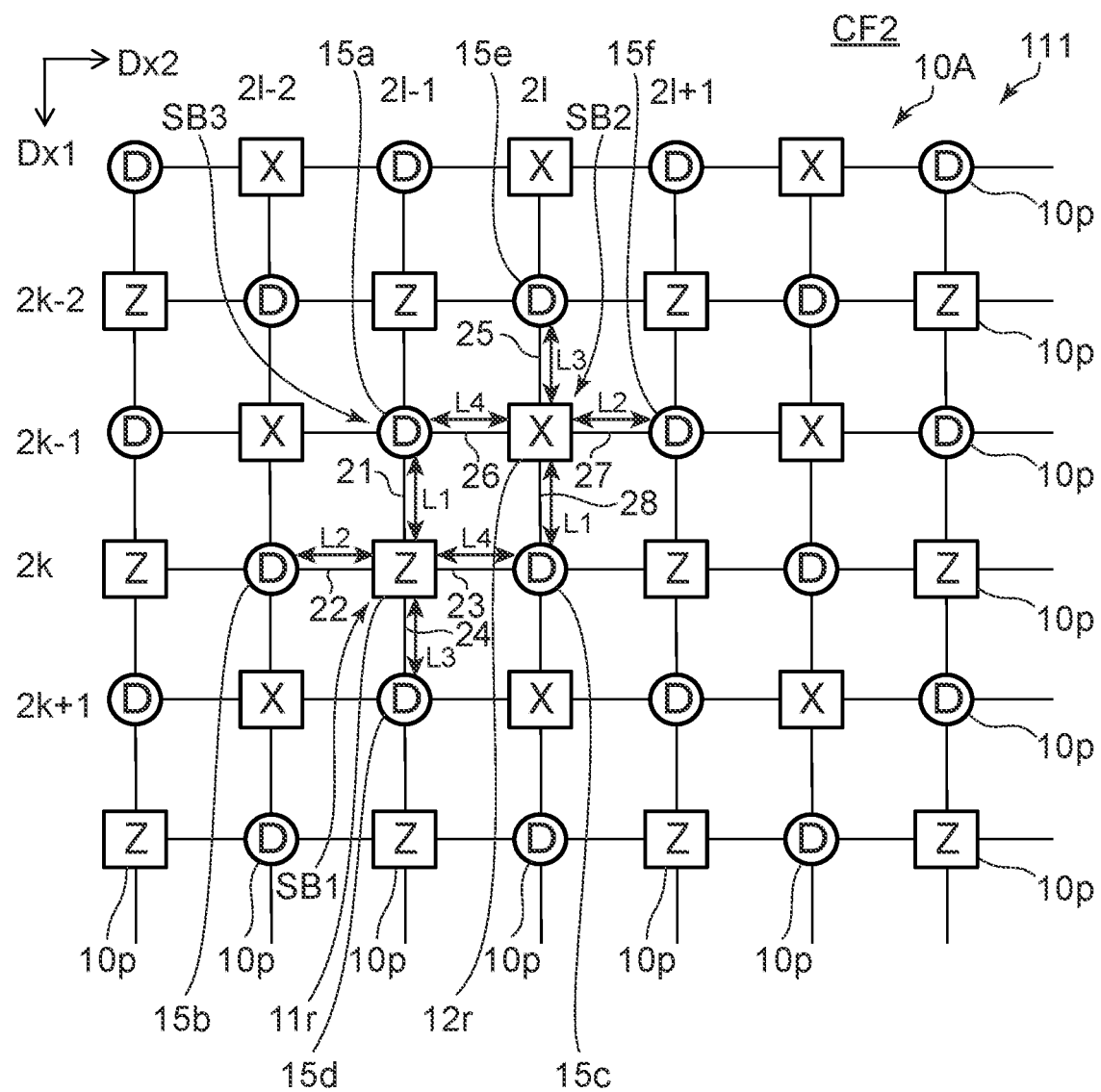
FIG. 4 is a schematic view illustrating the information processing device according to the first embodiment.

FIG. 4 is a schematic view illustrating the information processing device according to the first embodiment.

As shown in FIG. 4, the information processing device 111 includes the first qubit pair 11r, the second qubit pair 12r, and the first to sixth adjacent qubit pairs 15a to 15f described above.

The distance between the first qubit pair 11r and the first adjacent qubit pair 15a and the distance between the second qubit pair 12r and the third adjacent qubit pair 15c are the first distance L1.

The distance between the first qubit pair 11r and the second adjacent qubit pair 15b and the distance between the second qubit pair 12r and the sixth adjacent qubit pair 15f are the second distance L2.

The distance between the first qubit pair 11r and the third adjacent qubit pair 15c and the distance between the second qubit pair 12r and the first adjacent qubit pair 15a are the fourth distance L4.

The distance between the first qubit pair 11r and the fourth adjacent qubit pair 15d and the distance between the second qubit pair 12r and the fifth adjacent qubit pair 15e are the third distance L3.

The first distance L1, the second distance L2, the third distance L3, and the fourth distance L4 are different from each other. The eigenenergy differences may be generated by such distance differences.

For example, the first qubit pair 11r includes the first structure body SB1 that includes at least one of the first element or the first isotope. The second qubit pair 12r includes the second structure body SB2 that includes at least one of the second element or the second isotope. The first adjacent qubit pair 15a, the second adjacent qubit pair 15b, the third adjacent qubit pair 15c, the fourth adjacent qubit pair 15d, the fifth adjacent qubit pair 15e, and the sixth adjacent qubit pair 15f include the third structure body SB3 that includes at least one of the third element or the third isotope. The first structure body SB1 is different from the third structure body SB3. The first structure body SB1 is different from the second structure body SB2. The second structure body SB2 is different from the third structure body SB3. As described below, the energy (transition energy) differences of the quantum states of the broker qubits may be generated by such multiple qubit pairs 10p.

Examples of the qubit pairs 10p will now be described.

Figures 5A, 5B:
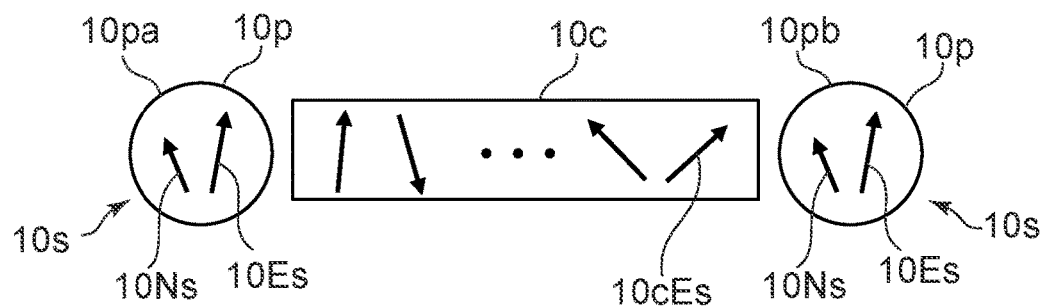
FIGS. 5A and 5B are schematic views illustrating the information processing device according to the first embodiment.

FIGS. 5A and 5B are schematic views illustrating the information processing device according to the first embodiment.

As shown in FIG. 5A, two qubit pairs 10p and a spin chain 10c are provided. The two qubit pairs 10p include, for example, a qubit pair 10pa and a qubit pair 10pb. The spin chain 10c is located between the qubit pair 10pa and the qubit pair 10pb. One of the two qubit pairs 10p includes two physical systems 10s. The two physical systems 10s each can include two or more quantum states that can be included in a qubit. For example, one of the two physical systems 10s may correspond to an electron spin 10Es. For example, the other one of the two physical systems 10s may correspond to a nuclear spin 10Ns. For example, the electron spin 10Es and the nuclear spin 10Ns are the qubit pair 10pa.

For example, the electron spin 10Es is utilized as a broker qubit that is described below. For example, the nuclear spin 10Ns can be utilized as a memory qubit. One of the qubit pair 10p is, for example, a NV center of diamond. The NV center is a diamond nitrogen-vacancy center.

For example, the spin chain 10c is located between the two qubit pairs 10p. The spin chain 10c includes an electron spin 10cEs. The spin chain 10c includes a column that includes multiple electron spins 10cEs. For example, multiple nitrogen atoms are included. For example, the multiple nitrogen atoms are one-dimensionally arranged between the two qubit pairs 10p. The two qubit pairs 10p can interact with each other. For example, the interaction may be performed via the spin chain 10c.

The physical system 10s (specifically, the electron spin or the nuclear spin) can have two quantum states ($|0\rangle$ and $|1\rangle$). In a quantum computer, information processing is performed by utilizing the state of the quantum-mechanical superimposition of these two quantum states ($|0\rangle$ and $|1\rangle$). The state of the superimposition corresponds to a qubit. For example, the state of the superimposition is represented by $\psi = \alpha|0\rangle + \beta|1\rangle$. $\alpha$ and $\beta$ are complex numbers that satisfy $|\alpha|^2 + |\beta|^2 = 1$.

In quantum operations when performing information processing, a one-qubit gate and a two-qubit gate operate on the qubits. In a one-qubit gate, the state of one qubit is changed. In a two-qubit gate, a conditional gate operates on two qubits. The conditional gate changes the value of one of the qubits according to the value of the other qubit.

For example, the two qubits on which the two-qubit gate is to be operated may be proximate. In such a case, the two qubits can directly have a sufficiently intense interaction. A two-qubit gate can operate by utilizing such an interaction.

The distance between the qubits is increased to obtain controllability for selectively performing the one-qubit gate or the two-qubit gate on the desired qubit while avoiding effects on the other qubits. Or, the distance between the qubits is increased due to the unit structure for obtaining extensibility for the number of qubits, etc.

A physical system that mediates the interaction is located between the qubits. The physical system can move the desired qubits. The physical system that mediates the interaction is applicable to qubits other than trapped ion qubits that directly have a sufficient interaction.

An electromagnetic field, the spin chain 10c, or the like is used as the physical system mediating the interaction. Light, a microwave, or the like is used as the electromagnetic field. In the spin chain 10c, for example, multiple spins are one-dimensionally arranged in a solid.

When the physical system that mediates the interaction is utilized, a physical system that brokers the interaction between the qubit and the mediating physical system is further included. There are cases where the interaction between the qubit and the mediating physical system is small. Switching the interaction ON/OFF is difficult. The physical system described above is applicable in such a case as well. The brokering physical system is, for example, a broker qubit.

The distance between the broker qubit and the qubit is short enough for a sufficient interaction to occur. The broker qubit and the qubit are the qubit pair. The broker qubit has an interaction with the physical system mediating the interaction. For example, the broker qubit has an interaction with the physical system mediating the interaction that can be switched ON/OFF.

For example, a NV center in diamond can be utilized as the qubit pair. The NV center is a diamond nitrogen-vacancy center.

There is a method in which nitrogen atoms (P1 centers) are one-dimensionally arranged in diamond as the spin chain. In this method, the superimposition of the quantum states of the nuclear spin of a NV center is used as the qubit. The nuclear spin corresponds to spin $I=\frac{1}{2}$ caused by a $^{15}N$ atom. The quantum states are $|-\frac{1}{2}_n\rangle$ and $|+\frac{1}{2}_n\rangle$. The superimposition of the quantum states of the electron spin is used as the broker qubit. The electron spin corresponds to spin $S=1$. The quantum states that are utilized correspond to $|0_e\rangle$ and $|+1_e\rangle$.

A column of multiple nitrogen atoms is utilized as the spin chain 10c including the electron spin 10cEs (referring to FIG. 5A).

The column of the multiple nitrogen atoms is one-dimensionally arranged. The electron spin corresponds to spin $S=\frac{1}{2}$.

To avoid confusion hereinbelow, a normal qubit is called a memory qubit. The normal qubit corresponds to one qubit of the qubit pair that is due to nuclear spin.

FIG. 5B shows the energy states of coupled systems of the nuclear spin 10Ns and the electron spin 10Es of the NV center when an external magnetic field of 100 mT to 1 T is applied. For example, the memory qubit corresponds to $|0\rangle (=|+\frac{1}{2}_n\rangle)$ and $|1\rangle (=|-\frac{1}{2}_n\rangle)$. For example, the broker qubit corresponds to $|0\rangle (=|0_e\rangle)$ and $|1\rangle (=+1_e\rangle)$. In FIG. 1B, the left side in the parentheses shows the quantum state of the electron spin 10Es. The right side in the parentheses shows the quantum state of the nuclear spin 10Ns. The energy between the state of $(|-1_e\rangle, |+\frac{1}{2}_n\rangle)$ and the state of $(|-1_e\rangle, |-\frac{1}{2}_n\rangle)$ corresponds to a frequency of about 40 MHz.

According to the method described above, the one-qubit gate that relates to the memory qubit is operated by pulse irradiation of a radio wave. The radio wave resonates with the transition frequency between the two quantum states of the memory qubit. The intensity and time of the radio wave correspond to the desired one-qubit gate. For example, a NOT gate can be performed by the irradiation of the radio wave pulse. The radio wave pulse has, for example, the intensity and the duration that is called a π-pulse.

In a two-qubit gate between memory qubits, a SWAP gate is utilized between the memory qubit and the broker qubit. The SWAP gate corresponds to a gate that interchanges the quantum states. A SWAP gate that utilizes the spin chain is utilized between the broker qubits. A two-qubit gate is utilized between the broker qubit and the memory qubit.

The SWAP gate is caused to operate between the memory qubit and the broker qubit by combining a controlled NOT gate (a $C_eNOT_n$ gate) and a controlled NOT gate (a $C_nNOT_e$ gate). In the controlled NOT gate (the $C_eNOT_n$ gate), the broker qubit is the controlled qubit; and the memory qubit is the target qubit. In the controlled NOT gate (the $C_nNOT_e$ gate), the memory qubit is the controlled qubit; and the broker qubit is the target qubit. The controlled NOT gate (CNOT gate) is operated 3 times in the order of the $C_eNOT_n$ gate, the $C_nNOT_e$ gate, and the $C_eNOT_n$ gate.

The $C_eNOT_n$ gate is operated by irradiating the π-pulse of the radio wave. The radio wave resonates with the transition between the two quantum states ($|-\frac{1}{2}_n\rangle$ and $|+\frac{1}{2}_n\rangle$) of the memory qubit. When the broker qubit is $|0\rangle (=|0_e\rangle)$, the quantum states ($|-\frac{1}{2}_n\rangle$ and $|+\frac{1}{2}_n\rangle$) are not split. Therefore, the memory qubit does not change. When the broker qubit is $|1\rangle (=|+1_e\rangle)$, the NOT gate operates on the memory qubit.

The $C_nNOT_e$ gate can be operated by irradiating, 2 times at a time interval of $\tau_m$, a π/2-pulse of a microwave that resonates with the transition between the two quantum states $|0_e\rangle$ and $|+1_e\rangle$ of the broker qubit. The time evolution during $\tau_m$ becomes a controlled-phase gate; and $\tau_m$ can be set so that the operation of the $C_nNOT_e$ gate is before and after the two $\pi/2$-pulse irradiations due to the setting of $\tau_m$.

As described above, the SWAP gate between the memory qubit and the broker qubit can be performed by the $C_eNOT_n$ gate and the $C_nNOT_e$ gate due to the irradiation of a radio wave and a microwave.

The resonance between the broker qubit and the spin chain is utilized in a SWAP gate between the broker qubits utilizing the spin chain. When the spin chain includes N electron spins, the spin chain includes a fermion mode eigenenergy $E_k$ represented by Formula (1), wherein the coupling strength between adjacent spins is $\kappa$.

$$E_k = 2\kappa \cos\frac{k\pi}{N+1} (k = 1, 2, \cdots, N) \quad (1)$$

For the three energy states $|-1_e\rangle$, $|0_e\rangle$, and $|+1_e\rangle$ of the broker qubit, a microwave that has two-photon resonance and detuning $\Delta$ from $|0_e\rangle$ is irradiated for the transition between $|-1_e\rangle$ and $|+1_e\rangle$. The detuning $\Delta$ at this time is set to satisfy the conditions of Formula (2).

$$\Delta = E_k \quad (2)$$

The kth mode of the spin chain and the broker qubit can be caused to resonate thereby.

The condition of Formula (3) is applied when an electromagnetic wave of a Rabi frequency $\nu_R$ that resonates with the transition energy of the electron spins of the spin chain is irradiated on the electron spins.

$$\Delta = E_k + \nu_R \quad (3)$$

The kth mode of the spin chain and the broker qubit can be caused to resonate thereby.

When the broker qubits at the two ends of one spin chain are caused to simultaneously resonate in the kth mode of the spin chain, the states start to oscillate between the broker qubits of the two ends. After a time $\tau_k$ of Formula (4), the quantum states are interchanged between the two broker qubits; and a SWAP gate is performed.

$$\tau_k = \frac{\pi}{2g} \cdot \frac{\sqrt{N+1}}{\sin\frac{k\pi}{N+1}} \quad (4)$$

In Formula (4), "g" is the coupling strength between the electron spin of the broker qubit and the electron spin at the end of the spin chain. Normally, it is favorable for r, (i.e., the gating time) to be short. Accordingly, when "N" is odd, it is favorable to utilize the mode of k=(N+1)/2 or a mode near k=(N+1)/2. When "N" is even, it is favorable to utilize the mode of k=N/2±1 or a mode near k=N/2±1.

A $C_eNOT_n$ gate or a $C_nNOT_e$ gate can be utilized as a two-qubit gate between the broker qubit and the memory qubit. The $C_eNOT_n$ gate or the $C_nNOT_e$ gate is utilized as a SWAP gate between the broker qubit and the memory qubit. Another two-qubit gate can operate between two memory qubits if the gate can operate between the broker qubit and the memory qubit.

Figure 6:
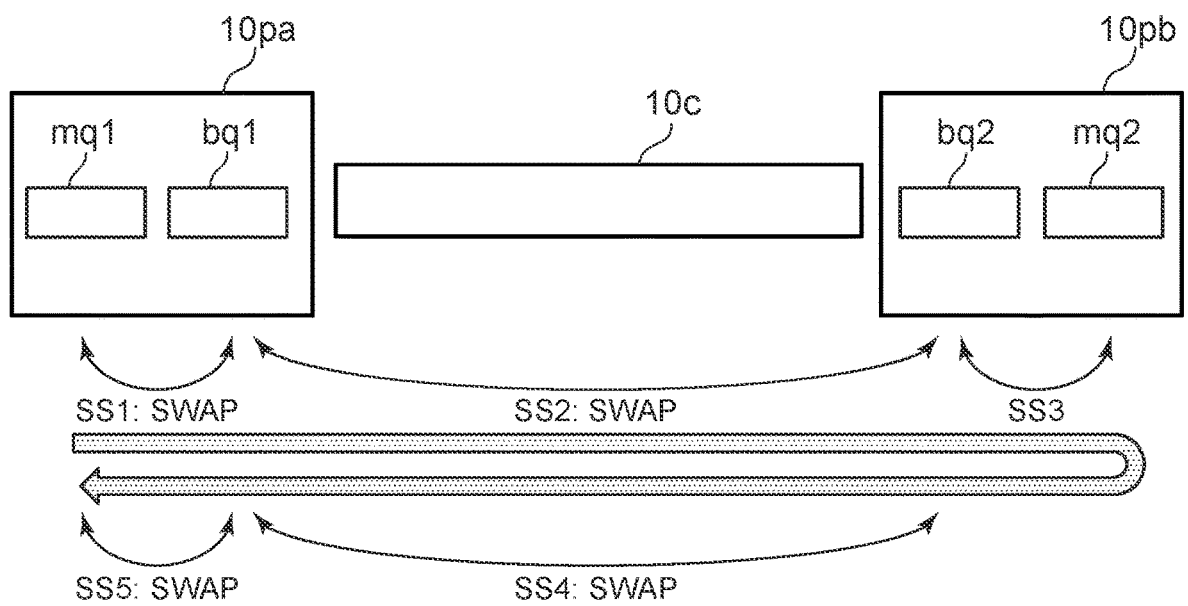
FIG. 6 is a schematic view illustrating an operation of the information processing device according to the first embodiment.

FIG. 6 is a schematic view illustrating an operation of the information processing device according to the first embodiment.

As shown in FIG. 6, the spin chain 10c is located between the qubit pair 10pa and the qubit pair 10pb. The qubit pair 10pa includes a first memory qubit mq1 and a first broker qubit bq1. The qubit pair 10pb includes a second memory qubit mq2 and a second broker qubit bq2. For example, a direct interaction is possible between the first memory qubit mq1 and the first broker qubit bq1. For example, a direct interaction is possible between the second memory qubit mq2 and the second broker qubit bq2.

A procedure of performing a two-qubit gate between two memory qubits (between a memory qubit 10pam and a second memory qubit 10pbm) is as follows.

First procedure SS1: Use a SWAP gate to interchange the quantum state of the first memory qubit mq1 with the quantum state of the first broker qubit bq1 of its pair.

Second procedure SS2: Interchange the quantum state of the first broker qubit bq1 with the quantum state of the second broker qubit bq2 in the pair with the second memory qubit mq2 by utilizing a SWAP gate that utilizes the spin chain.

Third procedure SS3: Perform a two-qubit gate between the second broker qubit bq2 and the second memory qubit mq2.

Fourth procedure SS4: Interchange the quantum states of the second and first broker qubits bq2 and bq1 by performing a SWAP gate.

Fifth procedure SS5: Interchange the quantum states of the first broker qubit bq1 and the first memory qubit mq1 by performing a SWAP gate.

The two-qubit gate between the memory qubits at the two sides of the spin chain can be performed by the first to fifth procedures SS1 to SS5 described above.

For a two-qubit gate that uses the qubit pair and the spin chain, when multiple qubit pairs are linked to one qubit pair via spin chains, the two-qubit gate is selectively operated on the two desired memory qubits.

For example, the spin chain is caused to resonate between two broker qubits that are in pairs with two memory qubits. A selective two-qubit gate is operated by performing the first to fifth procedures SS1 to SS5 in this state.

A surface code which is a high performance error correcting code is utilized in quantum information processing. The appropriate configuration for obtaining such a surface code is unknown. For example, an appropriate surface code is efficiently obtained by appropriately setting the arrangement of the qubit pairs and the spin chains and the fermion mode eigenenergies of the spin chains. For simplicity hereinbelow, the "fermion mode eigenenergy" is called the "eigenenergy".

Examples of the surface code will now be described.

Figure 7:
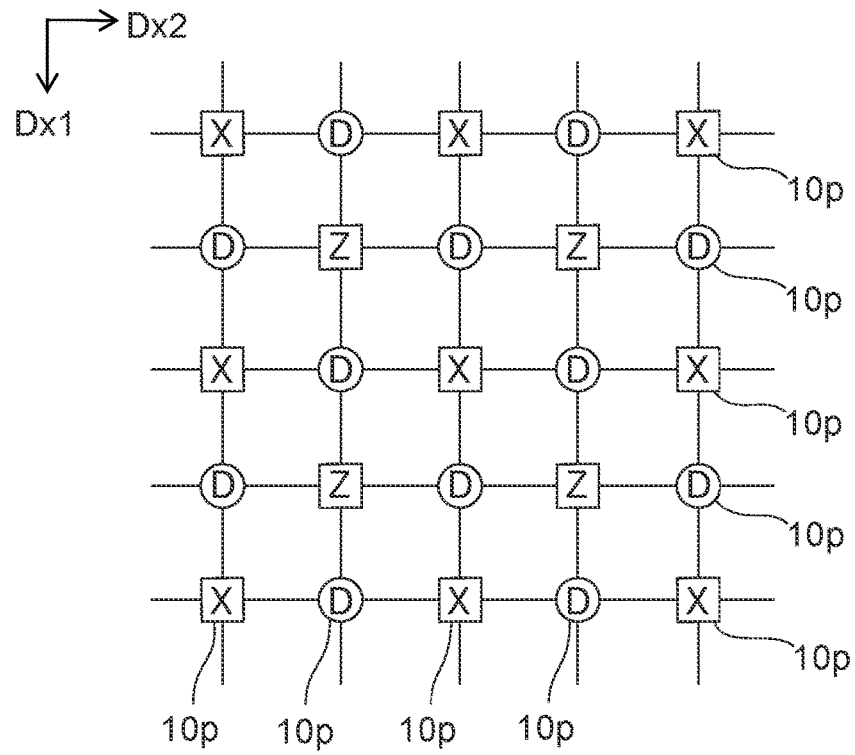
FIG. 7 is a schematic view illustrating an operation of the information processing device according to the first embodiment.

FIG. 7 is a schematic view illustrating an operation of the information processing device according to the first embodiment.

In the surface code as shown in FIG. 7, the multiple qubit pairs 10p (the memory qubits) are divided into three types of qubits, i.e., data qubits ("D"), Z-measurement qubits ("Z") and X-measurement qubits ("X").

As shown in FIG. 7, these qubits are two-dimensionally arranged. The data qubits in one region that includes data qubits and the two types of measurement qubits correspond to one encoded logic qubit.

Figures 8, 9:
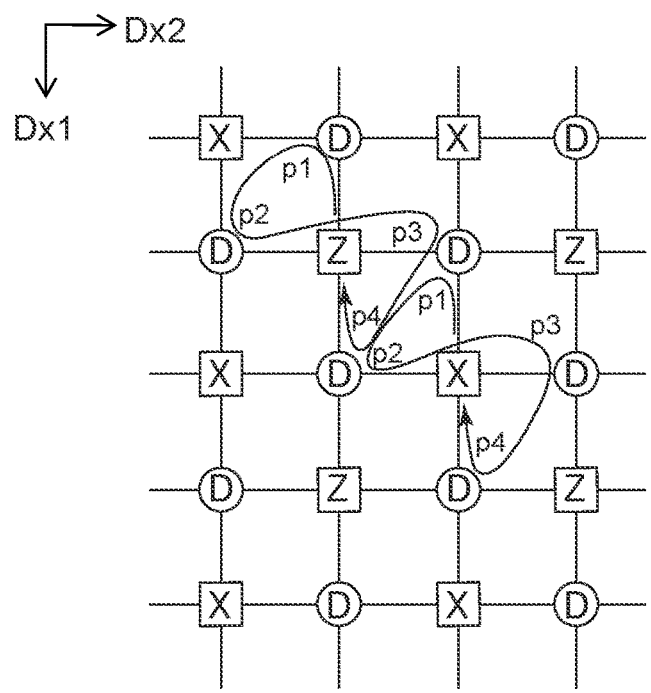
FIG. 8 is a schematic view illustrating an operation of the information processing device according to the first embodiment.
FIG. 9 is a schematic view illustrating operations of the information processing device according to the first embodiment.

FIG. 8 is a schematic view illustrating an operation of the information processing device according to the first embodiment.

As shown in FIG. 8, CNOT gates are repeatedly operated on the Z-measurement qubit and the X-measurement qubit between the Z-measurement qubit and its adjacent to data qubits and between the X-measurement qubit and its adjacent to data qubits by synchronizing first to fourth operations p1 to p4. For example, reading by measurement is performed when one set of the first to fourth operations p1 to p4 is performed. Initialization is performed after reading. Subsequently, the next set of CNOT gates is started. This series of operations is repeated. The series of operations corresponds to a cycle of the surface code. The CNOT gates described above are synchronously repeated in the determined sequence for all of the measurement qubits.

FIG. 9 is a schematic view illustrating operations of the information processing device according to the first embodiment.

As shown in FIG. 9, the flow of the operations of the Z-measurement qubit and the operations relating to the X-measurement qubit are illustrated. In FIG. 9, the operations are synchronously and repeatedly performed in the orientation from the left toward the right. "|g>" corresponds to an initialization. "M" corresponds to a measurement. "H" corresponds to an Hadamard gate. "I" means "do nothing".

In the Z-measurement qubit, the $C_D NOT_Z$ gate that is a CNOT gate in which the data qubit is the controlled qubit and the Z-measurement qubit is the target qubit is performed. In the X-measurement qubit, the $C_X NOT_D$ gate that is a CNOT gate in which the data qubit is the target qubit and the X-measurement qubit is the controlled qubit is performed. In the X-measurement qubit, a one-qubit gate called an Hadamard gate operates before and after the series of $C_X NOT_D$ gates. FIG. 9 illustrates the cycle that relates to the surface code described above.

It is difficult to perform a surface code such as that described above when all of the eigenenergies of the spin chains utilize eigenenergies of the same value.

Figure 10:
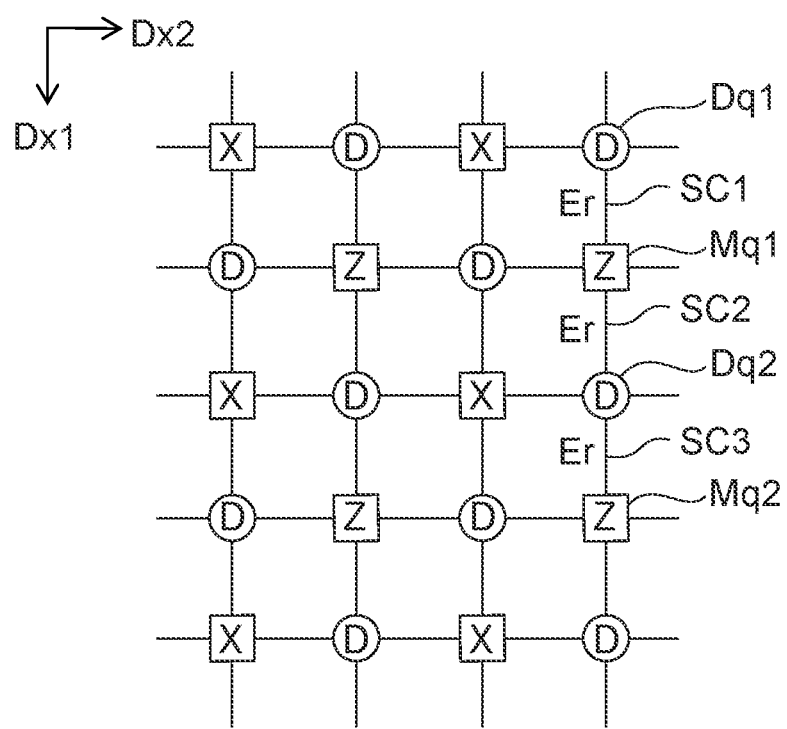
FIG. 10 is a schematic view illustrating an operation of the information processing device.

FIG. 10 is a schematic view illustrating an operation of the information processing device.

For example, as shown in FIG. 10, there are cases where the eigenenergies of three spin chains that are vertically arranged are the same. The eigenenergy is Er for the three spin chains (spin chains SC1 to SC3). The spin chain SC3 is between a measurement qubit Mq2 and a data qubit Dq2. The spin chain SC2 is between the data qubit Dq2 and a measurement qubit Mq1. The spin chain SC1 is between the measurement qubit Mq1 and a data qubit Dq1.

For example, the surface code is performed as follows. The two broker qubits at the two sides of the spin chain SC1 are caused to resonate with the spin chain SC1. The two broker qubits at the two sides of the spin chain SC3 are caused to resonate with the spin chain SC3. The resonance is simultaneously performed. At this time, because the eigenenergies of the three spin chains are equal, resonance is generated in the spin chain SC2 at the broker qubits at the two sides of the spin chain SC2. Therefore, it is difficult for the two CNOT gates that use the spin chains SC1 and SC3 to operate correctly. A similar condition occurs when the eigenenergies of the spin chains are the same for three spin chains arranged vertically and laterally.

On the other hand, it is considered that the surface code can be performed when all of the eigenenergies are different and the multiple qubits can be individually operated. However, when the number of qubits is increased, it is difficult to practically set all of the eigenenergies to be different from each other. It is desirable to arrange the spin chains so that the surface code can be appropriately performed while suppressing the number of eigenenergies.

According to the embodiment, for example, the characteristics of the spin chains are appropriately set for the array of the qubits illustrated in FIG. 7. For example, the surface code can be appropriately performed by employing the first configuration CF1 or the second configuration CF2 described above.

To simplify the description, the positions of the measurement qubits and the data qubits are referred to by using "leftward, rightward, above, and below" in FIG. 7.

In the first configuration CF1, for example, the CNOT gates that are performed synchronously in the cycle of the surface code have the same spin chain eigenenergy to be resonated by the broker qubits at all times. In such a case, for example, all of the broker qubits are caused to resonate with the first eigenenergy $E_1$. For example, in FIG. 7, a SWAP gate for simultaneously performing $C_D NOT_Z$ and $C_X NOT_D$ operates between one of the multiple measurement qubits and the data qubit above the one of the multiple measurement qubits. The SWAP gate operates between the necessary broker qubits. For example, the cycle of the surface code illustrated in FIG. 9 can be performed. At this time, the other broker qubits are effectively not affected. For example, the operation described above is similar when causing all of the broker qubits to resonate with the second to fourth eigenenergies $E_2$ to $E_4$.

In the second configuration CF2, $C_D NOT_Z$ and $C_X NOT_D$ are simultaneously operated between one of the multiple measurement qubits and the data qubit above the one of the multiple measurement qubits. For example, the broker qubit that is in the pair with the Z-measurement qubit and the broker qubit that is in the pair with the data qubit above the Z-measurement qubit are caused to resonate with the first eigenenergy $E_1$. The broker qubit that is in the pair with the X-measurement qubit and the broker qubit that is in the pair with the data qubit above the X-measurement qubit are caused to resonate with the third eigenenergy $E_3$.

The qubit pair that includes the Z-measurement qubit and the broker qubit in the pair with the Z-measurement qubit is called a "Z-measurement qubit pair". The qubit pair that includes the X-measurement qubit and the broker qubit in the pair with the X-measurement qubit is called an "X-measurement qubit pair". The "Z-measurement qubit pair" and the "X-measurement qubit pair" are not equivalent when performing the surface code. Therefore, when performing the surface code, different operations are performed for the "Z-measurement qubit pair" and the "X-measurement qubit pair".

The qubit pair that includes the data qubit and the broker qubit in the pair with the data qubit is called a "data qubit pair". When performing the surface code for the first configuration CF1, there are many cases where the "data qubit pairs" can have the same operation at the same time. The data qubit pair that is above the Z-measurement qubit pair and the data qubit pair that is above the X-measurement qubit pair are not the same. In the second configuration CF2, there are two types of data qubits that correspond to such data qubit pairs that are not the same. There are cases where the operations of the second configuration CF2 are more favorable than those of the first configuration CF1.

According to the first and second configurations CF1 and CF2, for example, the operations that are necessary for performing the surface code can be performed by a small number of common operations for many qubits. For example, the device or the operation method can be simplified. An information processing device and an information processing method can be provided in which the processing efficiency can be increased. In such a case, there are cases where the effect is greater for the second configuration CF2.

When the arrangement of the qubit pairs and the spin chains has the first configuration CF1, for example, the qubit pairs are divided into the three types of the data qubit pair, the Z-measurement qubit pair, and the X-measurement qubit pair when performing the surface code. For example, substantially the same operation is performed on the qubit pairs of the same type. For the gate operation of qubits of localized centers, for example, a quantum state operation in which a microwave resonates with the transition between the quantum states that form the qubit can be utilized.

In such a case, for example, for a microwave that has a long wavelength (a wavelength of about 1 cm) and for which local irradiation is difficult, it is difficult to discriminate the operations between the three types of qubit pairs by selectively irradiating at the positions of the qubits. Even when a micro coil is utilized, local irradiation that is not more than about 100 μm is difficult.

According to the embodiment, for example, the transition frequency between the quantum states that form the qubit is set to have different values between the three types of qubits. For example, a microwave is selectively applied to the desired qubit group by utilizing resonance of the irradiated microwave with the transition frequency. For example, the operations of the three types of qubit pairs are easily discriminated thereby. For example, for qubits of localized centers, it is common to utilize the states of the spin as the quantum states that form the qubits. For example, by applying three different types of magnetic fields that correspond to the three types of qubit pairs, the states of the three types of qubit pairs 10p can be set to be different from each other.

An example of another configuration will now be described. The other configuration is called a "third configuration". The third configuration may be combined with at least one of the first configuration CF1 or the second configuration CF2.

Figure 11:
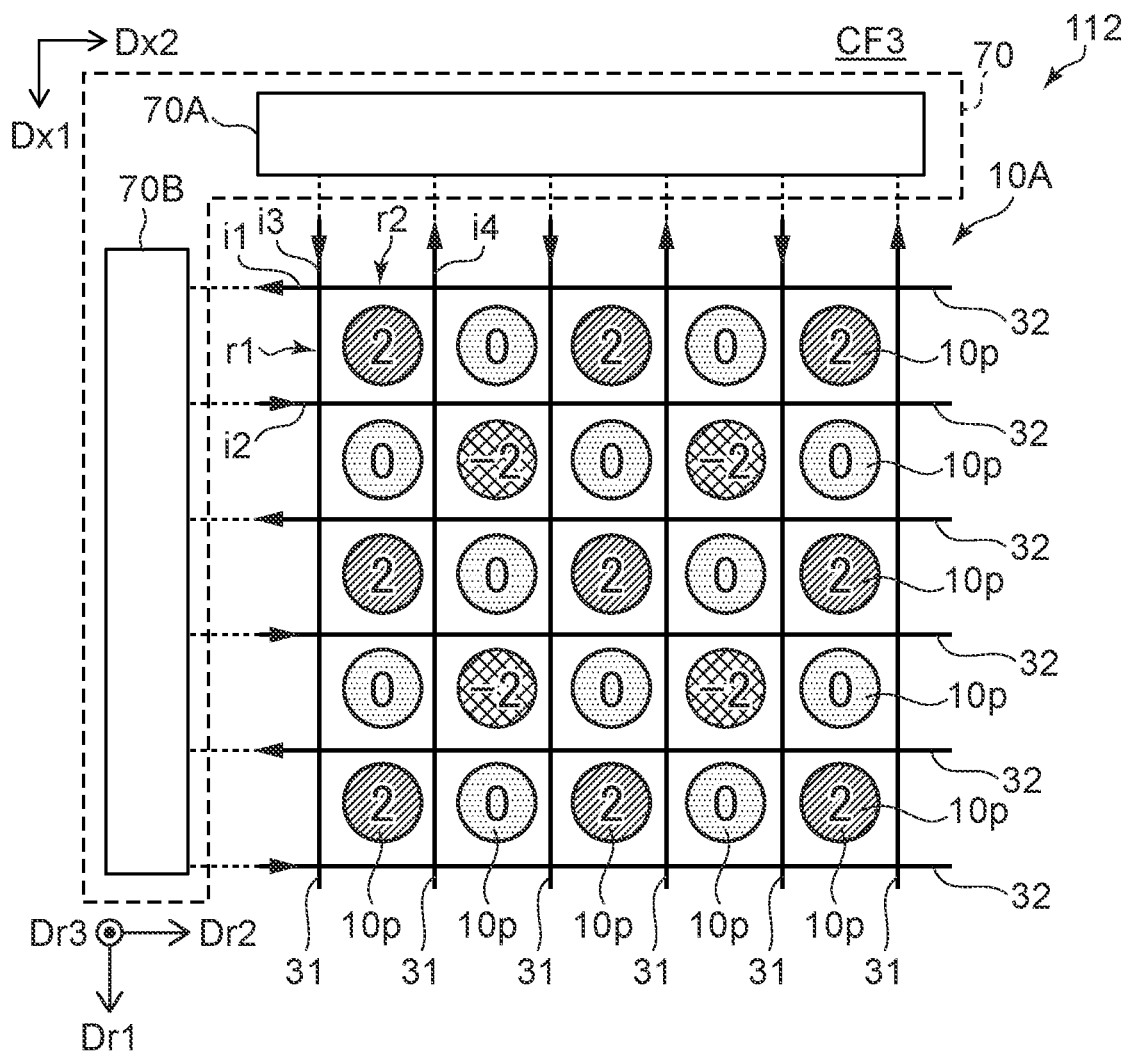
FIG. 11 is a schematic view illustrating the information processing device according to the embodiment.

FIG. 11 is a schematic view illustrating the information processing device according to the embodiment.

As shown in FIG. 11, the information processing device 112 according to the embodiment includes the third configuration CF3. In the third configuration CF3, the information processing device 112 includes multiple first conductive members 31 and multiple second conductive members 32 in addition to the qubit pair structure body 10A. In the third configuration CF3, the qubit pair structure body 10A includes the multiple qubit pairs 10p. The multiple qubit pairs 10p are arranged in m rows and n columns (in which m is an integer that is not less than 3, and n is an integer that is not less than 3). In the third configuration CF3, the distances between the multiple qubit pairs 10p may be the same. The distances between the multiple qubit pairs 10p may be different from each other. For example, the qubit pair structure body 10A may include the first configuration CF1, the second configuration CF2, etc., described above. In the third configuration CF3, the elements or the isotopes that are included in the multiple qubit pairs 10p may be the same.

The multiple first conductive members 31 extend along a first direction Dr1. The first direction Dr1 may be, for example, the first-axis direction Dx1. The multiple first conductive members 31 are arranged along a first cross direction that crosses the first direction Dr1. The first cross direction may be, for example, the second-axis direction Dx2.

The multiple second conductive members 32 extend along a second direction Dr2. The second direction Dr2 crosses the first direction Dr1 and is along a plane including the first direction Dr1 and the first cross direction. The second direction Dr2 may be, for example, the second-axis direction Dx2. The multiple second conductive members 32 are arranged along a second cross direction. The second cross direction crosses the second direction Dr2 and is along the plane recited above. The second cross direction may be, for example, the first-axis direction Dx1.

The multiple qubit pairs 10p are arranged along the plane (the Dr1-Dr2 plane) recited above. One of the multiple qubit pairs 10p overlaps a first region r1 and a second region r2 in a third direction Dr3 that crosses the plane recited above. The first region r1 is between one of the multiple first conductive members 31 and another one of the multiple first conductive members 31. The other one of the multiple first conductive members 31 is adjacent to the one of the multiple first conductive members 31. The second region r2 is between one of the multiple second conductive members 32 and another one of the multiple second conductive members 32. The other one of the multiple second conductive members 32 is adjacent to the one of the multiple second conductive members 32. The multiple first conductive members 31 and the multiple second conductive members 32 are, for example, interconnects.

As shown in FIG. 11, it is possible to alternately supply oppositely-oriented currents to the multiple first conductive members 31. It is possible to alternately supply oppositely-oriented currents to the multiple second conductive members 32. For example, these currents may be supplied from a circuit part 70. For example, the circuit part 70 may include a first current circuit 70A and a second current circuit 70B. The first current circuit 70A is electrically connected with the multiple first conductive members 31. The second current circuit 70B is electrically connected with the multiple second conductive members 32. Switch elements, etc., may be located between the electrical connections.

For example, the circuit part 70 (the first current circuit 70A) is configured to supply a first current i1 of a first orientation to the one of the multiple first conductive members 31. The circuit part 70 (the first current circuit 70A) is configured to supply a second current i2 of a second orientation to the other one of the multiple first conductive members 31. The second orientation is opposite to the first orientation. The circuit part 70 (the second current circuit 70B) is configured to supply a third current i3 of a third orientation to the one of the multiple second conductive members 32. The circuit part 70 (the second current circuit 70B) is configured to supply a fourth current i4 of a fourth orientation to the other one of the multiple second conductive members 32. The fourth orientation is opposite to the third orientation. By such conductive members, the operations of the states of the qubit pairs can be efficiently performed.

For example, multiple conductive member groups are provided. For example, one of the multiple conductive member groups corresponds to the multiple first conductive members 31. For example, another one of the multiple conductive member groups corresponds to the multiple second conductive members 32. The conductive members of the multiple conductive member groups are arranged in planes without overlapping each other in a Z-axis direction (the third direction Dr3). The multiple conductive member groups are provided in a lattice shape. One of the multiple qubit pairs 10p is provided to correspond to one of the regions of the lattice shape.

In the example of FIG. 11, the spacings are the same between the multiple conductive members. The magnitudes of the multiple currents may be the same. The multiple conductive members may be provided in substantially the same plane. In FIG. 11, the numerals "0", "2", and "−2" show the relative magnetic field intensities at the positions of the lattice centers. In the example, the magnetic field in one orientation along the third direction is positive, and the magnetic field in the orientation opposite to the one orientation along the third direction is negative.

In such a case, the arrangement of the magnetic fields at the centers of the square lattice configured by the conductive members is the same as the arrangement of the data qubit pairs, the Z-measurement qubit pairs, and the X-measurement qubit pairs illustrated in FIG. 7. In the third configuration CF3, three types of offset magnetic fields can be applied to the multiple qubit pairs 10$p$. In the third configuration CF3, the three types of qubits can be operated by discriminating the transition frequencies.

In the third configuration CF3, the spacings of the multiple conductive member groups may be different from each other. The values of the currents of the multiple conductive member groups may be different from each other. An offset magnetic field can be generated to match the target by using at least one of the spacing of the conductive member group or the values of the currents.

Figure 12:
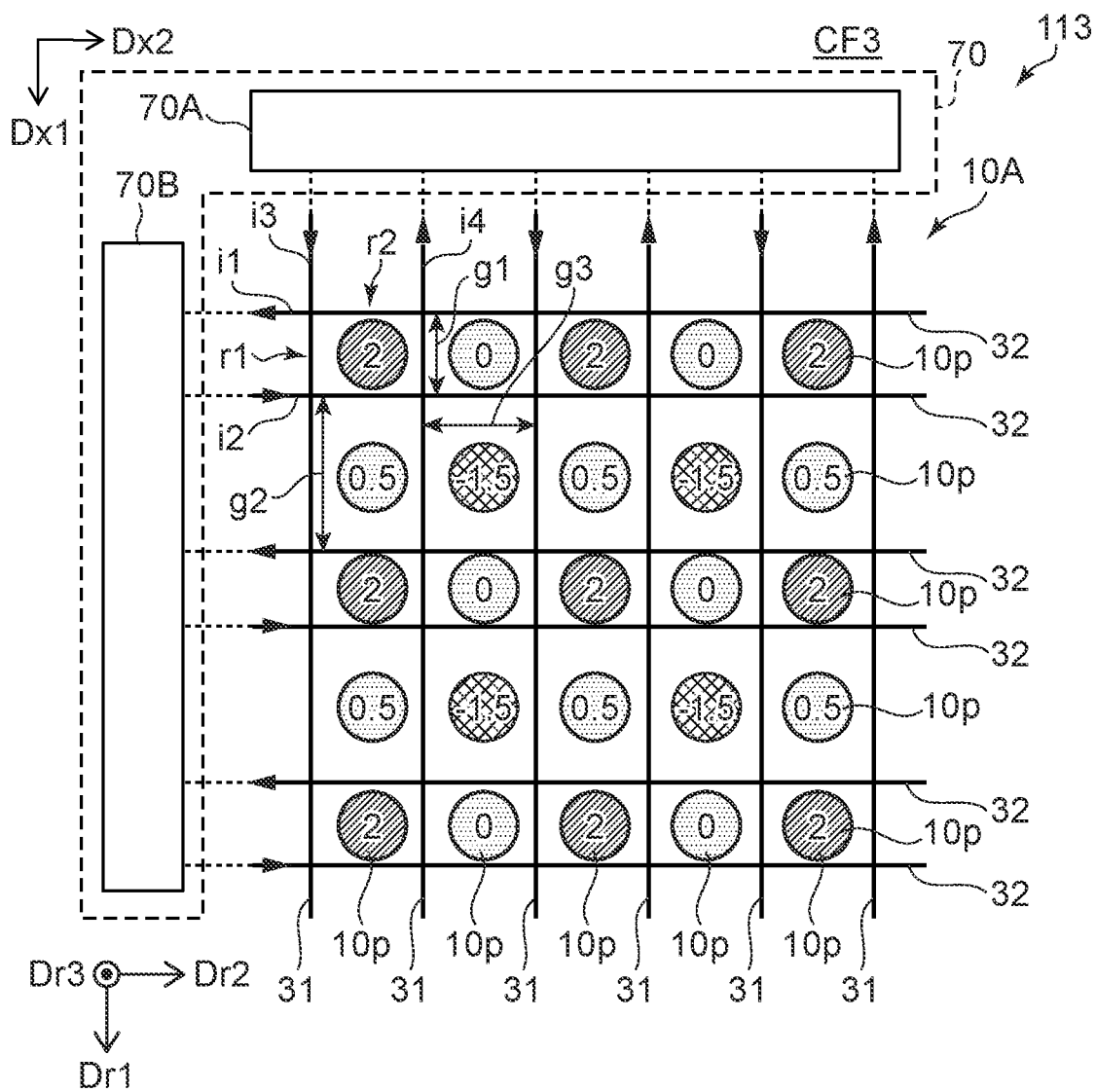
FIG. 12 is a schematic view illustrating an information processing device according to the embodiment.

FIG. 12 is a schematic view illustrating an information processing device according to the embodiment.

As shown in FIG. 12, the information processing device 113 according to the embodiment includes the third configuration CF3. In the information processing device 113, the distances (the spacings) between the multiple second conductive members 32 are not the same. The information processing device 113 includes the multiple first conductive members 31. The qubit pair structure body 10A may include the first configuration CF1, the second configuration CF2, etc., described above.

In the example shown in FIG. 12, the spacing of a second conductive member group (the multiple second conductive members 32) is a first spacing g1 or a second spacing g2. The value of the current in the first conductive member group is the first current value. The spacing of the first conductive member group (the multiple first conductive members 31) is a third spacing g3. The value of the current in the second conductive member group is a second current value.

For example, g1:g2:g3=1:2:1.5. The first current value: second current value=1.5:1. In such a case, for example, an arrangement of the offset magnetic fields that corresponds to the second configuration CF2 described above is obtained. By the arrangement of the offset magnetic fields, the data qubit pairs are operated by being discriminated into two or more types.

The following is performed when performing quantum computing using a quantum computer in which the qubit pairs 10$p$ are coupled by spin chains. As the cycle of the surface code, other than $C_D\text{NOT}_Z$ and $C_X\text{NOT}_D$, measurement and initialization for the Z-measurement qubit and the X-measurement qubit are performed. An Hadamard gate for the X-measurement qubit is performed. The Z-measurement qubit and the X-measurement qubit are individually frozen separately from the cycle of the surface code. An individual measurement, an individual one-qubit gate, and an individual initialization relating to the data qubit are performed. In the initialization of the Z-measurement qubit and the X-measurement qubit according to the embodiment, an individual one-qubit gate that relates to the Z-measurement qubit and the X-measurement qubit is utilized.

The Hadamard gate that is one type of one-qubit gate is operated by irradiating a π/2-pulse electromagnetic wave that resonates with the transition of a two-state system that forms the qubit. In the case of a localized center, for example, it is common for the irradiated electromagnetic wave to be a radio wave.

Examples of Hadamard gates that can be performed in the information processing devices 112 and 113 will now be described. In an Hadamard gate, for example, a uniform external magnetic field is applied to the multiple qubit pairs 10$p$ that use NV centers. Then, an offset magnetic field of the pattern illustrated in FIG. 11 or FIG. 12 is applied by a conductive member group.

When the Hadamard gate operates on the X-measurement qubit, a π-pulse microwave that resonates with the transition between $|0_e\rangle$ and $|+1_e\rangle$ of the broker qubit in the pair with the X-measurement qubit (the transition between $|0\rangle$ and $|1\rangle$) is irradiated. The broker qubit of the X-measurement qubit is set to $|+1_e\rangle$ (i.e., $|1\rangle$). Subsequently, a π/2-pulse radio wave that resonates with the transition between $|+\frac{1}{2}_n\rangle$ and $|-\frac{1}{2}_n\rangle$ of the X-measurement qubit (the transition between $|0\rangle$ and $|1\rangle$) is irradiated. The π-pulse of the microwave that resonates with the transition between $|0_e\rangle$ and $|+1_e\rangle$ of the broker qubit (the transition between $|0\rangle$ and $|1\rangle$) is re-irradiated. The broker qubit returns to $|0_e\rangle$ and $|0\rangle$. Thus, the Hadamard gate can be selectively performed on the X-measurement qubits and on the entirety of the X-measurement qubits.

When the qubit utilizes a localized center, it is common to use a photoexcitation process to perform the measurement and the initialization relating to the measurement qubit and the data qubit. According to the embodiment, separately from the cycle of the surface code, light irradiation is utilized for individually freezing the measurement qubit and performing an individual one-qubit gate and an individual measurement relating to the data qubit. An offset magnetic field of a pattern such as that illustrated in FIG. 11 or FIG. 12 is applied to the qubit pairs 10$p$ that use NV centers and to which the uniform external magnetic field.

Examples of operations and measurements using light irradiation and a photoexcitation process will now be described.

Figure 13A:
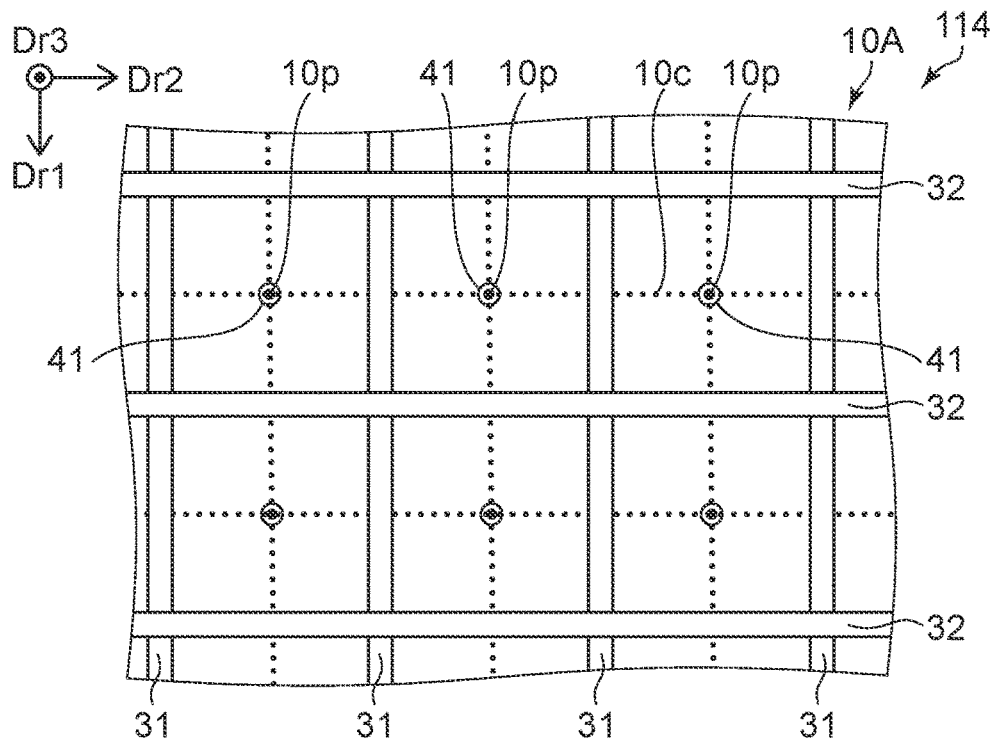
FIGS. 13A and 13B are schematic views illustrating an information processing device according to the embodiment.
Figure 13B:
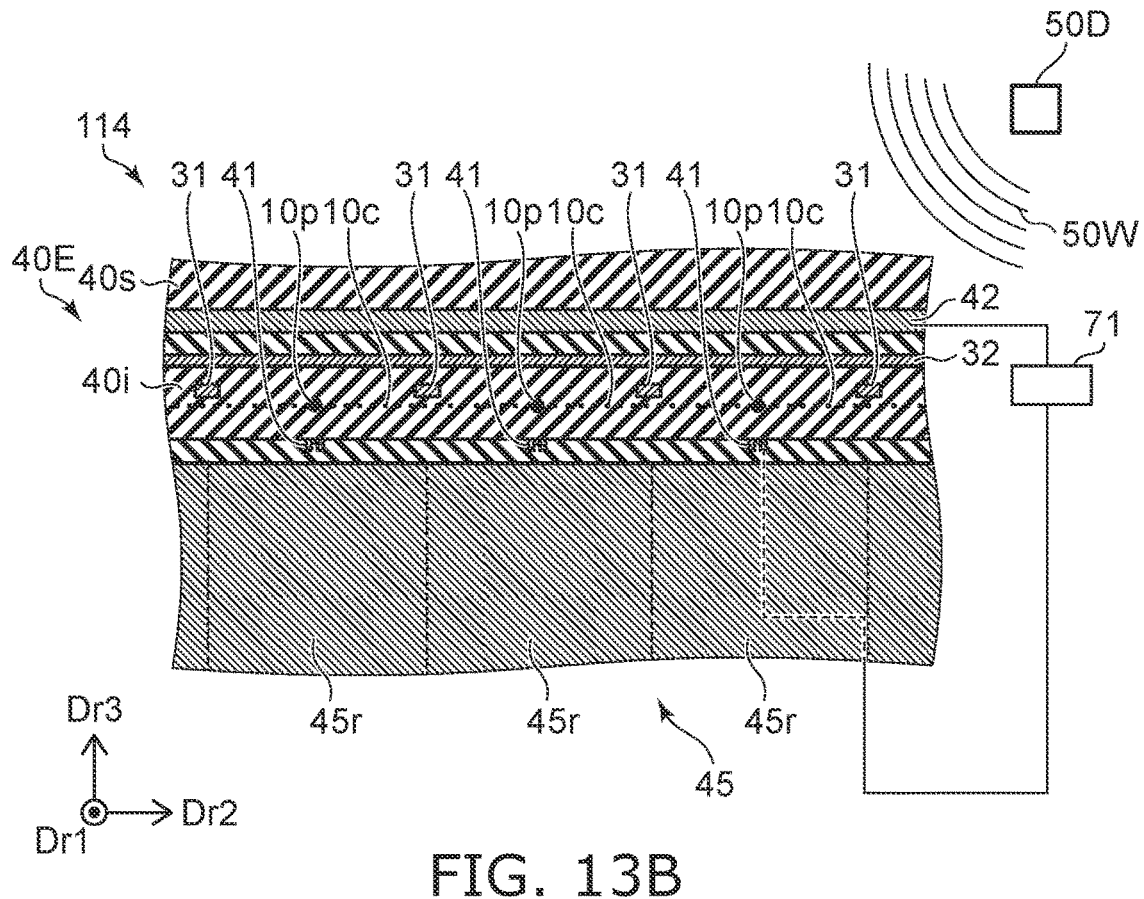

FIGS. 13A and 13B are schematic views illustrating an information processing device according to the embodiment.

FIG. 13A is a see-through plan view. FIG. 13B is a cross-sectional view.

In the information processing device 114 according to the embodiment as shown in FIGS. 13A and 13B, the qubit pair structure body 10A includes multiple electrodes 40E and a light detecting part 45 in addition to the multiple qubit pairs 10$p$. The multiple first conductive members 31 and the multiple second conductive members 32 are included in the example.

For example, the multiple electrodes 40E include multiple first electrodes 41 and a second electrode 42. For example, the multiple first electrodes 41 each are tubular. Tubular includes cylinder. The multiple first electrodes 41 may be dome-shaped (including needle-shaped), etc. Various modifications of the shapes of the multiple first electrodes 41 are possible. The direction toward the second electrode 42 from each of the multiple first electrodes 41 is along the third direction Dr3. The position of the central portion of one of the multiple first electrodes 41 substantially overlaps the position of one of the multiple qubit pairs 10$p$ in the third direction Dr3. For example, the multiple electrodes 40E (the multiple first electrodes 41 and the second electrode 42) are light-transmissive.

The multiple electrodes 40E are configured to individually apply electric fields to the multiple qubit pairs 10$p$. For example, an electric field application part 71 is included. The electric field application part 71 is electrically connected with the multiple electrodes 40E. Switch elements may be located between the electric field application part 71 and the multiple electrodes 40E.

For example, the light detecting part 45 is configured to detect light emitted by the multiple qubit pairs 10p. For example, the light detecting part 45 includes multiple detection regions 45r. One of the multiple detection regions 45r overlaps one of the multiple qubit pairs 10p in the third direction Dr3.

In the example, the multiple qubit pairs 10p and the spin chains 10c are located between the light detecting part 45 and a base body 40s. The multiple first electrodes 41 that are described above are located between the light detecting part 45 and the region (the layer-shaped region) in which the multiple qubit pairs 10p and the spin chains 10c are provided. The second electrode 42 that is described above is located between the base body 40s and the region (the layer-shaped region) in which the multiple qubit pairs 10p and the spin chains 10c are provided. The multiple first conductive members 31 are located between the region (the layer-shaped region) in which the second electrode 42 is located and the region (the layer-shaped region) in which the multiple qubit pairs 10p and the spin chains 10c are provided. The multiple second conductive members 32 are located between the region (the layer-shaped region) in which the multiple qubit pairs 10p and the spin chains 10c are located and the region (the layer-shaped region) in which the second electrode 42 is provided. An intermediate member 40i may be located between these regions. At least a portion of the intermediate member 40i is, for example, diamond. The base body 40s may be, for example, a quartz substrate, etc.

As shown in FIG. 13B, the information processing device 114 may include an electromagnetic wave irradiation part 50D. For example, the electromagnetic wave irradiation part 50D irradiates an electromagnetic wave 50W on the multiple qubit pairs 10p. The electromagnetic wave 50W may include, for example, at least one of a radio wave, a microwave, or light.

For example, in the information processing device 114, the photons that are emitted from the broker qubits of the multiple qubit pairs 10p are individually detected. The measurement qubits and the data qubits are measured. The light detecting part 45 that detects the photons obtained from the multiple broker qubits is provided. The transition frequencies of the radiative transitions of the multiple broker qubits can be changed by the Stark effect by the multiple electrodes 40E. For example, one of the multiple first electrodes 41 (the light-transmissive electrodes) is located at the vicinity of one of the multiple qubit pairs 10p. For example, light can be simultaneously irradiated on all of the broker qubits by the electromagnetic wave irradiation part 50D. The light corresponds to a global field. The light includes components of four frequencies $v_1$, $v_2$, $v_3$, and $v_4$. For example, the four frequencies $v_1$, $v_2$, $v_3$, and $v_4$ are utilized in the individual freeze and the individual one-qubit gate of the measurement and the initialization.

Figure 14:
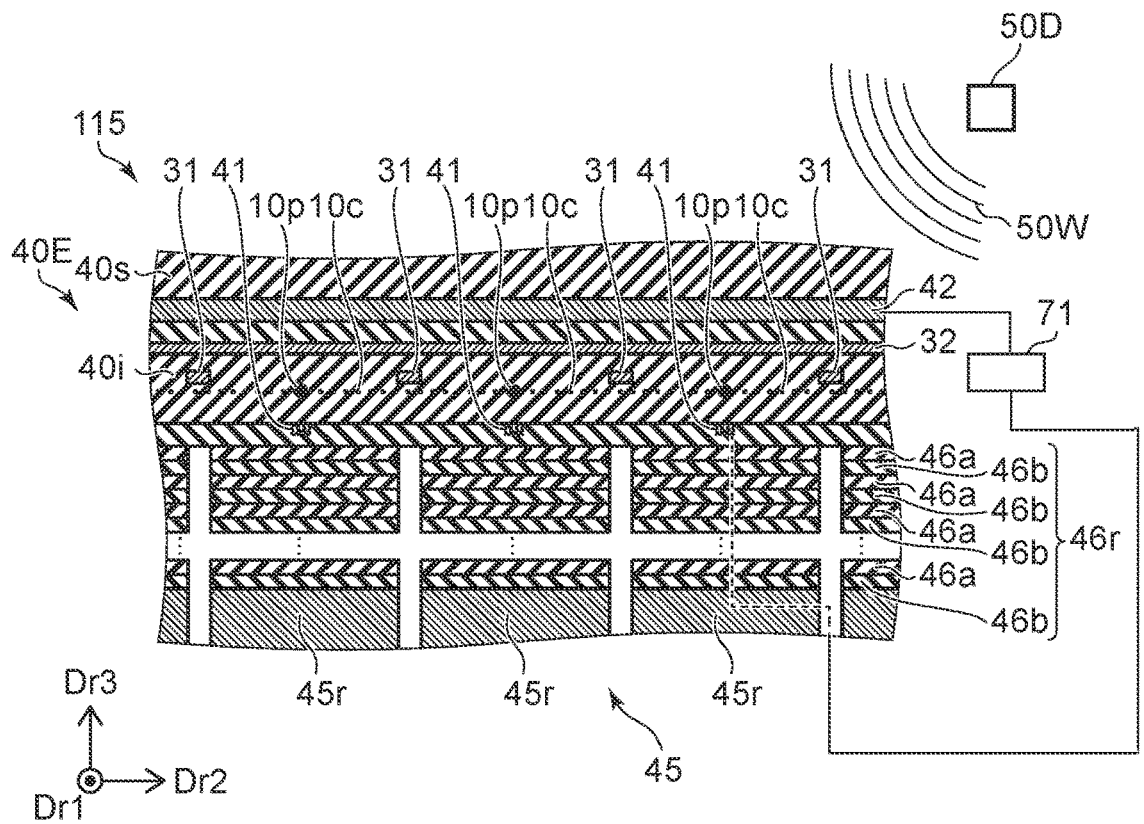
FIG. 14 is a schematic cross-sectional view illustrating an information processing device according to the embodiment.

FIG. 14 is a schematic cross-sectional view illustrating an information processing device according to the embodiment.

As shown in FIG. 14, the information processing device 115 according to the embodiment includes a reflecting member 46r in addition to the configuration included in the information processing device 114.

The reflecting member 46r is located between the light detecting part 45 and the multiple qubit pairs 10p. In the example, the reflecting member 46r includes multiple first optical layers 46a and multiple second optical layers 46b. One of the multiple second optical layers 46b is between one of the multiple first optical layers 46a and another one of the multiple first optical layers 46a. One of the multiple first optical layers 46a is between one of the multiple second optical layers 46b and another one of the multiple second optical layers 46b. The refractive index of the multiple first optical layers 46a is different from the refractive index of the multiple second optical layers 46b. The reflecting member 46r may be, for example, a Bragg mirror.

In the information processing device 115, the reflecting member 46r is subdivided to correspond to the multiple qubit pairs 10p. The reflecting member 46r is at least a portion of a waveguide structure.

For example, if the excitation light enters the light detecting part 45 and affects the measured values when detecting the photons from the broker qubits, it is difficult to obtain the correct measurement result. It is favorable for the excitation light to be separated from the photons from the broker qubits. The information processing device 115 includes the reflecting member 46r. The reflecting member 46r reflects the excitation light. The effects of the excitation light on the light detecting part 45 can be suppressed thereby.

For example, the effects of the excitation light may be suppressed by temporally separating the excitation light and the emitted light. For example, the excitation light may be pulsed excitation light. For example, the timing of the detection of the light detecting part 45 is synchronized with the pulsed excitation light. For example, a highly-sensitive light detection is performed in a period in which there is no excitation light. The effects of the excitation light can be suppressed thereby.

It is difficult for the photons to penetrate the waveguide structure when the spacing of the qubit pairs 10p is less than the wavelength of the emitted photons. It is considered that a temporal separation between the excitation light and the detection is advantageous in such a case.

Figure 15:
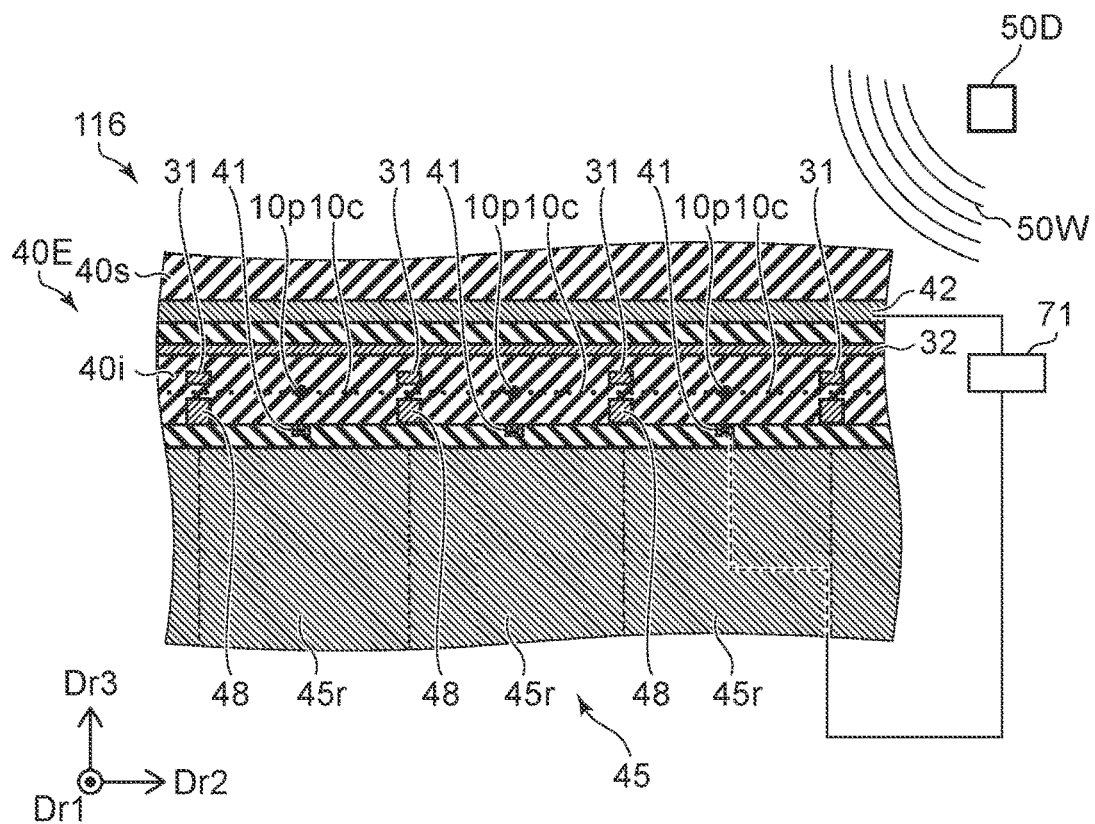
FIG. 15 is a schematic cross-sectional view illustrating an information processing device according to the embodiment.

FIG. 15 is a schematic cross-sectional view illustrating an information processing device according to the embodiment.

As shown in FIG. 15, the information processing device 116 according to the embodiment includes a light-attenuating member 48 in addition to the configuration included in the information processing device 114. The light-attenuating member 48 overlaps the region between the multiple qubit pairs 10p in the third direction Dr3. For example, the light-attenuating member 48 may overlap the multiple first conductive members 31 in the third direction Dr3. For example, the light-attenuating member 48 may overlap at least one of the multiple second conductive members 32 in the third direction Dr3.

For example, the light-attenuating member 48 functions as a light-shielding part. For example, the light-attenuating member 48 absorbs light.

For example, it is desirable for the light from the multiple broker qubits to be detected by the detection region 45r that is the most proximate to each of the multiple broker qubits. Due to the light-attenuating member 48, the light that is from one of the multiple broker qubits is appropriately detected by the detection region 45r that corresponds to the one of the multiple broker qubits. The incidence of the light from the one of the multiple broker qubits on the other detection regions 45r can be suppressed. A more accurate detection is possible thereby.

Examples of measurements of the measurement qubit and the data qubit will now be described.

In a measurement that relates to the Z-measurement qubit, the π-pulse of a microwave is irradiated on the qubit pair 10p of the Z-measurement qubit (the coupled system of the Z-measurement qubit and the broker qubit). The π-pulse of the microwave resonates with the transition frequency between ($|0_e>$, $|-½_n>$) and ($|+1_e>$, $|-½_n>$) (referring to FIG. 5B).

For example, the offset pattern illustrated in FIG. 11 or FIG. 12 is applied. Thereby, the transition frequency between ($|0_e>$, $|-½_n>$) and ($|+1_e>$, $|-½_n>$) of the Z-measurement qubit is different from the corresponding transition frequency of the X-measurement qubit pair or the data qubit pair. The microwave can selectively act on the qubit pair of the Z-measurement qubit. For example, when the Z-measurement qubit is $|-½_n>(=|1>)$, the qubit pair 10p that is in the state of ($|0_e>$, $|-½_n>$) is changed to the state of ($|+1_e>$, $|-½_n>$). On the other hand, when the Z-measurement qubit is $|+½_n>(=|0>)$, the state of the qubit pair 10p does not change.

Figure 16:
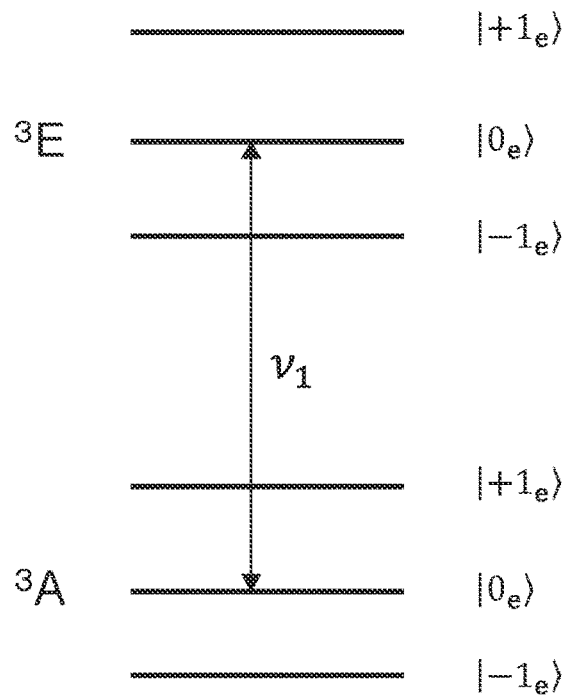
FIG. 16 is a schematic view illustrating a state of the information processing device according to the embodiment.

FIG. 16 is a schematic view illustrating a state of the information processing device according to the embodiment.

FIG. 16 illustrates the states of the electron spin in the electron ground state ($^3A$) and the electron excited state ($^3E$) of the NV center. The states of the electron spin correspond to the states of the broker qubit. Splitting due to the states of the nuclear spin is not illustrated in FIG. 16.

FIG. 5B illustrates energy states that correspond to $^3A$. A voltage is applied to the multiple electrodes 40 (the light-transmissive electrodes) after the microwave irradiation. The radiative transition energy between $|0_e>$ of $^3A$ and $|0_e>$ of $^3E$ of the broker qubit in the pair with the Z-measurement qubit is changed by the electric field due to the application of the voltage. The broker qubit resonates with the frequency $v_1$ of the excitation light. When the Z-measurement qubit is $|+½_n>$(i.e., $|0>$), the broker qubit that is in the pair is excited and emits a photon.

Thereby, the photon is detected by the most proximate detection region 45r (light detecting part 45). The excitation by the excitation light from $|0_e>$ of $^3A$ to $|0_e>$ of $^3E$ and the relaxation by the photon emission from $|0_e>$ of $^3E$ to $|0_e>$ of $^3A$ are repeated while maintaining the state of the nuclear spin (the Z-measurement qubit). Multiple photons are emitted.

On the other hand, when the Z-measurement qubit is $|-½_n>(=|1>)$, the broker qubit that is in the pair is not excited and does not emit a photon. Therefore, a photon is not detected by the most proximate detection region 45r (light detecting part 45). Thus, the measurement that relates to the Z-measurement qubit is performed.

In the measurement that relates to the X-measurement qubit, a π-pulse of a microwave is irradiated on the qubit pair 10p of the X-measurement qubit. The π-pulse of the microwave resonates with the transition frequency between ($|0_e>$, $|-½_n>$) and ($|+1_e>$, $|-½_n>$) illustrated in FIG. 5B.

Similarly to the measurement relating to the Z-measurement qubit, the microwave can selectively act on the qubit pair 10p of the X-measurement qubit. Subsequently, a voltage is applied to the multiple electrodes 40E (the light-transmissive electrodes). The radiative transition energy between $|0_e>$ of $^3A$ and $|0_e>$ of $^3E$ of the broker qubit in the pair with the X-measurement qubit is caused to resonate by the frequency $v_1$ of the excitation light by the electric field due to the application of the voltage. The existence or absence of the emitted photon from the broker qubit is detected by the detection region 45r (the light detecting part 45). Thereby, the measurement that relates to the X-measurement qubit is performed similarly to the Z-measurement qubit.

Similarly to the measurement qubit, the π-pulse irradiation of the microwave is performed for the data qubit. Also, the photoexcitation by the resonance of the Stark shift and the emitted photon are detected. The measurement that relates to the data qubit is performed thereby.

An example of the initialization of the measurement qubit and the data qubit according to the embodiment will now be described.

When initializing, the following is performed when it is considered that the broker qubit that is in the pair with the measurement qubit or the data qubit to be initialized may not be in the state of $|0_e>$ of $^3A$ for some reason.

Figure 17:
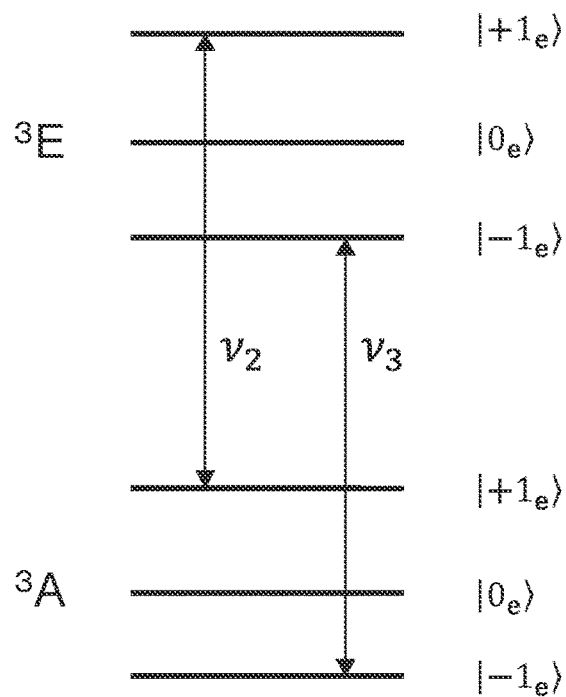
FIG. 17 is a schematic view illustrating a state of the information processing device according to the embodiment.

FIG. 17 is a schematic view illustrating a state of the information processing device according to the embodiment.

As shown in FIG. 17, resonance is generated between light of the frequency $v_2$ and light of the frequency $v_3$. For example, a voltage is applied to the multiple electrodes 40E (the light-transmissive electrodes). The radiative transition energy between $|+1_e>$ of $^3A$ and $|+1_e>$ of $^3E$ and the radiative transition energy between $|-1_e>$ of $^3A$ and $|-1_e>$ of $^3E$ of the broker qubit are simultaneously changed by the electric field due to the application of the voltage. The radiative transition between $|+1_e>$ of $^3A$ and $|+1_e>$ of $^3E$ is caused to resonate by the light of the frequency $v_2$. The radiative transition between $|-1_e>$ of $^3A$ and $|-1_e>$ of $^3E$ is caused to resonate by the light of the frequency $v_3$.

The broker qubit is set to the state of $|0_e>$ of $^3A$ by the optical pumping due to the excitation and the relaxation of the two lights.

The measurement qubit or the data qubit of which the broker qubit is $|0_e>$ of $^3A$ can be initialized utilizing a measurement. For example, when initializing to $|0>(=|+½_n>)$, the measurement qubit or the data qubit is measured by the method described above. When the measurement qubit or the data qubit is $|1>$, the measurement qubit or the data qubit is set to $|0>$ by an individual one-qubit gate that is described below. The measurement qubit or the data qubit can similarly be initialized to the state of $|1>$.

An example of an individual freeze of the Z-measurement qubit and the X-measurement qubit will now be described. An example of the individual initialization and the individual measurement relating to the data qubit are shown. Examples of an individual one-qubit gate that relates to the Z-measurement qubit, the X-measurement qubit, and the data qubit are shown.

Figure 18:
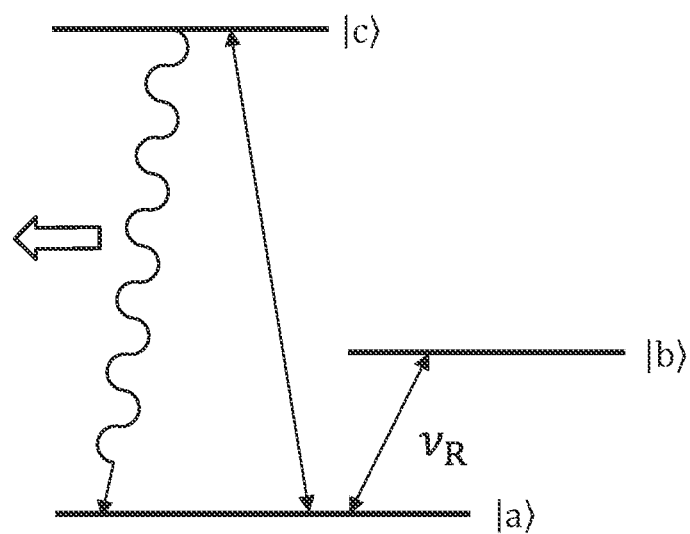
FIG. 18 is a schematic view illustrating a state of the information processing device according to the embodiment.

FIG. 18 is a schematic view illustrating a state of the information processing device according to the embodiment.

In one example, for example, the quantum Zeno effect is utilized in these individual operations. For example, there is a physical system that includes three energy states such as that shown in FIG. 18. The initial state of the physical system is taken as $|a>$. An electromagnetic wave is irradiated on the physical system. The Rabi frequency of the electromagnetic wave is $v_R$. The Rabi frequency of the electromagnetic wave resonates with the transition between $|a>$ and $|b>$. The Rabi frequency corresponds to the magnitude of the interaction with the physical system. By irradiating such an electromagnetic wave, the state of the physical system starts to oscillate between $|a>$ and $|b>$ with a period of $1/v_R$. At this time, it can be measured whether the state is $|a>$ or $|b>$. For example, in the measurement, the state of the physical system that was a superimposition of $|a>$ and $|b>$ due to time evolution collapses to one state of $|a>$ or $|b>$ according to the measurement result. In such a case, the measurement is frequently performed at a sufficiently short time interval τ with respect to $1/v_R$ (i.e., τ that satisfies Formula (5)).

$$\tau \ll 1/v_R \quad (5)$$

In such a measurement, for example, the state becomes |a⟩ each measurement. Therefore, a change from |a⟩ does not occur even though the electromagnetic wave of the Rabi frequency $v_R$ is irradiated. This phenomenon corresponds to the quantum Zeno effect.

In the measurement, for example, light that resonates with the transition between |a⟩ and |c⟩ illustrated in FIG. 18 is irradiated. When the physical system is in the state of |a⟩, the measurement is performed by detecting the photon emission from the physical system that is excited by the light to the state of |c⟩.

The light that is used in the measurement has an intensity and a duration such that, for example, multiple photons are emitted during the life of the state of |c⟩ under conditions that can be considered to satisfy the condition of Formula (5). The photon that is emitted from the physical system may not always be detected by the detection device. For example, as long as the photon is emitted, the state of the physical system is measured by being "recorded" in the electromagnetic field.

When utilizing the quantum Zeno effect, for example, intense light that resonates with the transition between one of two states and a third state of the physical system is irradiated while irradiating a microwave that corresponds to the transition between the two states. By utilizing the quantum Zeno effect, the response of the physical system to the microwave can be suppressed.

Figure 19:
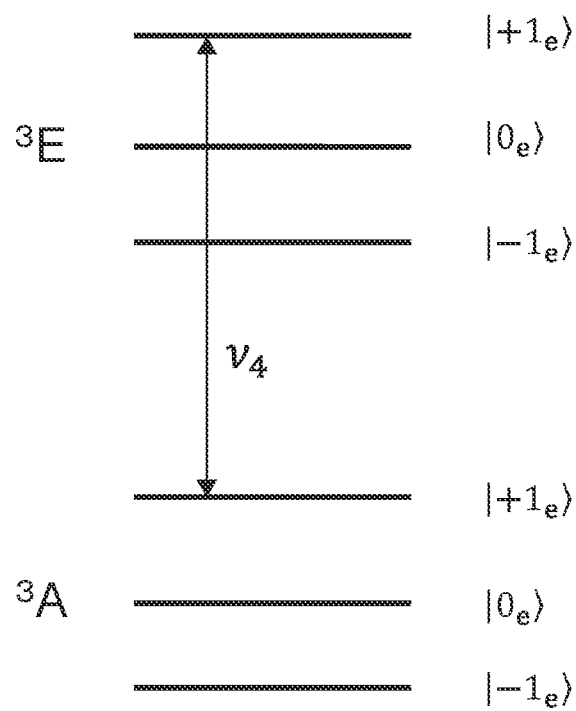
FIG. 19 is a schematic view illustrating a state of the information processing device according to the embodiment.

FIG. 19 is a schematic view illustrating a state of the information processing device according to the embodiment.

As shown in FIG. 19, for example, light of the frequency $v_4$ is irradiated when individually freezing the Z-measurement qubit and the X-measurement qubit. The intensity of the light of the frequency $v_4$ is greater than the intensity of the light of the other frequencies (e.g., the frequency $v_1$). For example, a voltage is applied to the multiple electrodes 40E (the light-transmissive electrodes). The radiative transition energy between $|+1_e\rangle$ of $^3A$ and $|+1_e\rangle$ of $^3E$ of the broker qubit in the pair with the qubit to be frozen is caused to resonate by the frequency $v_4$ of the excitation light by the electric field due to the application of the voltage.

Due to the quantum Zeno effect due to such light, the broker qubit no longer responds to the microwave that resonates with the transition between $|0_e\rangle$ and $|+1_e\rangle$ of $^3A$. Therefore, the qubit to be frozen remains in the state of $|0_e\rangle$. The qubit to be frozen no longer responds to the radio wave for the qubit operation; and the operation is frozen.

In the individual initialization and the individual measurement relating to the data qubit, a voltage is applied by the multiple electrodes 40E (the light-transmissive electrodes) to the broker qubits in the pairs with qubits other than the data qubit to be initialized or measured. An operation similar to that described above is performed while causing the radiative transition energy between $|+1_e\rangle$ of $^3A$ and $|+1_e\rangle$ of $^3E$ of the broker qubit in the pair with the qubit other than the data qubit to be initialized or measured to resonate with the frequency $v_4$ of the excitation light by the electric field due to the voltage application. For example, first, the broker qubit in the pair with the data qubit to be initialized or measured is caused to resonate with the frequency $v_1$ of the excitation light by the electric field due to the voltage application after the irradiation of the microwave. The measurement of the broker qubit in the pair with the data qubit to be initialized or measured is performed thereby. When initializing, the setting to the desired initial value is performed according to the measurement result by an individual one-qubit gate that is described below.

The individual one-qubit gate that relates to the Z-measurement qubit, the X-measurement qubit, and the data qubit is performed as follows. The broker qubits that are in the pairs with these qubits other than the qubit on which the one-qubit gate is to be operated are caused to resonate by the frequency $v_4$ of the excitation light by the electric field due to the voltage application to the multiple electrodes 40E (the light-transmissive electrodes). The π-pulse of the microwave is irradiated in this state. The π-pulse of the microwave resonates with the transition between $|0_e\rangle$ and $|+1_e\rangle$ of the broker qubit of the qubit on which the one-qubit gate is to be operated. The broker qubit is selectively set to $|+1_e\rangle$ by the irradiation of the π-pulse of the microwave. Subsequently, a radio wave is irradiated. The radio wave resonates with the transition between $|+\frac{1}{2}_n\rangle$ and $|-\frac{1}{2}_n\rangle$ (the transition between $|0\rangle$ and $|1\rangle$) of the qubit on which the one-qubit gate is to be operated. The one-qubit gate is operated by the irradiation of the radio wave. Subsequently, the π-pulse of the microwave is re-irradiated. The π-pulse of the microwave resonates with the transition between $|0_e\rangle$ and $|+1_e\rangle$ (the transition between $|0\rangle$ and $|1\rangle$) of the broker qubit. The broker qubit is returned to $|0_e\rangle$ (i.e., $|0\rangle$) by the irradiation of the π-pulse of the microwave. Thus, the individual one-qubit gate that relates to the Z-measurement qubit, the X-measurement qubit, and the data qubit is performed.

When measuring the qubit, for example, a method of performing pulse irradiation of light of the frequency $v_1$ is applicable. For example, the excitation light and the emitted photon from the broker qubit can be temporally separated. When performing pulse irradiation of the light of the frequency $v_1$, for example, pulse irradiation of light of the frequencies $v_2$, $v_3$, and $v_4$ is performed synchronously with the light of the frequency $v_1$. For example, the unintended incidence of light on the light detecting part 45 when detecting the photon can be suppressed thereby. Or, for example, the light of the frequencies $v_2$, $v_3$, and $v_4$ is not irradiated while detecting the photons of the measurement and the initialization relating to the Z-measurement qubit and the X-measurement qubit of the cycle of the surface code. An operation in which the light of the frequencies $v_2$, $v_3$, and $v_4$ is necessary is performed to not overlap the time in which the detection of the photon is performed.

In these embodiments, the surface code which is a high performance error correction technique can be implemented. For example, the operation of the surface code is simple. For example, the irradiation position of the electromagnetic wave 50W (at least one of the light, the microwave, or the radio wave) that is irradiated when initializing, operating, and observing the qubits may not be aligned with the positions of the multiple qubit pairs 10p. For example, the frequency of the electromagnetic wave 50W that is irradiated may not be matched to the resonant frequency of each of the multiple qubit pairs 10p. For example, the electromagnetic wave 50W may be irradiated on the entire group of the qubits. Generally, the necessary numbers of light rays and frequencies increase as the number of qubits increases. Therefore, the device becomes more complex and larger. According to the embodiment, a more complex and larger device can be suppressed.

According to the embodiment, one of the multiple qubit pairs 10p includes the two physical systems 10s (referring to FIG. 5A). One of the two physical systems 10s includes the first, second, and third quantum states. The transition between the second quantum state and the third quantum state is changed by the electric field applied by the multiple electrodes 40E.

For example, the electromagnetic wave irradiation part 50D is configured to perform a first operation and a second operation. In the first operation, the electromagnetic wave irradiation part 50D irradiates a first electromagnetic wave on the multiple qubit pairs 10p. In the second operation, the electromagnetic wave irradiation part 50D irradiates a second electromagnetic wave on the multiple qubit pairs 10p. One of the multiple qubit pairs 10p includes the two physical systems 10s. One of the two physical systems 10s includes the first, second, and third quantum states. For example, the transition between the first quantum state and the second quantum state resonates with the first electromagnetic wave. The transition between the second quantum state and the third quantum state resonates with the second electromagnetic wave. For example, the first quantum state and the second quantum state correspond to a qubit.

Thus, according to the embodiment, one of the two physical systems 10s includes two or more quantum states. The two or more quantum states can correspond to a qubit.

For example, one of the multiple qubit pairs 10p may include one of a first pair, a second pair, a third pair, a fourth pair, or a fifth pair.

The first pair includes an electron spin and a nuclear spin of a NV center of diamond. The second pair includes an electron spin of a NV center of diamond and a nuclear spin of $^{13}C$ at the vicinity of the NV center of diamond. In the example, the distance between the electron spin of the NV center of diamond and the nuclear spin of $^{13}C$ is short enough to have an interaction large enough to be used as a qubit. The third pair includes an electron spin and a nuclear spin of a NV center of SiC. The fourth pair includes an electron spin of a NV center of SiC and a nuclear spin of $^{13}C$ at the vicinity of the NV center of SiC. In the example, the distance between the electron spin of the NV center of SiC and the nuclear spin of $^{13}C$ is short enough to have an interaction large enough to be used as a qubit. The fifth pair includes an electron spin of $VV^0$ of SiC and a nuclear spin of $^{13}C$ at the vicinity of the $VV^0$ of SiC. In the example, the distance between the electron spin of $VV^0$ of SiC and the nuclear spin of $^{13}C$ is short enough to have an interaction large enough to be used as a qubit.

Several examples according to the embodiment will now be described.

First Example

Figure 20:
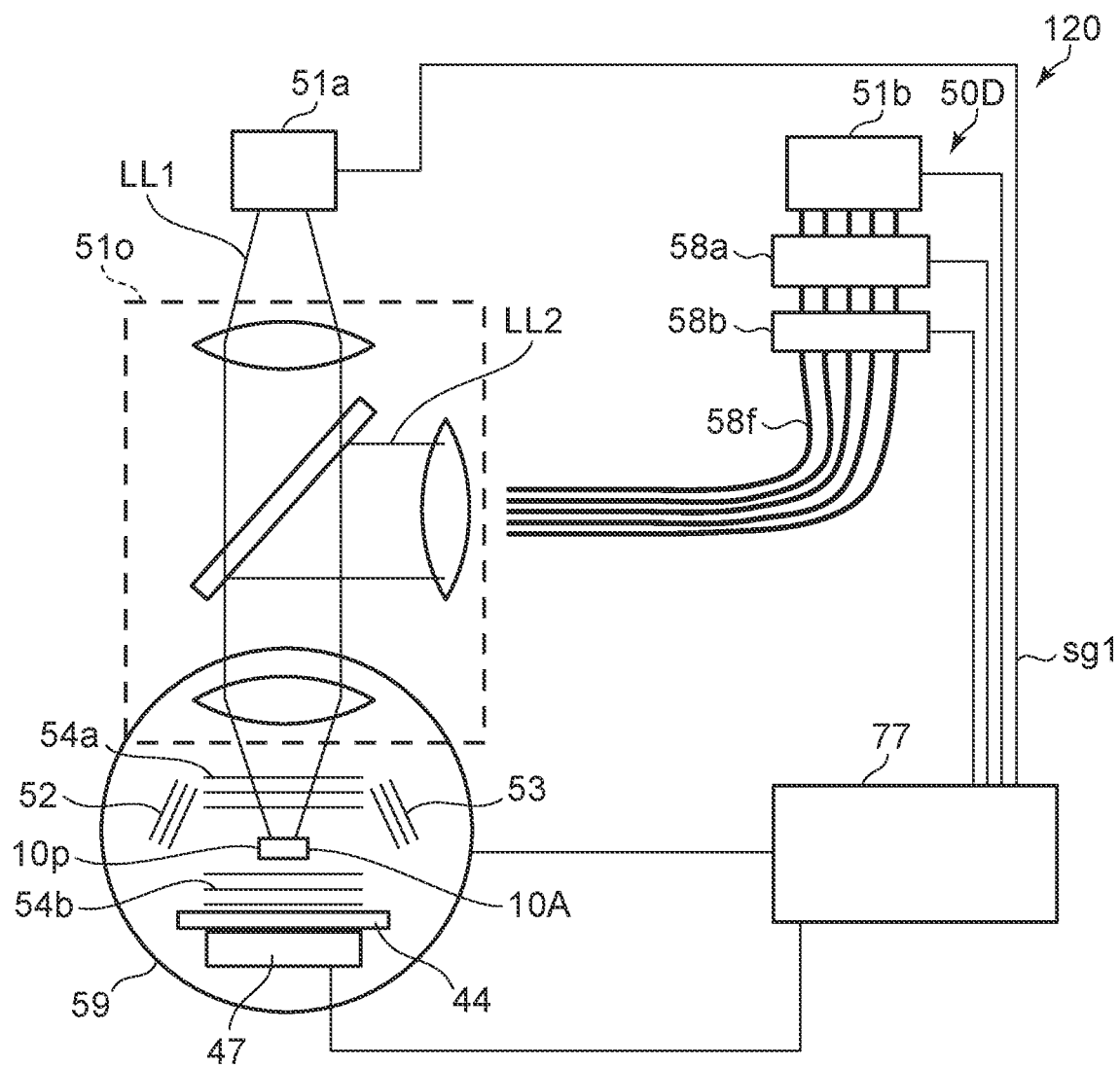
FIG. 20 is a schematic view illustrating an information processing device according to the first embodiment.

FIG. 20 is a schematic view illustrating an information processing device according to the first embodiment.

As shown in FIG. 20, the information processing device 120 includes a first laser light source 51a, a second laser light source 51b, a radio wave irradiation coil 52, a microwave irradiation coil 53, and a light detector 47 in addition to the qubit pair structure body 10A. For example, the first laser light source 51a, the second laser light source 51b, the radio wave irradiation coil 52, and the microwave irradiation coil 53 may be included in the electromagnetic wave irradiation part 50D. The information processing device 120 may include magnetic field application coils 54a and 54b. In the example, the information processing device 120 includes a first element part 58a and a second element part 58b. The first element part 58a includes, for example, an electro-optic effect element for frequency setting. The second element part 58b includes, for example, an acoustooptic effect element. For example, the acoustooptic effect element is configured to perform the setting of the light intensity and the switch operation of the light. The information processing device 120 may include an optical fiber 58f, a cut-off optical filter 44, an optical system 51, and a cryostat 59. The information processing device 120 may include a controller 77.

In the example, the multiple qubit pairs 10p of the qubit pair structure body 10A are located between the magnetic field application coil 54a and the magnetic field application coil 54b. In the example, the magnetic field application coil 54b is located between the light detector 47 and the multiple qubit pairs 10p.

The first laser light source 51a emits a first light LL1 (a first laser). The first light LL1 can initialize the charges of the multiple qubit pairs 10p included in the qubit pair structure body 10A. The wavelength of the first light LL1 is, for example, 532 nm. The first light that is emitted is irradiated on the entirety of the multiple qubit pairs 10p by the optical system 51o.

The second laser light source 51b outputs a second light LL2 (a second laser). The second light LL2 corresponds to light for the initialization and reading of the broker qubits. The wavelength of the second light LL2 is, for example, about 637 nm. The second light that is output is distributed into twenty-five optical fibers 58f and is output in an arrangement having a 5×5 square lattice shape.

The first element part 58a and the second element part 58b are located partway through each of the twenty-five optical fibers 58f. For example, the first element part 58a is utilized for frequency adjustment. Thereby, the laser can be caused to resonate with the desired transition of the qubits, etc. For example, light that has multiple frequency components can be output from one of the optical fibers 58f by the first element part 58a. The twenty-five lights that are output from the optical fiber 58f are guided to the qubit pair structure body 10A by the optical system 51o. The outputs from the twenty-five optical fibers 58f are imaged to be irradiated on the broker qubits of the qubit pairs 10p that are arranged in a 5×5 square lattice shape.

The radio wave irradiation coil 52 irradiates a radio wave on the qubit pair structure body 10A. The microwave irradiation coil 53 irradiates a microwave on the qubit pair structure body 10A. The microwave irradiation coil 53 may be a horn antenna for microwave irradiation.

The cut-off optical filter 44 is configured to shield the light from the first laser light source 51a and the second laser light source 51b. Thereby, the photons that are emitted from the broker qubits can be selectively incident on the light detector 47. The light detector 47 performs photon counting of the photons emitted from the broker qubit and supplies a signal of the photon counting to the controller 77.

The controller 77 is configured to supply a control signal sg1 to the first laser light source 51a, the second laser light source 51b, the first element part 58a, the second element part 58b, the radio wave irradiation coil 52, the microwave irradiation coil 53, and the light detecting part 45.

The magnetic field application coil 54a, the magnetic field application coil 54b, radio wave irradiation coil 52, the microwave irradiation coil 53, the cut-off optical filter 44, the light detector 47, the multiple qubit pairs 10p, and a portion of the optical system 51o are located in the cryostat 59. The temperature inside the cryostat 59 is maintained at 7 K. A magnetic field of 600 mT is applied to the qubit pair structure body 10A by the magnetic field application coils 54a and 54b.

Figure 21A:
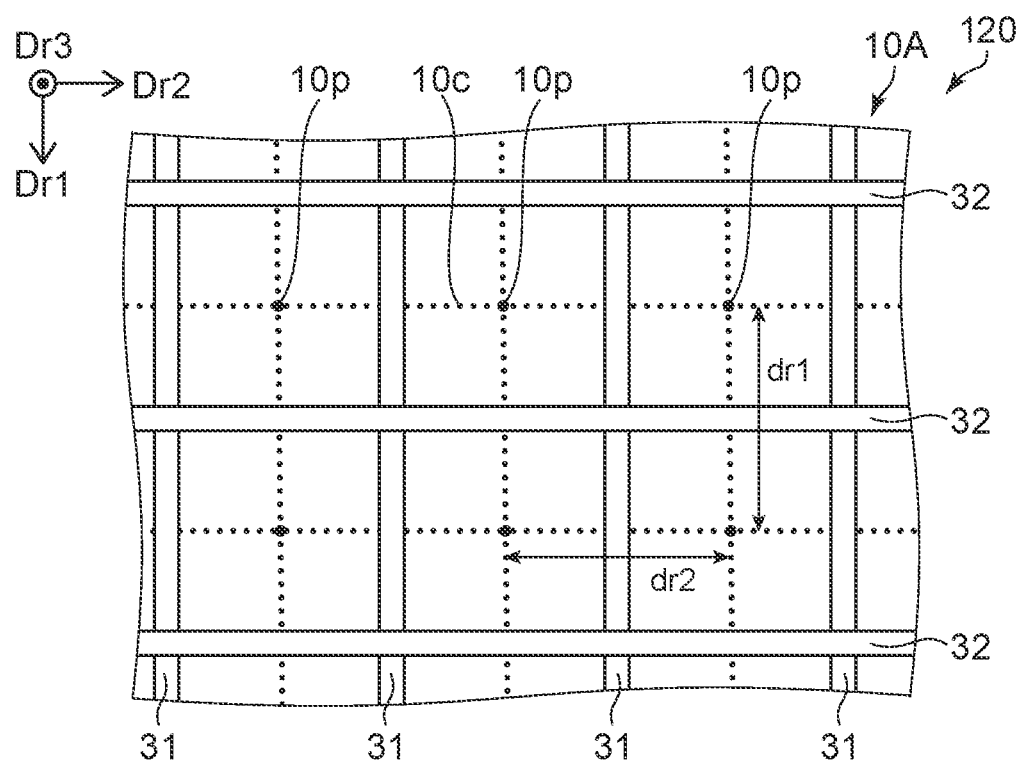
FIGS. 21A and 21B are schematic views illustrating the information processing device according to the first embodiment.
Figure 21B:
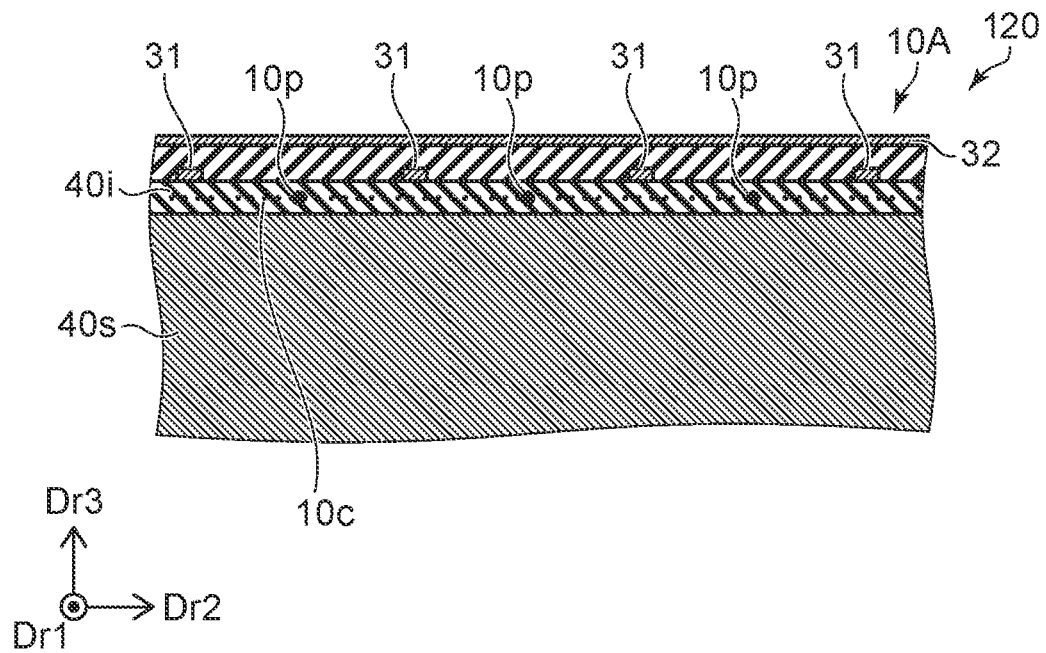

FIGS. 21A and 21B are schematic views illustrating the information processing device according to the first embodiment.

FIG. 21A is a plan view. FIG. 21B is a cross-sectional view.

The qubit pair structure body 10A includes a single crystal of high-purity diamond. The single crystal is substantially a 1 mm×1 mm×0.5 mm rectangular parallelepiped. A 1 mm×1 mm surface of the single crystal is a (1, 1, 1)-plane. NV centers that form the multiple qubit pairs 10p are located at the central portion of the 1 mm×1 mm surface. The multiple qubit pairs 10p are arranged in a 5×5 square lattice shape. A distance dr1 along the first direction Dr1 of the multiple qubit pairs 10p is substantially 1 μm. A distance dr2 along the second direction Dr2 of the multiple qubit pairs 10p is substantially 1 μm. The spin chain 10c is located between the multiple qubit pairs 10p. The spin chain 10c includes electron spins of multiple $^{15}$N. One of the columns of the electron spins of the multiple $^{15}$N is arranged along the first direction Dr1. Another one of the columns of the electron spins of the multiple $^{15}$N is arranged along the second direction Dr2. The electron spins of the multiple $^{15}$N are located between two NV centers.

The multiple first conductive members 31 and the multiple second conductive members 32 are provided. One of the multiple qubit pairs 10p is located in one of the multiple regions of the lattice shape formed by these conductive members. The position of one of the multiple qubit pairs 10p corresponds to the position of the center of one of the multiple regions of the lattice shape.

FIG. 21A illustrates six multiple regions of the lattice shape. The states of the nuclear spin of the NV center correspond to a memory qubit. The states of the electron spin correspond to a broker qubit.

Currents that have alternately opposite orientations are supplied to the multiple first conductive members 31. Currents that have alternately opposite orientations are supplied to the multiple second conductive members 32. The currents that flow in the multiple first conductive members 31 and the multiple second conductive members 32 are, for example, not less than 220 nA. These currents may be, for example, about 1 mA. In the example, these currents are 880 μA.

For example, the qubit pair structure body 10A is made as follows. The relationships of the multiple positions are described by "above, below, leftward, and rightward" in the plan views hereinbelow.

FIGS. 22A to 22D are schematic plan views illustrating a method for manufacturing the information processing device according to the first embodiment.

Figure 22A:
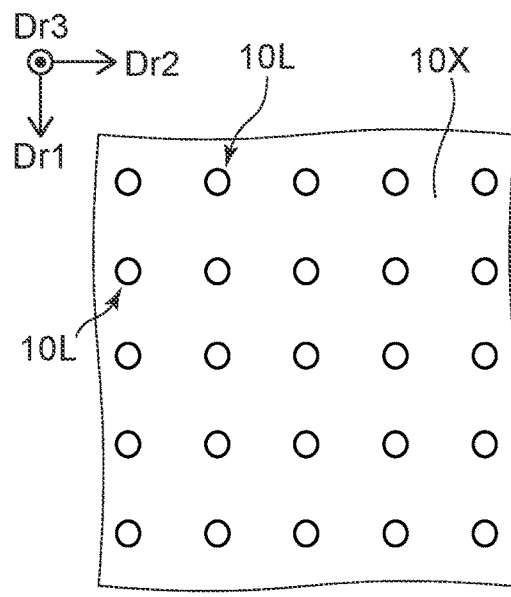
FIGS. 22A to 22D are schematic plan views illustrating a method for manufacturing the information processing device according to the first embodiment.

A single crystal 10X is prepared as shown in FIG. 22A. For example, the single crystal 10X corresponds to the base body 40s (referring to FIG. 21B). The single crystal 10X is substantially a 1 mm×1 mm×0.5 mm rectangular parallelepiped. A 1 mm×1 mm surface is the (1, 1, 1)-plane. The single crystal 10X is a single crystal of high-purity diamond. Columns of multiple $^{15}$N are formed by ion implantation through the 1 mm×1 mm surface. The depth of the columns of the multiple $^{15}$N is, for example, about 50 nm. Multiple lattice points 10L are formed by the columns of the multiple $^{15}$N. The spacing (the pitch) along the first direction Dr1 between the multiple lattice points 10L is 1 μm. The spacing (the pitch) along the second direction Dr2 between the multiple lattice points 10L is 1 μm.

Figure 22B:
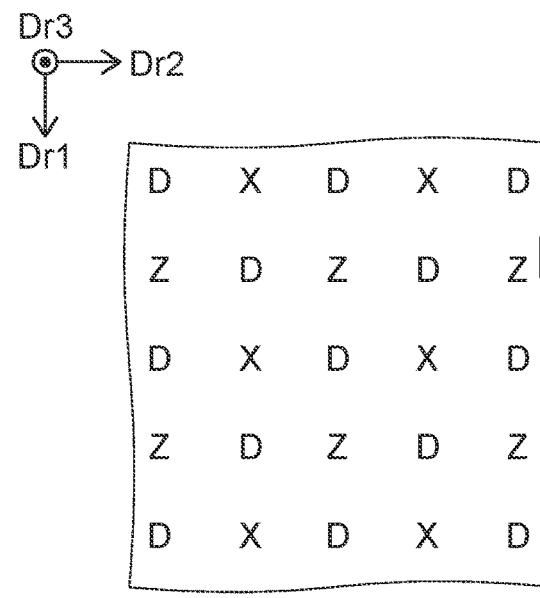

As shown in FIG. 22B, the multiple lattice points 10L are taken as "Z-points", "X-points", and "D-points". The multiple $^{15}$N are provided to correspond respectively to the multiple "Z-points", the multiple "X-points", and the multiple "D-points".

A condensed short pulse laser is irradiated on the Z-points, the X-points, and the D-points. The wavelength of the short pulse laser is about 790 nm. Lattice vacancies at the vicinity of the $^{15}$N are formed at the Z-points, the X-points, and the D-points by the irradiation of the short pulse laser.

A short-pulse column is irradiated with a low laser intensity. Annealing is performed thereby. The lattice vacancies and the $^{15}$N are combined thereby. Thereby, NV centers are formed at the Z-points, the X-points, and the D-points.

For example, 100, 90, 80, and 70 $^{15}$N are arranged at uniform spacing respectively between the Z-point and the D-points that are adjacent to the Z-point above, leftward, rightward, and below the Z-point. 100, 90, 80, and 70 $^{15}$N are arranged at uniform spacing respectively between the X-point and the D-points that are adjacent to the X-point above, leftward, rightward, and below the X-point.

The distances between the NV centers of the Z-point, the X-point, and the D-point to the $^{15}$N adjacent to each NV center are 20 nm. The multiple $^{15}$N that are arranged in one column at uniform spacing become the spin chains 10c that link the multiple NV centers. The spin chains 10c that are above, leftward, rightward, and below each Z-point and X-point respectively include eigenenergies of 5.3 kHz, 7.1 kHz, 10.1 kHz, and 12.6 kHz. These eigenenergies correspond to modes of k=49, k=43, k=37, and k=31.

Figure 22C:
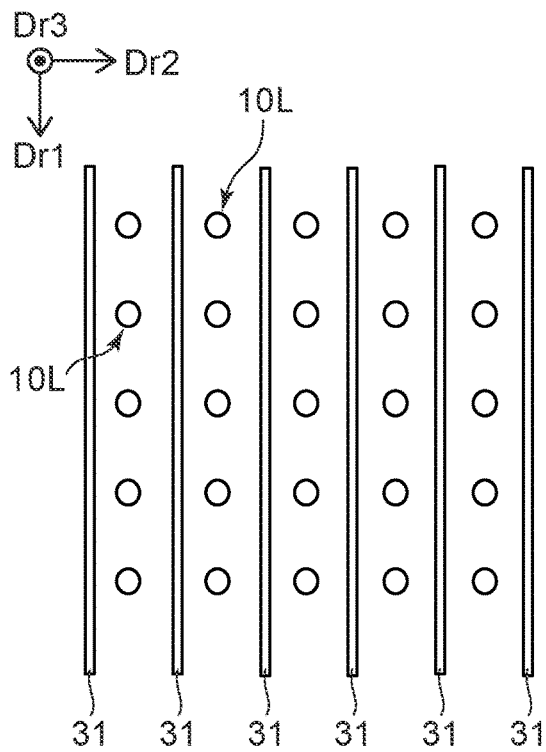

The multiple first conductive members 31 are formed as shown in FIG. 22C. A SiO$_2$ film that is used to form at least a portion of the intermediate member 40i is formed. The thickness of the SiO$_2$ film is, for example, 150 nm.

Figure 22D:
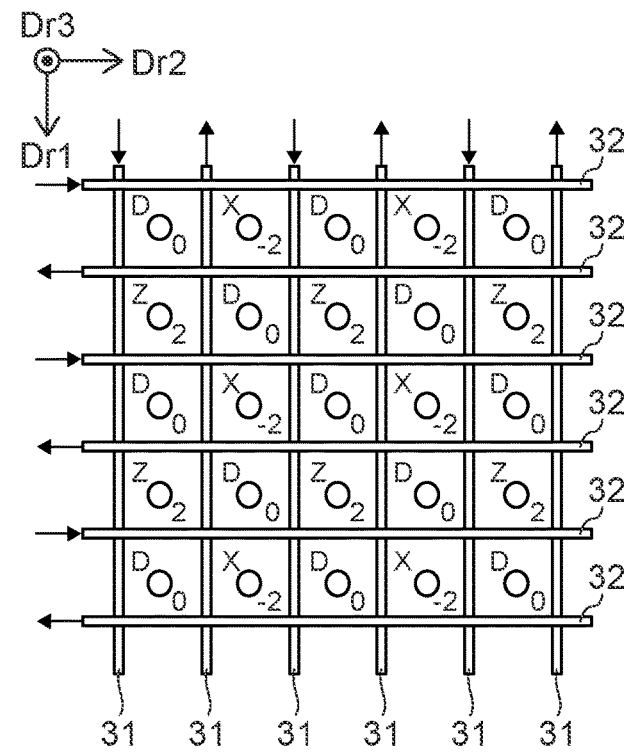

As shown in FIG. 22D, the multiple second conductive members 32 also are formed. The multiple second conductive members 32 are, for example, copper fine wires. The width of the multiple second conductive members 32 is, for example, about 100 nm. The thickness of the multiple second conductive members 32 is, for example, about 50 nm. The multiple second conductive members 32 may be formed by forming multiple trenches, filling a conductive material into the trenches, and dividing the conductive materials by CMP, etc.

The cross section of the copper fine wire is, for example, substantially rectangular. For example, the lengths of the sides parallel to the diamond surface in the cross section of the copper fine wire are 100 nm. The lengths of the sides perpendicular to the diamond surface are 50 nm.

The multiple first conductive members 31 and the multiple second conductive members 32 may include at least one selected from the group consisting of copper, silver, conductive silicon, carbon nanotube, and graphene.

As shown in FIG. 22D, for example, currents that have alternately opposite orientations are supplied to the multiple first conductive members 31. Currents that have alternately opposite orientations are supplied to the multiple second conductive members 32.

FIG. 22D illustrates an example in which the "Z-point", the "X-point", and the "D-point" are in regions inside the lattice. The values of the magnetic field offset formed by the current are labeled as "0", "2", and "−2" in the regions inside the lattice.

Figure 23:
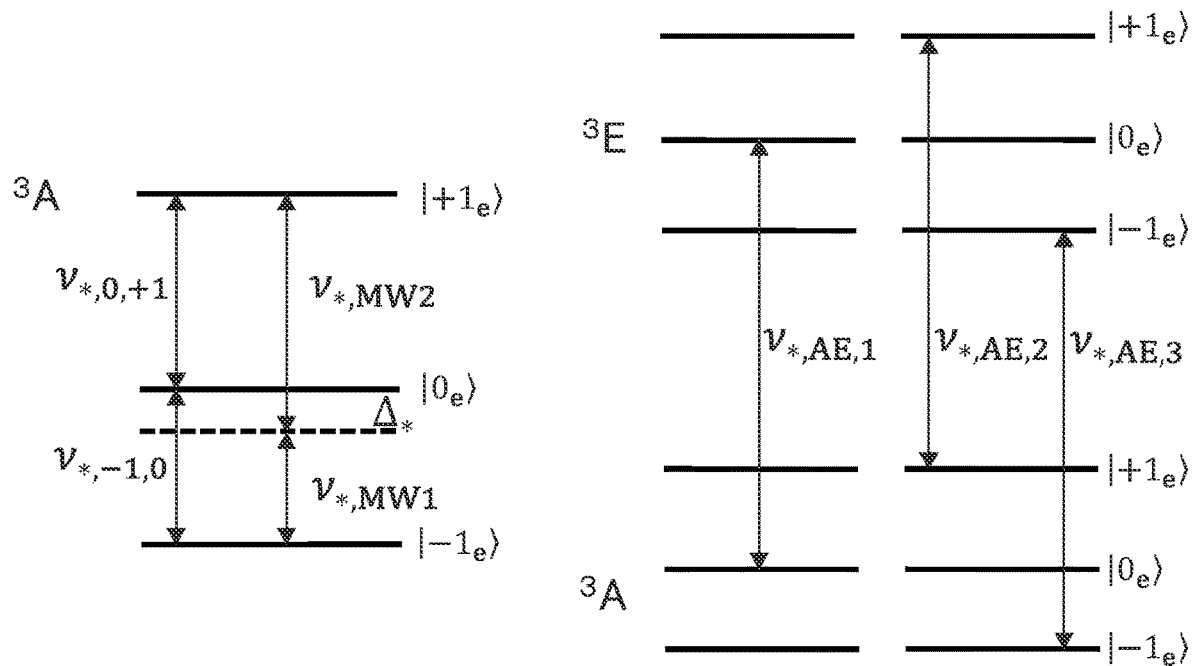
FIG. 23 is a schematic view illustrating operations of the information processing device according to the first embodiment.

FIG. 23 is a schematic view illustrating operations of the information processing device according to the first embodiment.

FIG. 23 shows an example of operations of the information processing device 120.

The three energy states of the $^3$A state of the electron spin at the D-point correspond to $|-1_e\rangle$, $|0_e\rangle$, and $|+1_e\rangle$. The transition between $|-1_e\rangle$ and $|0_e\rangle$ is taken as $\nu_{D,-1,0}$. The transition between $|0_e\rangle$ and $|+1_e\rangle$ is taken as $\nu_{D,0,+1}$. The transition frequency between $|0_e\rangle$ of the $^3$A state and $|0_e\rangle$ of the $^3$E state is taken as $\nu_{D,AE,1}$. The transition frequency between $|+1_e\rangle$ of the $^3$A state and $|+1_e\rangle$ of the $^3$A state is taken as $\nu_{D,AE,2}$. The transition frequency between $|-1_e\rangle$ of the $^3$A state and $|-1_e\rangle$ of the $^3$E state is taken as $\nu_{D,AE,3}$.

The symbols that relate to the transition frequencies are set similarly for the transitions between the three energy states of the $^3$A state and the transitions between the three energy states of the $^3$A state and the three energy states of the $^3$E state of the electron spin at the Z-point. The symbols that relate to the transition frequencies are set similarly for the transitions between the three energy states of the $^3$A state and the transitions between the three energy states of the $^3$A state and the three energy states of the $^3$E state of the electron spin at the X-point.

A magnetic field that is due to the currents flowing in the multiple first conductive members 31 and the multiple second conductive members 32 is applied to the multiple qubit pairs 10p. The transitions of the electron spins of the Z-point and the X-point are shifted. The transition frequency $\nu_{Z,-1,0}$ is greater than the transition frequency $\nu_{D,-1,0}$; and the difference is about 40 MHz. The transition frequency $\nu_{X,0,+1}$ is less than the transition frequency $\nu_{D,0,+1}$; and the difference is about 40 MHz.

Two microwaves are considered as shown in FIG. 23. The two microwaves have two-photon resonance with the $^3$A state of the electron spin at the D-point. The frequencies of the two microwaves are $\nu_{D,MW1}$ and $\nu_{D,MW2}$. $\nu_{D,MW1}+\nu_{D,MW2}=\nu_{D,-1,0}+\nu_{D,0,+1}$. $\nu_{D,MW1}=\nu_{D,-1,0}-\Delta_D$.

Two microwaves that have two-photon resonance with the $^3$A state of the electron spin at the Z-point are considered. The frequencies of the two microwaves are $\nu_{Z,MW1}$ and $\nu_{Z,MW2}$. $\nu_{Z,MW1}+\nu_{Z,MW2}=\nu_{Z,-1,0}+\nu_{Z,0,+1}$. $\nu_{Z,MW1}=\nu_{X,-1,0}-\Delta Z$.

Two microwaves that have two-photon resonance with the $^3$A state of the electron spin at the X-point are considered. The frequencies of the two microwaves are $\nu_{X,MW1}$ and $\nu_{X,MW2}$. $\nu_{X,MW1}+\nu_{X,MW2}=\nu_{X,-1,0}+\nu_{X,0,+1}$. $\nu_{X,MW1}=\nu_{X,-1,0}-\Delta_X$.

In FIG. 23, "*" in the labels of $\nu_{*,0,+1}$, etc., are one of "X", "Z", or "D". Such notation is employed for the transition frequency of the electron spin at the "*-point" and the frequency of the microwave acting on the electron spin at the "*-point".

Figure 24:
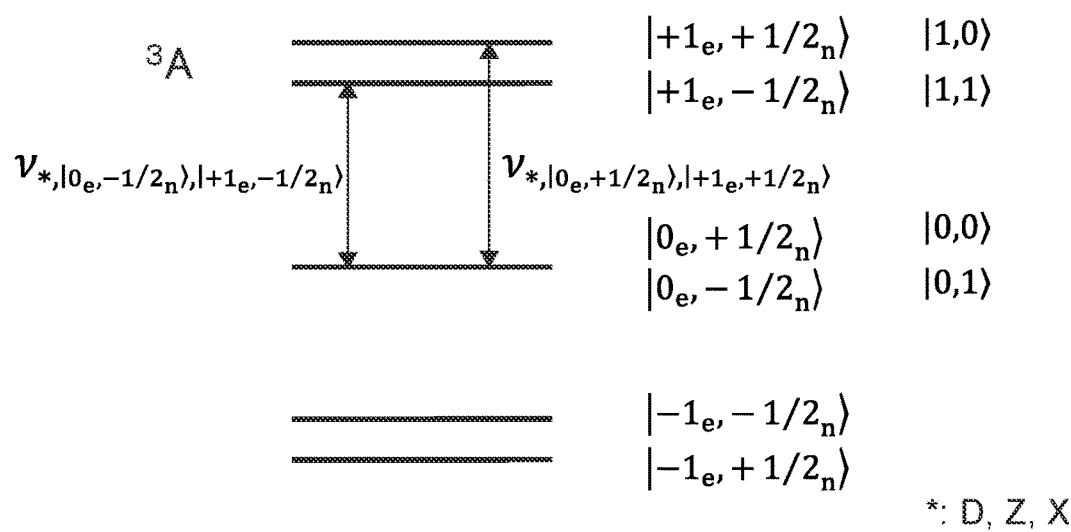
FIG. 24 is a schematic view illustrating an operation of the information processing device according to the first embodiment.

FIG. 24 is a schematic view illustrating an operation of the information processing device according to the first embodiment.

FIG. 24 shows an example of an operation of the information processing device 120.

For the transition that is decomposed into the states of the nuclear spin of the NV center as shown in FIG. 24, the transition frequency between $|0_e, -\frac{1}{2}_n\rangle$ and $|+1_e, -\frac{1}{2}_n\rangle$ of the $^3$A state of the NV center at the D-point is taken as $\nu_{D,|0e,-1/2n\rangle,|+1e,-1/2n\rangle}$. The transition frequency between $|0_e,+\frac{1}{2}_n\rangle$ and $|+1_e,+\frac{1}{2}_n\rangle$ is taken as $\nu_{D,|0e,+1/2n\rangle,|+1e,+1/2n\rangle}$. The symbols that relate to the transition frequencies are set similarly for the NV centers at the Z-point and the X-point as well.

In the first example, for example, an operation such as the following is sequentially performed.

The charges of the NV centers are initialized to "−1" by irradiating light from the first laser light source 51a on the multiple qubit pairs 10p. Light that is output from the second laser light source 51b is irradiated on the multiple qubit pairs 10p. This light has a frequency of $\nu_{D,AE,2}$, $\nu_{D,AE,3}$, $\nu_{Z,AE,2}$, $\nu_{Z,AE,3}$, $\nu_{X,AE,2}$, and $\nu_{X,AE,3}$. For example, the $^3$A states of all of the broker qubits are set to $|0_e\rangle$.

Subsequently, a microwave is irradiated on the multiple qubit pairs 10p by the microwave irradiation coil 53. The frequency of the microwave is $\nu_{D,|0e,-1/2n\rangle,|+1e,-1/2n\rangle}$. The microwave corresponds to the π-pulse on the broker qubit of the D-point. At this time, the light that is irradiated on the D-points other than one D-point has the frequency $\nu_{D,AE,2}$ and has an intensity that is 10 times the intensity of the light when the broker qubit is set to $|0_e\rangle$. The effects of the microwave on the broker qubits of the other D-points are suppressed thereby.

Subsequently, light that is output from the second laser light source 51b is irradiated the broker qubit of the one D-point. The frequency of the light is $\nu_{D,AE,1}$. The irradiation is performed in one time. If a photon is not detected by the light detector 47, a radio wave is irradiated on the multiple qubit pairs 10p by the radio wave irradiation coil 52. For example, a frequency $\nu_{RF}$ of the radio wave satisfies $\nu_{RF}=\nu_{D,|0e,+1/2n\rangle,|+1e,+1/2n\rangle}-\nu_{D,|0e,-1/2n\rangle,|+1e,-1/2n\rangle}$. The radio wave corresponds to the π-pulse for the transition between $|-\frac{1}{2}_n\rangle$ and $|+\frac{1}{2}_n\rangle$ of the memory qubit.

Subsequently, the microwave is irradiated on the multiple qubit pairs 10p. The frequency of the microwave is $\nu_{D,|0e,-1/2n\rangle,|+1e,-1/2n\rangle}$. The microwave corresponds to the π-pulse for the broker qubit of the D-point. At this time, the light that is irradiated on the D-points other than the one D-point has the frequency $\nu_{D,AE,2}$ and has an intensity that is 10 times the intensity of the light when setting the broker qubit to $|0_e\rangle$. The effects of the microwave on the broker qubits of the other D-points are suppressed thereby.

The time of the irradiation (the one time described above) is, for example, 50 μsecond. Thus, the memory qubit of the D-point is initialized to $|+\frac{1}{2}_n\rangle(=|0\rangle)$. Similarly, the memory qubits of the remaining twelve D-points are sequentially initialized to $|+\frac{1}{2}_n\rangle(=|0\rangle)$. The memory qubits of the six Z-points and the qubits of the six X-points also are similarly initialized to $|+\frac{1}{2}_n\rangle(=|0\rangle)$.

Subsequently, one of the Z-points of FIG. 22D is taken as a Z1-point. The D-point that is positioned directly above the Z1-point is taken as a D1-point. One of the X-points is taken as an X1-point. One other D-point that is adjacent to the X1-point above the X1-point is taken as a D2-point. A π-pulse microwave of the frequency $\nu_{D,0,+1}$ is irradiated on the D-points other than the D1-point and the D2-point while irradiating an intense light of the frequency $\nu_{D,AE,2}$. A radio wave of F also is irradiated. Thereby, the memory qubits of the D1-point and D2-point are selectively set to $|-\frac{1}{2}_n\rangle(=|1\rangle)$. Subsequently, the broker qubit is reset to $|0_e\rangle$ by irradiating a π-pulse microwave of the frequency $\nu_{D,0,+1}$. The irradiation of the intense light of the frequency $\nu_{D,AE,2}$ on the D-points other than the D1-point and the D2-point is continued.

Subsequently, the $C_eNOT_n$ gate and the $C_nNOT_e$ gate operate simultaneously in parallel for the qubit pairs 10p of the Z-point and the X-point. In the $C_eNOT_n$ gate, a π-pulse irradiation of a radio wave of the frequency of $\nu_{RF}$ is performed. In the $C_nNOT_e$ gate, a π/2-pulse that has two frequencies of $\nu_{Z,0,+1}$ and $\nu_{X,0,+1}$ is irradiated. Then, the second $C_eNOT_n$ gate operates. In the second $C_eNOT_n$ gate, a second π-pulse of a radio wave of $\nu_{RF}$ is irradiated. Thereby, the SWAP gate operates between the memory qubit and the broker qubit for each of the Z-point and the X-point.

Subsequently, a microwave of the six frequencies of $\nu_{Z,MW1}$, $\nu_{Z,MW2}$, $\nu_{X,MW1}$, $\nu_{X,MW2}$, $\nu_{D,MW1}$, and $\nu_{D,MW2}$ is irradiated by the microwave irradiation coil 53. The time of the irradiation is, for example, 6.3 ms. In the irradiation, for example, $\Delta_D = \Delta_Z = \Delta_X = 5.3$ kHz. SWAP gates are performed by the microwave irradiation between the broker qubits of the Z-point and the X-point and the broker qubits of the D-points directly above the Z-point and the X-point.

Subsequently, two $\pi/2$-pulses that have the frequency of $\nu_{D,0,+1}$ are irradiated while irradiating an intense light of the frequency $\nu_{D,AE,2}$ on the D-point adjacent to the X-point above the X-point. The $C_nNOT_e$ gate of the D-point directly above the Z-point is performed thereby.

Subsequently, a $\pi$-pulse of a radio wave that has the frequency of $\nu_{RF}$ is irradiated while irradiating an intense light of the frequency $\nu_{D,AE,2}$ on the D-point directly above the Z-point. Thereby, the $C_eNOT_n$ gate operates on the D-point directly above the X-point.

Subsequently, a microwave that has the six frequencies of $\nu_{Z,MW1}$, $\nu_{Z,MW2}$, $\nu_{X,MW1}$, $\nu_{X,MW2}$, $\nu_{D,MW1}$, and $\nu_{D,MW2}$ is irradiated. The time of the irradiation is, for example, 6.3 ms. In the irradiation, for example, $\Delta_D = \Delta_Z = \Delta_X = 5.3$ kHz. The SWAP gates are performed by the microwave irradiation between the broker qubits of the Z-point and the X-point and the broker qubits of the D-points directly above the Z-point and the X-point.

Subsequently, the $C_eNOT_n$ gate that relates to the qubit pairs of the Z-point and the X-point is performed. In the $C_eNOT_n$ gate, a $\pi$-pulse of a radio wave that has the frequency of $\nu_{RF}$ is irradiated. Also, the $C_nNOT_e$ gate is performed. In the $C_nNOT_e$ gate, two $\pi/2$-pulses are irradiated for each frequency of $\nu_{Z,0,+1}$ and $\nu_{X,0,+1}$. The second $C_eNOT_n$ gate is performed. In the second $C_eNOT_n$ gate, the second $\pi$-pulse of the radio wave having the frequency of $\nu_{RF}$ is irradiated. Thus, the SWAP gate operates between the memory qubit and the broker qubit for each of the Z-point and the X-point.

By the operations described above, for example, the $C_DNOT_Z$ gate and the $C_XNOT_D$ gate operate. In the $C_DNOT_Z$ gate, the memory qubit of the Z-point is the target qubit; and the qubit of the D-point adjacent to the Z-point above the Z-point is the controlled qubit. In the $C_XNOT_D$ gate, the memory qubit of the X-point is the controlled qubit; and the qubit of the D-point adjacent to the X-point above the X-point is the target qubit.

Subsequently, a microwave is irradiated on the multiple qubit pairs 10p by the microwave irradiation coil 53. The frequencies of the microwave are $\nu_{D,|0e,-1/2n>,|+1e,-1/2n>}$, $\nu_{Z,|0e,-1/2n>, +1e,-1/2n>}$, and $\nu_{X,|0e,-1/2n>,|+1e,-1/2n>}$. The microwaves each correspond to the $\pi$-pulse for the broker qubits of the D-point, the Z-point, and the X-point.

Subsequently, the light that is output from the second laser light source 51b is sequentially irradiated on the broker qubits of the D-points. The frequency of the light is $\nu_{D,AE,1}$. The memory qubits of the D-points are sequentially read using the existence or absence of the detection of photons by the light detector 47.

Subsequently, the light irradiation is sequentially performed on the memory qubit of the Z-point and the memory qubit of the X-point; and reading by the light detector 47 is performed. The frequencies of the light are respectively $\nu_{Z,AE,1}$ and $\nu_{X,AE,1}$. The memory qubits of the reading are as follows. Namely, the D1-point is $|-\frac{1}{2}_n>(=|1>)$. The Z1-point is $|-\frac{1}{2}_n>(=|1>)$. The D2-point is $|-\frac{1}{2}_n>(=|1>)$. The X1-point is $|+\frac{1}{2}_n>(=|0>)$. The other lattice points are $|+\frac{1}{2}_n>(=|0>)$. The $C_DNOT_Z$ gate between the memory qubits is selectively performed for the Z-point and the D-point adjacent to the Z-point above the Z-point. The $C_XNOT_D$ gate between the memory qubits is selectively performed for the X-point and the D-point adjacent to the X-point above the X-point.

In the series of operations described above, a microwave that has the six frequencies of $\nu_{Z,MW1}$, $\nu_{Z,MW2}$, $\nu_{X,MW1}$, $\nu_{X,MW2}$, $\nu_{D,MW1}$, and $\nu_{D,MW2}$ is irradiated. In the irradiation, $\Delta_D$, $\Delta_Z$, $\Delta_X$, and the irradiation time are appropriately set. Thereby, selective CNOT gates can be similarly performed on the memory qubits of the D-points adjacent to the Z-point and the X-point leftward, rightward, and below the Z-point and the X-point.

A surface code is performed in which the memory qubits of the D-point, the Z-point, and the X-point are respectively a data qubit, a Z-measurement qubit, and an X-measurement qubit. The CNOT gate between the data qubit and the Z-measurement qubit that is to be synchronously performed at this time is synchronously performed. The CNOT gate between the data qubit and the X-measurement qubit is synchronously performed.

For example, the electron spin and the nuclear spin of the NV center of diamond are applied to the broker qubit and the memory qubit of the multiple qubit pairs 10p included in the qubit pair structure body 10A. For example, the electron spin of the NV center of diamond and the nuclear spin of $^{13}C$ at the vicinity of the NV center are applicable to the broker qubit and the memory qubit. For example, the electron spin and the nuclear spin of the NV center of SiC are applicable to the broker qubit and the memory qubit. For example, the electron spin of the NV center of SiC and the nuclear spin of $^{13}C$ at the vicinity of the NV center are applicable to the broker qubit and the memory qubit. For example, the electron spin of $VV^0$ of SiC and the nuclear spin of $^{13}C$ at the vicinity of $VV^0$ of SiC are applicable to the broker qubit and the memory qubit.

Second Example

In a second example, the qubit pair structure body 10A of the first example is replaced with the following qubit pair structure body 10A. Otherwise, the configuration of the second example may be the same as the configuration of the first example.

FIGS. 25A to 25D are schematic plan views illustrating a method for manufacturing the information processing device according to the first embodiment.

Figure 25A:
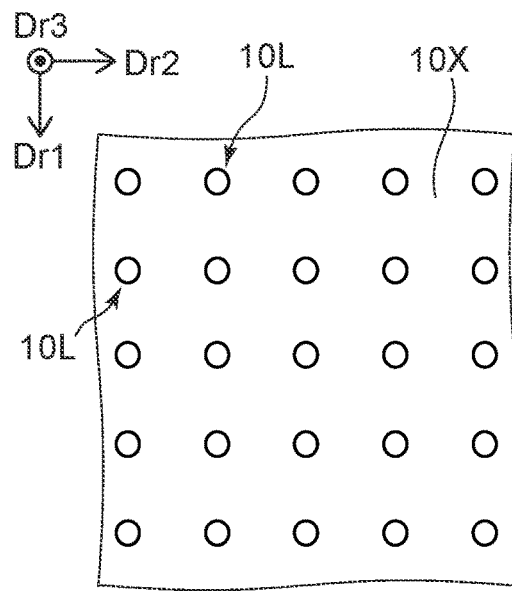
FIGS. 25A to 25D are schematic plan views illustrating a method for manufacturing the information processing device according to the first embodiment.

The single crystal 10X is prepared as shown in FIG. 25A. The single crystal 10X is substantially a 1 mm×1 mm×0.5 mm rectangular parallelepiped. A 1 mm×1 mm surface is the (1, 1, 1)-plane. Columns of multiple $^{15}N$ are formed.

Figure 25B:
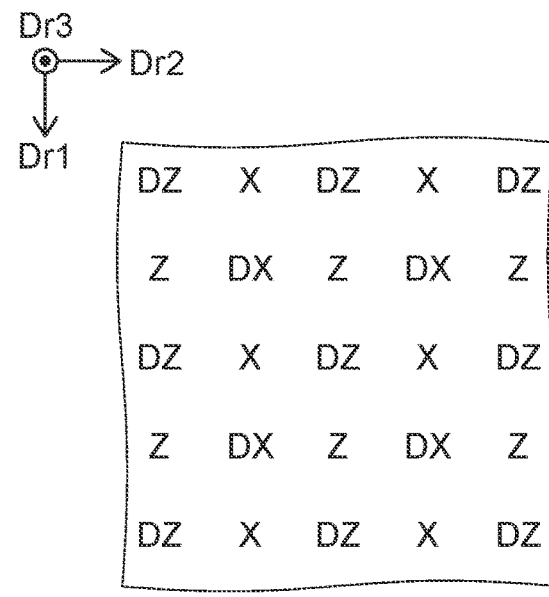

As shown in FIG. 25B, the multiple lattice points 10L are taken as a "Z-point", an "X-point", a "DZ-point", and a "DX-point". Lattice vacancies are formed by the irradiation of a short pulse laser at the vicinity of $^{15}N$ at the Z-point, the X-point, the DX-point, and the DZ-point. NV centers are formed at the Z-point, the X-point, the DX-point, and the DZ-point by the irradiation of a short-pulse column having a low laser intensity.

100, 90, 80, and 70 $^{15}N$ are arranged at uniform spacing between the DZ-points and the DX-points adjacent to the Z-point above, leftward, rightward, and below the Z-point.

70, 80, 90, and 100 $^{15}N$ are arranged at uniform spacing between the DZ-points and the DX-points adjacent to the X-point above, leftward, rightward, and below the X-point.

The distances between the NV centers of the Z-point, the X-point, the DZ-point, and the DX-point and the $^{15}N$ respectively adjacent to the NV centers are 20 nm. The spin chains 10c above, leftward, rightward, and below the Z-point respectively include eigenenergies of 5.3 kHz, 7.1 kHz, 10.1 kHz, and 12.6 kHz.

The spin chains 10c above, leftward, rightward, and below the X-point respectively include eigenenergies of 12.6 kHz, 10.1 kHz, 7.1 kHz, and 5.3 kHz.

Figure 25C:
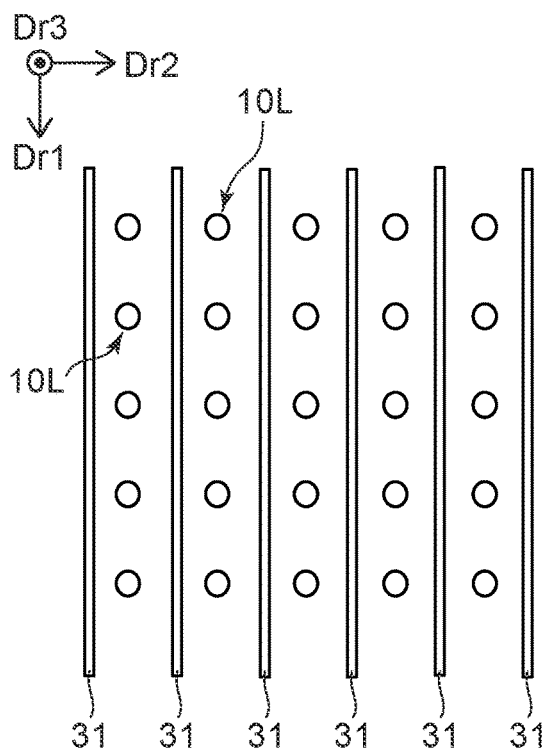
Figure 25D:
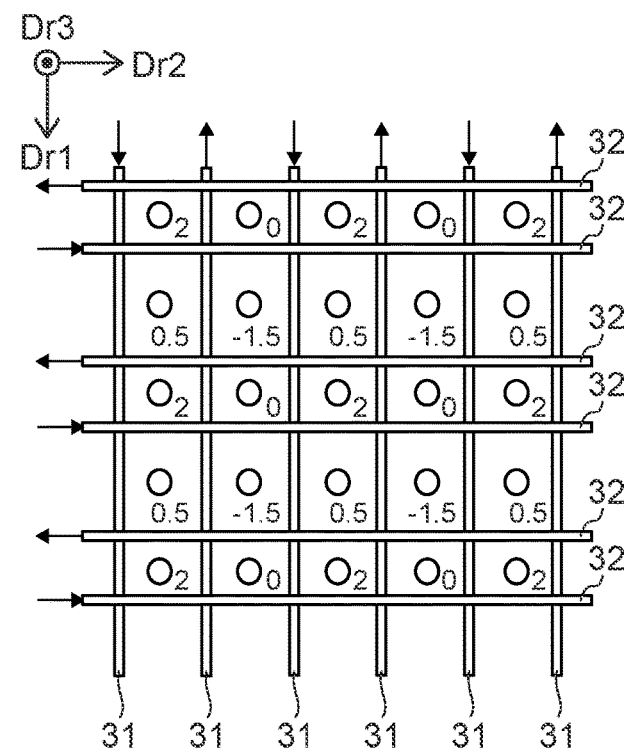

Subsequently, the multiple first conductive members 31 and the multiple second conductive members 32 are formed as shown in FIGS. 25C and 25D. The spacing (the pitch) of the multiple first conductive members 31 is 1 μm. The spacings (the pitches) of the multiple second conductive members 32 are a spacing of ⅔ μm and a spacing of 4/3 μm that are alternately arranged. The NV centers that are used to form the multiple qubit pairs 10p are located at the centers of the regions of the lattice shape formed by the multiple first conductive members 31 and the multiple second conductive members 32.

Currents that have alternately opposite orientations are supplied to the multiple first conductive members 31. Currents that have alternately opposite orientations are supplied to the multiple second conductive members 32. The magnitude of the current flowing in each of the multiple first conductive members 31 is, for example, about 660 μA. The magnitude of the current flowing in each of the multiple second conductive members 32 is, for example, about 440 μA.

For the three energy states $|-1_e\rangle$, $|0_e\rangle$, and $|+1_e\rangle$ of the $^3A$ state of the electron spin at the DZ-point, the transition frequency between $|-1_e\rangle$ and $|0_e\rangle$ and the transition frequency between $|0_e\rangle$ and $|+1_e\rangle$ are respectively taken as $\nu_{DZ,-1,0}$ and $\nu_{DZ,0,+1}$. The transition frequency between $|0_e\rangle$ of the $^3A$ state and $|0_e\rangle$ of the $^3E$ state is taken as $\nu_{DZ,AE,1}$. The transition frequency between $|+1_e\rangle$ of the $^3A$ state and $|+1_e\rangle$ of the $^3E$ state is taken as $\nu_{DZ,AE,2}$. The transition frequency between $|-1_e\rangle$ of the $^3A$ state and $|-1_e\rangle$ of the $^3E$ state is taken as $\nu_{DZ,AE,3}$.

For the three energy states $|-1_e\rangle$, $|0_e\rangle$, and $|+1_e\rangle$ of the $^3A$ state of the electron spin at the DX-point, the transition frequency between $|-1_e\rangle$ and $|0_e\rangle$ and the transition frequency between $|0_e\rangle$ and $|+1_e\rangle$ are respectively taken as $\nu_{DX,-1,0}$ and $\nu_{DX,0,+1}$. The transition frequency between $|0_e\rangle$ of the $^3A$ state and $|0_e\rangle$ of the $^3E$ state is taken as $\nu_{DX,AE,1}$. The transition frequency between $|+1_e\rangle$ of the $^3A$ state and $|+1_e\rangle$ of the $^3E$ state is taken as $\nu_{DX,AE,2}$. The transition frequency between $|-1_e\rangle$ of the $^3A$ state and $|-1_e\rangle$ of the $^3E$ state is taken as $\nu_{DX,AE,3}$.

Similarly to the first example, the symbols that relate to the transition frequencies are set for the transition between the three energy states of the $^3A$ state of the electron spin at the Z-point and the X-point as well. The symbols that relate to the transition frequencies are set for the transition between the three energy states of the $^3A$ state and the three energy states of the $^3E$ state as well.

The transitions of the electron spin of the Z-point, the DZ-point, and the DX-point are shifted by the magnetic field due to the current. $\nu_{Z,-1,0}$ is greater than $\nu_{X,-1,0}$; and the difference is about 7.5 MHz. $\nu_{Z,0,+1}$ is greater than $\nu_{X,0,+1}$; and the difference is about 7.5 MHz. $\nu_{DZ,-1,0}$ is greater than $\nu_{X,-1,0}$; and the difference is about 30 MHz. $\nu_{DZ,0,+1}$ is greater than $\nu_{X,0,+1}$; and the difference is about 30 MHz. $\nu_{DX,-1,0}$ is greater than $\nu_{X,-1,0}$; and the difference is about 22.5 MHz. $\nu_{DX,0,+1}$ is greater than $\nu_{X,0,+1}$; and the difference is about 22.5 MHz.

Two microwaves that have two-photon resonance with the $^3A$ state of the electron spin at the DZ-point are considered. The frequencies of the microwaves are $\nu_{DZ,MW1}$ and $\nu_{DZ,MW2}$. $\nu_{DZ,MW1}+\nu_{DZ,MW2}=\nu_{DZ,-1,0}+\nu_{DZ,0,+1}$. $\nu_{DZ,MW1}=\nu_{DZ2,-1,0}-\Delta_{DZ}$.

Similarly, two microwaves that have two-photon resonance with the $^3A$ state of the electron spin at the DX-point are considered. The frequencies of the microwaves are $\nu_{DX,MW1}$ and $\nu_{DX,MW2}$. $\nu_{DX,MW1}+\nu_{DX,MW2}=\nu_{DX,-1,0}+\nu_{DX,0,+1}$. $\nu_{DX,MW1}=\nu_{DX,-1,0}-\Delta_{DX}$.

Two microwaves (the frequencies of $\nu_{Z,MW1}$ and $\nu_{Z,MW2}$) that have two-photon resonance with the $^3A$ state of the electron spin at the Z-point are considered. The two microwaves (frequencies of $\nu_{X,MW1}$ and $\nu_{X,MW2}$) that have two-photon resonance with the $^3A$ state of the electron spin at the X-point also are considered.

For the transition that is decomposed to the states of the nuclear spin of the NV center, similarly to the first example, the transition frequency between $|0_e, -½_n\rangle$ and $|+1_e, -½_n\rangle$ of the $^3A$ state of the NV center at the DZ-point is taken as $\nu_{DZ,|0e,-1/2n\rangle,|+1e,-1/2n\rangle}$. The transition frequency between $|0_e, +½_n\rangle$ and $|+1_e, +½_n\rangle$ is taken as $\nu_{DZ,|0e,+1/2n\rangle,|+1e,+1/2n\rangle}$. The transition frequency between $|0_e, -½_n\rangle$ and $|+1_e, -½_n\rangle$ of the $^3A$ state of the NV center at the DX-point is taken as $\nu_{DX,|0e,-1/2n\rangle,|+1e,-1/2n\rangle}$. The transition frequency between $|0_e, +½_n\rangle$ and $|+1_e, +½_n\rangle$ is taken as $\nu_{DX,|0e,+1/2n\rangle,|+1e,+1/2n\rangle}$. The symbols that relate to the transition frequencies are similarly set for the NV centers at the Z-point and the X-point as well.

In the second example, operations such as the following are sequentially performed.

The charges of the NV centers are initialized to −1 by irradiating the light from the first laser light source 51a on the multiple qubit pairs 10p. The light that is output from the second laser light source 51b is irradiated on the multiple qubit pairs 10p. The frequency of the light output from the second laser light source 51b has the components of the frequencies $\nu_{DZ,AE,2}$, $\nu_{DZ,AE,3}$, $\nu_{DX,AE,2}$, $\nu_{DX,AE,3}$, $\nu_{Z,AE,2}$, $\nu_{Z,AE,3}$, $\nu_{X,AE,2}$, and $\nu_{X,AE,3}$. The $^3A$ states of all of the broker qubits are $|0_e\rangle$.

A microwave is irradiated on the multiple qubit pairs 10p by the microwave irradiation coil 53. The microwave includes the frequency $\nu_{DZ,|0e,-1/2n\rangle,|+1e,-1/2n\rangle}$. The microwave corresponds to a π-pulse for the broker qubit of the DZ-point. The light that is irradiated at this time includes the frequency $\nu_{DZ,AE,2}$ and has an intensity that is 10 times the intensity of the light when the broker qubit is set to $|0_e\rangle$ at the DZ-points other than one DZ-point. The effects of the microwave on the broker qubits of the other DZ-points are suppressed thereby.

Subsequently, the light that is output from the second laser light source 51b is irradiated on the broker qubit of the one DZ-point. The light includes the frequency $\nu_{DZ,AE,1}$. If a photon is not detected by the light detector 47, a radio wave is irradiated. The radio wave includes the frequency $\nu_{RF}$. The frequency $\nu_{RF}=\nu_{DZ,|0e,+1/2n\rangle,|+1e,+1/2n\rangle} - \nu_{DZ,|0e,-1/2n\rangle,|+1e,-1/2n\rangle}$. The radio wave corresponds to a π-pulse for the transition between $|-½_n\rangle$ and $|+½_n\rangle$ of the memory qubit.

Subsequently, a microwave is irradiated on the multiple qubit pairs 10p. The microwave corresponds to a π-pulse for the broker qubit of the DZ-point. The light that is irradiated at this time includes the frequency $\nu_{DZ,AE,2}$ and has an intensity that is 10 times the intensity of the light when the broker qubit is set to $|0_e\rangle$ at the DZ-points other than the one DZ-point. The effects of the microwave on the broker qubits of the other DZ-points are suppressed thereby.

Thus, the memory qubit of the DZ-point is initialized to $|+½_n\rangle(=|0\rangle)$. Similarly, the memory qubits of the remaining twelve DZ-points and DX-points are sequentially initialized to $|+½_n\rangle(=|0\rangle)$. The memory qubits of the six Z-points and the qubits of the six X-points also are similarly initialized to $|+½_n\rangle(=|0\rangle)$.

One of the Z-points shown in FIG. 25B is taken as the Z1-point. The DZ-point adjacent to the Z1-point above the Z1-point is taken as a DZ1-point. One of the X-points is taken as the X1-point. Another D-point adjacent to the X1-point above the X1-point is taken as a DX1-point.

A π-pulse microwave is irradiated while irradiating an intense light on the DZ-points and the DX-points other than the DZ1-point and the DX1-point. The intense light includes the frequencies $v_{DZ,AE,2}$ and $v_{DX,AE,2}$. The π-pulse microwave includes the frequencies $v_{DZ,0,+1}$ and $v_{DX,0,+1}$. Also, the memory qubits of the DZ1-point and the DX1-point are selectively set to $|-\frac{1}{2}_n\rangle (=|1\rangle)$ by a π-pulse irradiation of a radio wave. The radio wave includes the frequency $v_{RF}$. Also, the broker qubit is reset to $|0_e\rangle$ by irradiating a π-pulse microwave. The π-pulse microwave includes the frequencies $v_{DZ,0,+1}$ and $v_{DX,0,+1}$. The operation of irradiating the intense light of the frequencies $v_{DZ,AE,2}$ and $v_{DX,AE,2}$ on the DZ-points and the DX-points other than the DZ1-point and the DX1-point is continued.

Subsequently, the $C_eNOT_n$ gate, the $C_nNOT_e$ gate, and the $C_eNOT_n$ gate operate simultaneously in parallel on the qubit pairs of the Z-point and the X-point. In the $C_eNOT_n$ gate, a π-pulse of a radio wave that has the frequency of $v_{RF}$ is irradiated. In the $C_nNOT_e$ gate, two π/2-pulses are irradiated at each frequency of $v_{Z,0,+1}$ and $v_{X,0,+1}$. The SWAP gate between the memory qubit and the broker qubit of each of the Z-point and the X-point is performed by such an operation.

Subsequently, a microwave that has eight frequency components is irradiated by the microwave irradiation coil 53. The eight frequencies are $v_{Z,MW1}$, $v_{Z,MW2}$, $v_{X,MW1}$, $v_{X,MW2}$, $v_{DZ,MW1}$, $v_{DZ,MW2}$, $v_{DX,MW1}$, and $v_{DX,MW2}$. In the irradiation, $\Delta_{DZ}=\Delta_Z=5.3$ kHz. $\Delta_{DX}=\Delta_X=12.6$ kHz. The microwave irradiation time of the frequencies of $v_{Z,MW1}$, $v_{Z,MW2}$, $v_{DZ,MW1}$, and $v_{DZ,MW2}$ is 6.3 ms. The irradiation time of the microwave of the frequencies of $v_{X,MW1}$, $v_{X,MW2}$, $v_{DX,MW1}$, and $v_{DX,MW2}$ is 5.6 ms. The SWAP gate between the broker qubit of the Z-point and the broker qubit of the DZ-point adjacent to the Z-point above the Z-point is performed by the irradiation of such a microwave. A SWAP gate between the broker qubit of the X-point and the broker qubit of the DX-point adjacent to the X-point above the X-point is performed. The $C_nNOT_e$ gate is caused to operate on the DZ-point by two π/2-pulse irradiations of the frequency of $v_{DZ,0,+1}$. For example, the $C_eNOT_n$ gate is caused to operate on the DX-point by a radio wave π-pulse irradiation of the frequency of $v_{RF}$ while irradiating an intense light of the frequency $v_{DZ,AE,2}$ on the DZ-point.

Subsequently, a microwave of eight frequencies is irradiated. The eight frequencies are $v_{Z,MW1}$, $v_{Z,MW2}$, $v_{X,MW1}$, $v_{X,MW2}$, $v_{DZ,MW1}$, $v_{DZ,MW2}$, $v_{DX,MW1}$, and $v_{DX,MW2}$. In the irradiation, $\Delta_{DZ}=\Delta_Z=5.3$ kHz. $\Delta_{DX}=\Delta_X=12.6$ kHz. The microwave irradiation time of the frequencies of $v_{Z,MW1}$, $v_{Z,MW2}$, $v_{DZ,MW1}$, and $v_{DZ,MW2}$ is 6.3 ms. The microwave irradiation time of the frequencies of $v_{X,MW1}$, $v_{X,MW2}$, $v_{DX,MW1}$, and $v_{DX,MW2}$ is 5.6 ms. The SWAP gate between the broker qubit of the Z-point and the broker qubit of the DZ-point adjacent to the Z-point above the Z-point is performed by such a microwave irradiation. The SWAP gate between the broker qubit of the X-point and the broker qubit of the DX-point adjacent to the X-point above the X-point is performed.

Subsequently, the $C_eNOT_n$ gate is caused to operate for the qubit pairs of the Z-point and the X-point by a π-pulse irradiation of a radio wave of the frequency of $v_{RF}$. The $C_nNOT_e$ gate is operated by the irradiation of two π/2-pulses. The frequencies of the two π/2-pulses are $v_{Z,0,+1}$ and $v_{X,0,+1}$. The $C_eNOT_n$ gate is operated by the second radio wave π-pulse of the frequency of $v_{RF}$. The SWAP gate between the memory qubit and the broker qubit of each of the Z-point and the X-point is performed thereby.

By the operations described above, the memory qubit of the Z-point is the target qubit in the $C_DNOT_Z$ gate on which the $C_DNOT_Z$ gate and the $C_XNOT_D$ gate operate. The qubit of the DZ-point adjacent to the Z-point above the Z-point is the controlled qubit. The memory qubit of the X-point is the controlled qubit. In the $C_XNOT_D$ gate, the qubit of the DX-point adjacent to the X-point above the X-point is the target qubit.

In the series of operations described above, $\Delta_{DZ}$, $\Delta_{DX}$, $\Delta_Z$, $\Delta_X$, and the irradiation time are adjusted in the microwave irradiation of the eight frequencies of $v_{Z,MW1}$, $v_{Z,MW2}$, $v_{X,MW1}$, $v_{X,MW2}$, $v_{DZ,MW1}$, $v_{DZ,MW2}$, $v_{DX,MW1}$, and $v_{DX,MW2}$. Thereby, the CNOT gate is selectively operated between the memory qubits of the Z-point and of the DZ-point and the DX-point adjacent to the Z-point leftward, rightward, and below the Z-point. The CNOT gate is selectively operated between the memory qubits of the X-point and of the DZ-point and the DX-point adjacent to the X-point leftward, rightward, and below the X-point.

Thus, the surface code and the CNOT gate can be synchronously performed. In the surface code, the memory qubits of the DZ-point and the DX-point are data qubits. In the surface code, the memory qubits of the Z-point and the X-point are respectively a Z-measurement qubit and an X-measurement qubit. In the CNOT gate, the CNOT gate operates between the data qubit and the Z-measurement qubit and between the data qubit and the X-measurement qubit.

Third Example

In a third example, the qubit pair structure body 10A of the first example is replaced with a qubit pair structure body 10A such as the following.

FIGS. 26A to 26D are schematic plan views illustrating a method for manufacturing the information processing device according to the first embodiment.

Figure 26A:
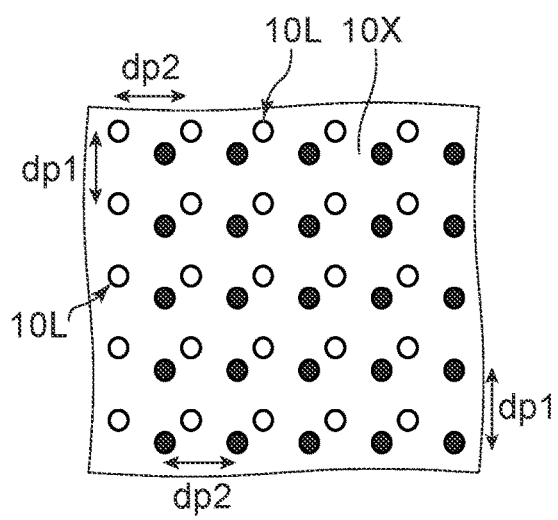
FIGS. 26A to 26D are schematic plan views illustrating a method for manufacturing the information processing device according to the first embodiment.

The single crystal 10X is prepared as shown in FIG. 26A. The single crystal 10X is substantially a 1 mm×1 mm×0.5 mm rectangular parallelepiped. A 1 mm×1 mm surface is the (1, 1, 1)-plane. Columns of multiple $^{15}$N are formed. The multiple $^{15}$N are in two square lattices. The spacings (pitches: spacings dp1 and dp2) of the lattice points of the two lattices are 5/3 μm in two directions.

Figure 26B:
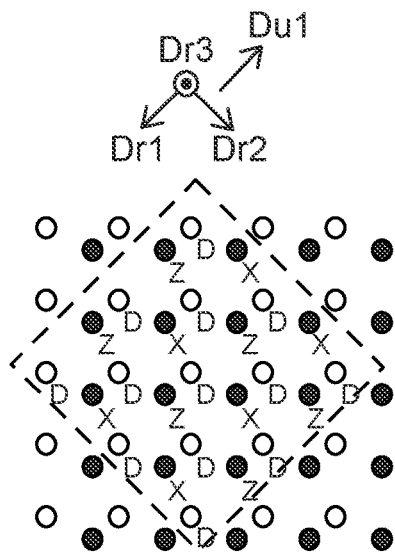

As shown in FIG. 26B, the multiple lattice points 10L are taken as the "Z-point", the "X-point", and the "D-point". The first to third directions Dr1 to Dr3 are set as shown in FIG. 26B. The angle between the first direction Dr1 and one side of the square lattice is 45 degrees. The opposite orientation of the orientation of the first direction Dr1 is taken as an "upward direction Du1".

In such a case, the distance (the pitch) between the Z-point and the D-point adjacent to the Z-point in the upward direction Du1 is $5^{1/2}/3$ μm. The distance (the pitch) between the X-point and the D-point adjacent to the X-point in the upward direction Du1 is $5^{1/2}/3$ μm. The distance (the pitch) between the Z-point and the D-point adjacent to the Z-point to the left is $2 \cdot (5^{1/2}/3)$ μm. The distance (the pitch) between the X-point and the D-point adjacent to the X-point to the left is $2 \cdot (5^{1/2}/3)$ μm. The distance between the Z-point and the D-point adjacent to the Z-point to the right is $10^{1/2}/3$ μm. The distance between the X-point and the D-point adjacent to the X-point to the right is $10^{1/2}/3$ μm. The distance between the Z-point and the D-point adjacent to the Z-point below the Z-point is 5/3 μm. The distance between the X-point and the D-point adjacent to the X-point below the X-point is 5/3 μm.

Similarly to the first example, NV centers are generated t the Z-point, the X-point, and the D-point. $^{15}$N is arranged between the Z-point and the X-point and the D-points adjacent to the Z-point and the X-point above, leftward, rightward, and below the Z-point and the X-point. The spacing at which the $^{15}$N is arranged is about 10 nm. 71, 145, 101, and 163 $^{15}$N are arranged at uniform spacing.

Figure 26C:
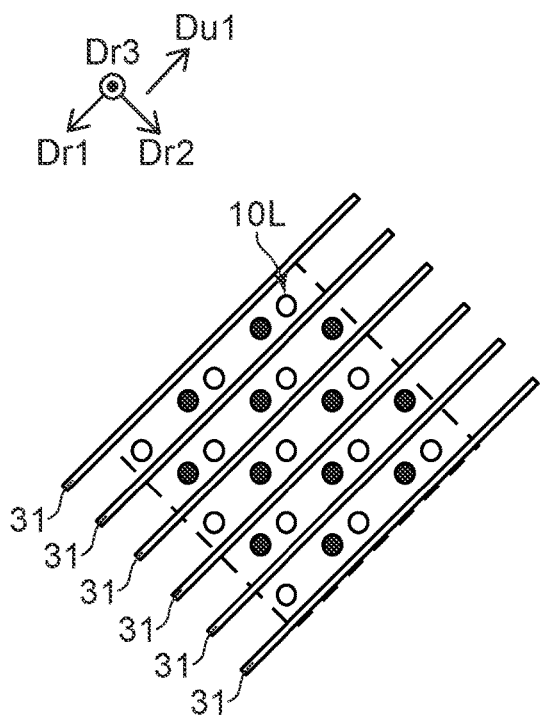

The multiple first conductive members 31 are provided as shown in FIG. 26C. The multiple first conductive members 31 extend along the first direction Dr1.

Figure 26D:
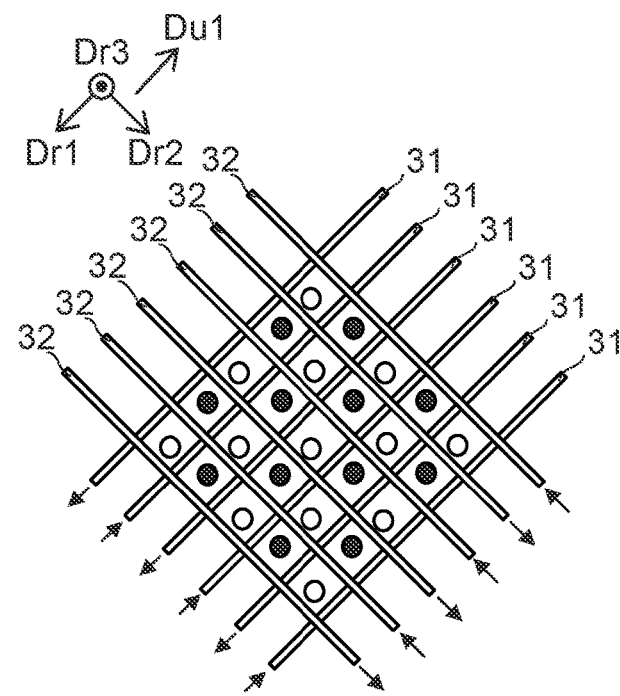

The multiple second conductive members 32 are provided as shown in FIG. 26D. The multiple second conductive members 32 extend along the second direction Dr2. Currents that have alternately opposite orientations are supplied to the multiple first conductive members 31. Currents that have alternately opposite orientations are supplied to the multiple second conductive members 32. The current that flows in one conductive member is, for example, 880 μA.

A microwave that has six frequency components is irradiated to such a qubit pair structure body 10A. The six frequencies are $v_{Z,MW1}$, $v_{Z,MW2}$, $v_{X,MW1}$, $v_{X,MW2}$, $v_{D,MW1}$, and $v_{D,MW2}$. These frequencies are defined similarly to the first example. By setting $\Delta_D$, $\Delta_Z$, $\Delta_X$, and the irradiation time of the irradiation of the microwave, a selective CNOT gate operates on the memory qubits of the Z-point and the X-point and the memory qubits of the D-points adjacent to the Z-point and the X-point above, leftward, rightward, and below the Z-point and the X-point. The memory qubit of the D-point is taken to be a data qubit. The memory qubit of the Z-point is taken to be a Z-measurement qubit. The memory qubit of the X-point is taken to be an X-measurement qubit. Such a surface code is performed. The CNOT gate between the data qubit and the Z-measurement qubit that is to operate synchronously with the surface code is operated. The CNOT gate between the data qubit and the X-measurement qubit is operated.

Fourth Example

Figure 27:
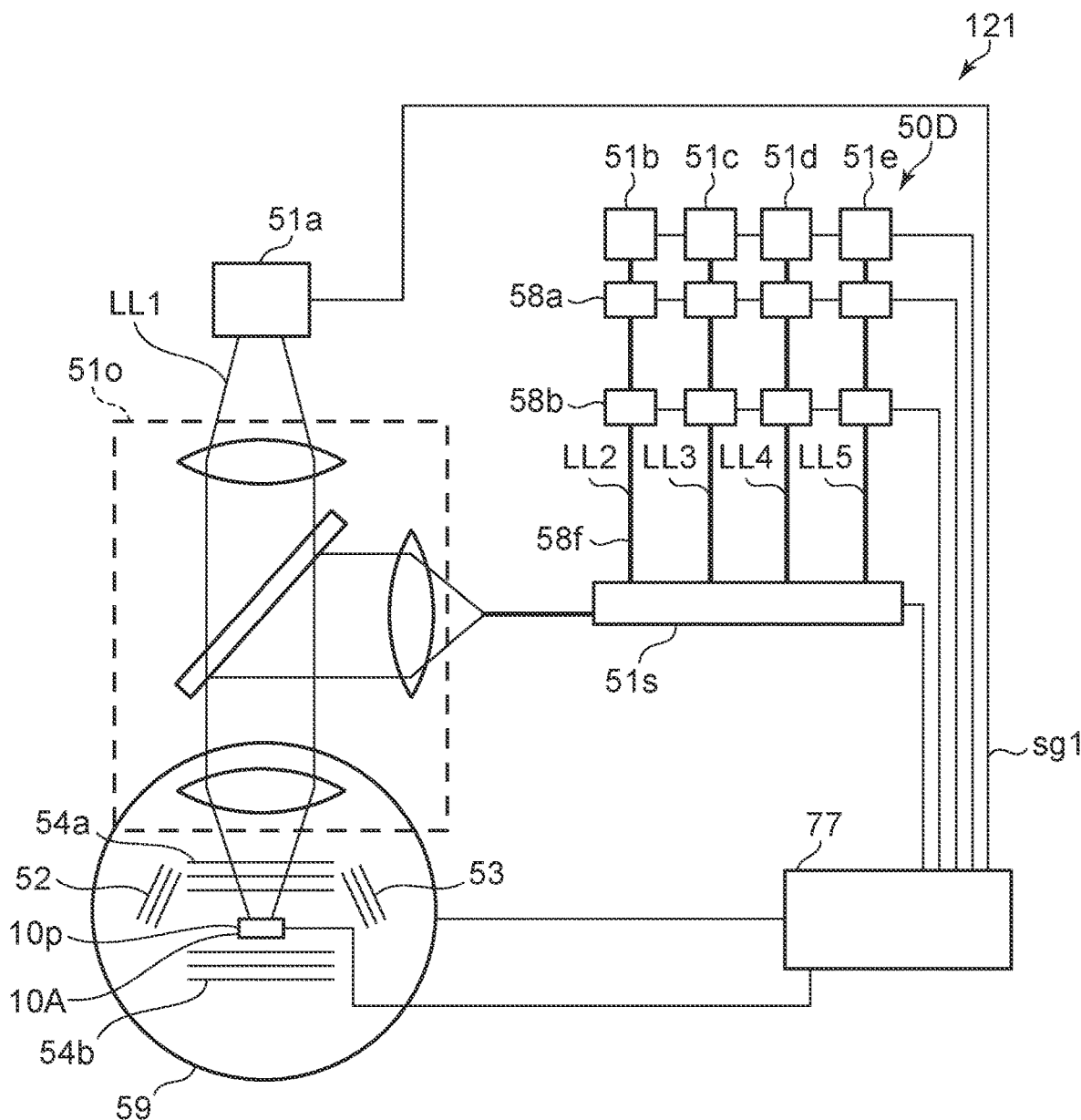
FIG. 27 is a schematic view illustrating an information processing device according to the first embodiment.

FIG. 27 is a schematic view illustrating an information processing device according to the first embodiment.

As shown in FIG. 27, the information processing device 121 according to the embodiment includes the first to fifth laser light sources 51a to 51e, the radio wave irradiation coil 52, and the microwave irradiation coil 53 in addition to the qubit pair structure body 10A. In the example, the information processing device 121 includes the magnetic field application coils 54a and 54b. In the example, the information processing device 121 includes the multiple first element parts 58a, the multiple second element parts 58b, and a light synthesis optical system 51s.

The first element part 58a includes, for example, an electro-optic effect element for frequency setting. The second element part 58b includes, for example, an acoustooptic effect element. For example, the acoustooptic effect element is configured to set the light intensity and perform switch operations of the light. The second to fifth lights LL2 to LL5 that are emitted from the second to fifth laser light sources 51b to 51e each pass through one of the multiple first element parts 58a and one of the multiple second element parts 58b and are incident on the light synthesis optical system 51s. The second to fifth lights LL2 to LL5 are synthesized by the light synthesis optical system 51s and are caused to be incident on the qubit pair structure body 10A as one light. These lights are guided by the optical fibers 58f. In the example as well, the information processing device 121 includes the optical system 510, the cryostat 59, and the controller 77.

The first laser light source 51a emits a laser (the first light LL1) that has a wavelength of 532 nm. This light initializes the charges of the multiple qubit pairs 10p included in the qubit pair structure body 10A. The first light LL1 is irradiated on the multiple qubit pairs 10p by the optical system 510.

For example, the second to fifth laser light sources 51b to 51e emit lasers (the second to fifth lights LL2 to LL5) that have wavelengths of 637 nm or the vicinity of 637 nm. For example, these lights perform the initialization, the measurement, and the operation of the qubits. The initialization, the measurement, and the operation may be individually performed. These lights are adjusted by the multiple first element parts 58a and the multiple second element parts 58b and are synthesized into one light by the light synthesis optical system 51s. The synthesized light is irradiated on the entirety of the multiple qubit pairs 10p of the qubit pair structure body 10A.

The controller 77 supplies the control signal sg1 to the first laser light source 51a, the multiple first element parts 58a, the multiple second element parts 58b, and the qubit pair structure body 10A. The controller 77 acquires a signal from the qubit pair structure body 10A.

Figure 28A:
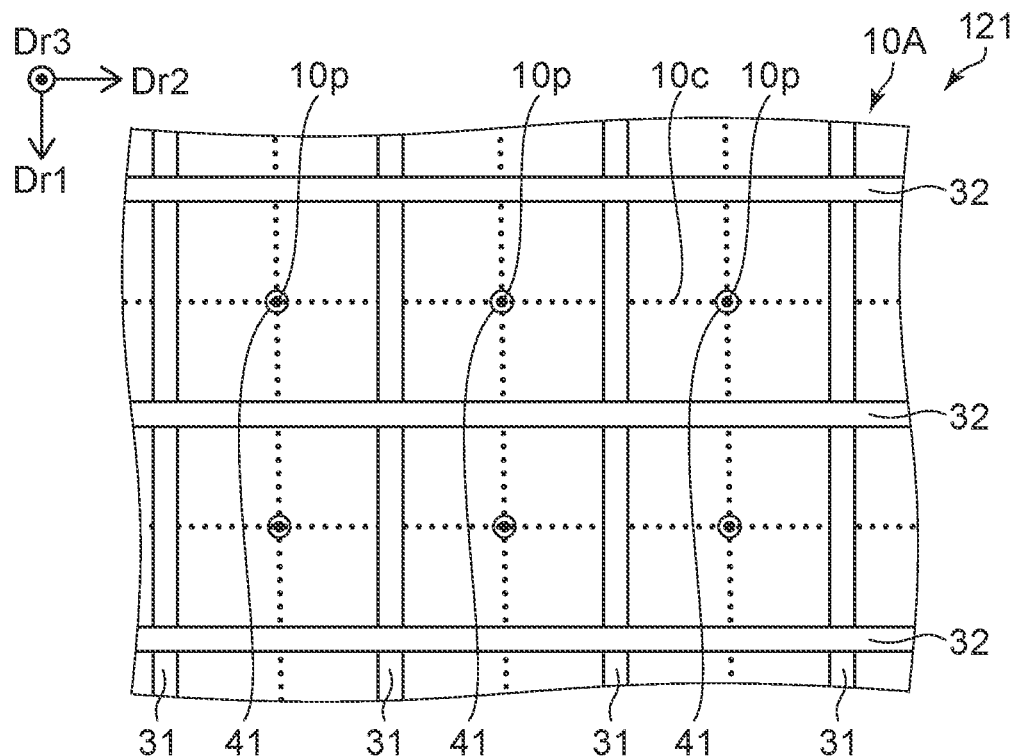
FIGS. 28A and 28B are schematic views illustrating the information processing device according to the first embodiment.
Figure 28B:
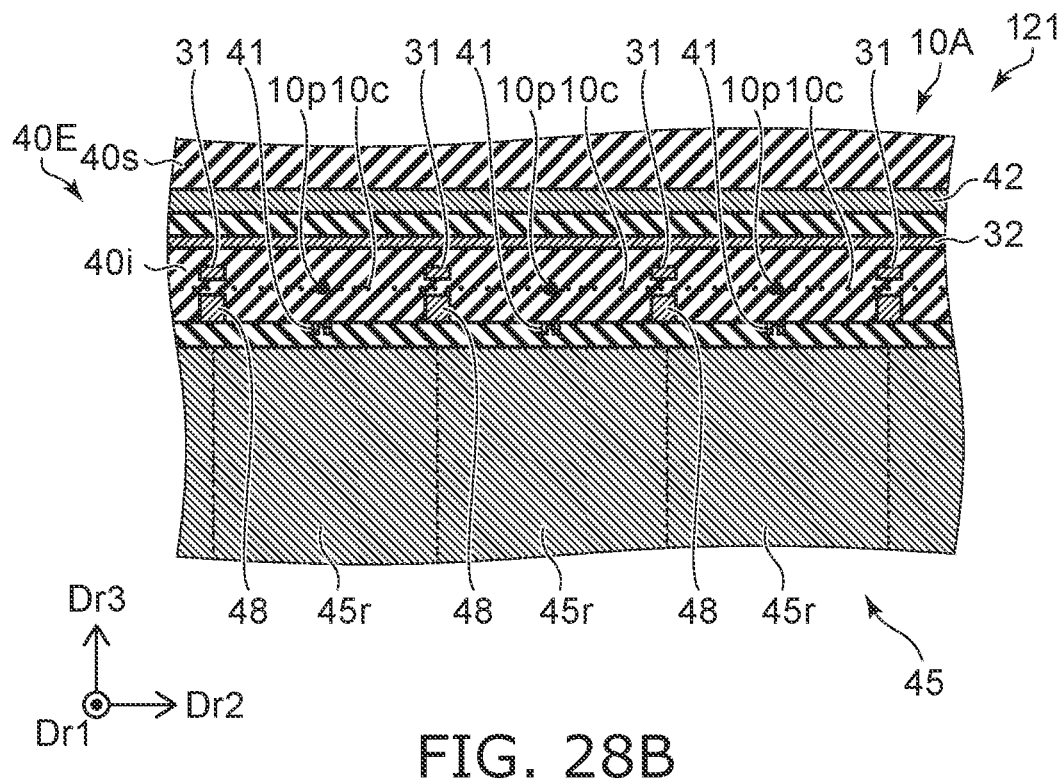

FIGS. 28A and 28B are schematic views illustrating the information processing device according to the first embodiment.

FIG. 28A is a see-through plan view. FIG. 28B is a cross-sectional view.

The multiple qubit pairs 10p are provided as shown in FIGS. 28A and 28B. In the example, NV centers are used as the multiple qubit pairs 10p. The pitches in the first and second directions Dr1 and Dr2 of the multiple qubit pairs 10p are 1 μm. The multiple first conductive members 31 and the multiple second conductive members 32 are provided. The multiple qubit pairs 10p are located at substantially the central portions of the regions of the lattice shape formed by these conductive members. A current of 880 μA is supplied to each of the multiple first conductive members 31 and the multiple second conductive members 32.

In the example, avalanche photodiodes are used as the light detecting part 45. The multiple light detection regions include avalanche photodiodes. In the example, a gate function is provided in the avalanche photodiode. The multiple avalanche photodiodes are configured to independently detect the light.

In the fourth example, similarly to the first example, names similar to those of the example shown in FIG. 22B are given to the lattice points (having a spacing of 1 μm) of the square lattice having a spacing of 1 μm. $^{15}$N is provided at the Z-point, the X-point, and the D-point. 100, 90, 80, and 70 $^{15}$N are arranged at uniform spacing between the Z-point and the X-point and the D-points adjacent to the Z-point and the X-point above, leftward, rightward, and below the Z-point and the X-point. The spin chains 10c above, leftward, rightward, and below the Z-point and the X-point respectively include eigenenergies of 5.3 kHz, 7.1 kHz, 10.1 kHz, and 12.6 kHz. These eigenenergies correspond to the modes of k=49, k=43, k=37, and k=31.

When forming the information processing device 121, the structure body that includes the avalanche photodiode, the structure body that includes the multiple conductive members, and the structure body that includes $^{15}$N may be formed separately, and these structure bodies may be stacked.

In the fourth example, symbols similar to those of the first example are set for the NV centers (i.e., the multiple qubit pairs 10p) at the D-point, the Z-point, and the X-point. For example, the symbols relate to the transition frequency between the quantum states relating to the electron spin and the nuclear spin.

The following operations are sequentially performed in the fourth example.

The charges of the NV centers are initialized to −1 by irradiating the light from the first laser light source 51a on the qubit pair structure body 10A. The frequencies of the lights output from the second to fifth laser light sources 51b to 51e are respectively taken as $v_a$, $v_b$, $v_c$, and $v_d$. $v_a = v_{D,AE,1}+3$ GHz. $v_b = v_{D,AE,2}+6$ GHz. $v_c = v_{D,AE,3}+6$ GHz. $v_d = v_{D,AE,2}+12$ GHz.

The intensity of the laser of the frequency $v_d$ output from the fifth laser light source 51e is 10 times the intensity of the laser of the frequency $v_b$ output from the third laser light source 51c. All of the lights that are output from the second to fifth laser light sources 51b to 51e are rectangular light pulses that are synchronized. The duration of the pulse is 10 ns for these light pulse. The spacing of the pulse is 20 ns. The light detecting part 45 is controlled by a gate operation. The light detecting part 45 has sensitivity in the period between temporally adjacent to light pulses (the period of 10 ns in which there is no light pulse).

A voltage of 900 mV is applied to the electric field application electrodes (the multiple electrodes 40E) of the D-point, the Z-point, and the X-point. In all of the broker qubits, the transition between $|+1_e\rangle$ of $^3$A and $|+1_e\rangle$ of $^3$E resonates with the light of the frequency $v_b$. In all of the broker qubits, the transition between $|-1_e\rangle$ of $^3$E $|-1_e\rangle$ of $^3$A resonates with the light of the frequency $v_c$. The states of all of the broker qubits become $|0_e\rangle$. These transitions correspond to a transition between $|+1_e\rangle$ and $|+1_e\rangle$, and a transition between $|-1_e\rangle$ and $|-1_e\rangle$. Therefore, for these transition frequencies, the difference due to the magnetic field difference between the D-point, the Z-point, and the X-point can be ignored. Resonance with the light of the frequencies $v_b$ and $v_c$ is generated at each point.

Subsequently, a voltage of 1350 mV is applied to the electric field application electrodes of the D-points other than the one D-point described above. A microwave is irradiated on the multiple qubit pairs 10p by the microwave irradiation coil 53. The frequency of the microwave is $v_{D,|0e,-1/2n\rangle,|+1e,-1/2n\rangle}$. The microwave corresponds to a π-pulse for the broker qubit of the D-point.

Subsequently, a voltage of 450 mV is applied to the electric field application electrode of the broker qubit of the D-point. Resonance with the light of the frequency $v_a$ is generated at the D-point. If a photon is not detected by the light detecting part 45, a radio wave is irradiated. The frequency of the radio wave is $v_{RF}=v_{D,|0e,+1/2n\rangle,|+1e,+1/2n\rangle}-v_{D,|0e,-1/2n\rangle,|+1e,-1/2n\rangle}$. The radio wave corresponds to a π-pulse of the transition between $|-\frac{1}{2}_n\rangle$ and $|+\frac{1}{2}_n\rangle$ of the memory qubit. Subsequently, a microwave is irradiated on the multiple qubit pairs 10p. The microwave corresponds to a π-pulse for the broker qubit of the D-point.

Thus, the qubit of the D-point is initialized to $|+\frac{1}{2}_n\rangle$ ($=|0\rangle$). Similarly, the memory qubits of the remaining twelve D-points are sequentially initialized to $|+\frac{1}{2}_n\rangle(=|0\rangle)$. The memory qubits of the six Z-points and the qubits of the six X-points also are similarly initialized to $|+\frac{1}{2}_n\rangle(=|0\rangle)$. In such a case as well, the difference due to the magnetic field difference of the D-point, the Z-point, and the X-point can be ignored for the resonance with the light of the frequency $v_d$. Resonance with the light of the frequency $v_d$ is generated at each point.

One of the Z-points is taken as the Z1-point. The D-point that is adjacent to the Z1-point above the Z1-point is taken as the D1-point. One of the X-points is taken as the X1-point. One other D-point that is adjacent to the X1-point above the X1-point is taken as the D2-point. A voltage of 1350 mV is applied to the electric field application electrodes of the D-points other than the D1-point and the D2-point. A π-pulse microwave of the frequency $v_{D,0,+1}$ is irradiated on the broker qubits at the positions of the electric field application electrodes while irradiating an intense light of the frequency $v_d$. Also, a radio wave of the frequency of $v_{RF}$ is irradiated. The memory qubits of the D1-point and D2-point are selectively set to $|-\frac{1}{2}_n\rangle(=|1\rangle)$.

Subsequently, the broker qubit is reset to $|0_e\rangle$ by irradiating a π-pulse microwave of the frequency $v_{D,0,+}1$.

Subsequently, the $C_e$NOT$_n$ gate, the $C_n$NOT$_e$ gate, and the $C_e$NOT$_n$ gate operate simultaneously in parallel on the qubit pairs of the Z-point and the X-point. In the $C_e$NOT$_n$ gate, the irradiation of a π-pulse of a radio wave of the frequency of $v_{RF}$ is performed. In the $C_n$NOT$_e$ gate, the irradiation of two π/2-pulses is performed. The frequencies of the two π/2-pulses are $v_{Z,0,+1}$ and $v_{X,0,+1}$.

The second $C_e$NOT$_n$ gate also is performed. In the second $C_e$NOT$_n$ gate, a π-pulse of a radio wave of the frequency of $v_{RF}$ is irradiated. The SWAP gate between the memory qubit and the broker qubit is performed for each of the Z-point and the X-point.

Subsequently, a microwave of six frequencies is irradiated by the microwave irradiation coil. The six frequencies are $v_{Z,MW1}$, $v_{Z,MW2}$, $v_{X,MW1}$, $v_{X,MW2}$, $v_{D,MW1}$, and $v_{D,MW2}$. $\Delta_D$, $\Delta_Z$, and $\Delta_X$ are 5.3 kHz. The time of the irradiation is 6.3 ms. The SWAP gate between the broker qubit of the Z-point and the broker qubit of the D-point adjacent to the Z-point above the Z-point is performed by the microwave irradiation. The SWAP gate between the broker qubit of the X-point and the broker qubit of the D-point adjacent to the X-point above the X-point is performed.

Subsequently, a voltage of 1350 mV is applied to the electric field application electrode of the D-point adjacent to the X-point above the X-point. Two π/2-pulses are irradiated while causing the broker qubit to resonate with an intense light of the frequency $v_d$. The frequencies of the two π/2-pulses are $v_{D,0,+1}$. The $C_n$NOT$_e$ gate that relates to the D-point adjacent to the Z-point above the Z-point is performed thereby.

Subsequently, a voltage of 1350 mV is applied to the electric field application electrode of the D-point adjacent to the Z-point above the Z-point. A radio wave π-pulse is irradiated while causing the broker qubit to resonate with an intense light of the frequency $v_d$. The frequency of the radio wave i-pulse is $v_{RF}$. The $C_e$NOT$_n$ gate operates at the D-point adjacent to the X-point above the X-point.

Subsequently, a microwave that includes six frequency components is irradiated. The six frequencies are $v_{Z,MW1}$, $v_{Z,MW2}$, $v_{X,MW1}$, $v_{X,MW2}$, $v_{D,MW1}$, and $v_{D,MW2}$. $\Delta_D$, $\Delta_Z$, and $\Delta_X$ are 5.3 kHz. The time of the irradiation is 6.3 ms. The SWAP gate between the broker qubit of the Z-point and the broker qubit of the D-point adjacent to the Z-point above the Z-point is performed by the microwave irradiation. The SWAP gate between the broker qubit of the X-point and the broker qubit of the D-point adjacent to the X-point above the X-point is performed.

Subsequently, the $C_e$NOT$_n$ gate, the $C_n$NOT$_e$ gate, and the $C_e$NOT$_n$ gate operate on the qubit pairs of the Z-point and the X-point. In the $C_e NOT_n$ gate, a π-pulse of a radio wave of the frequency of $v_{RF}$ is irradiated. In the $C_n NOT_e$ gate, two π/2-pulses are irradiated. The two frequencies are $v_{Z,0,+1}$ and $v_{X,0,+1}$. In the $C_e NOT_n$ gate, a second irradiation of a π-pulse of a radio wave of the frequency $v_{RF}$ is performed. Thereby, the SWAP gate between the memory qubit and the broker qubit operates for each of the Z-point and the X-point.

The $C_D NOT_Z$ gate and the $C_X NOT_D$ gate are performed by the operations. In the $C_D NOT_Z$ gate, the memory qubit of the Z-point is the target qubit; and the qubit of the D-point adjacent to the Z-point above the Z-point is the controlled qubit. In the $C_X NOT_D$ gate, the memory qubit of the X-point is the controlled qubit; and the qubit of the D-point adjacent to the X-point above the X-point is the target qubit.

Subsequently, a microwave is irradiated on the multiple qubit pairs 10p by the microwave irradiation coil 53. The frequencies of the microwave are $v_{D,|0e,-1/2n>|,|+1e,-1/2n>}$, $v_{Z,|0e,-1/2n>|,|+1e,-1/2n>}$, and $v_{X,|0e,-1/2n>|,|+1e,-1/2n>}$. The microwave corresponds to a π-pulse for the broker qubits of the D-point, the Z-point, and the X-point.

Subsequently, a voltage of 450 mV is applied to the electric field application electrode of the broker qubit of one D-point. Resonance with light of the frequency $v_a$ is caused. The memory qubit of the D-point is read using the existence or absence of the detection of the photon by the light detecting part 45. These operations are sequentially performed for the memory qubits of all of the D-points.

Subsequently, a voltage of 450 mV is applied to the electric field application electrodes for the memory qubit of the Z-point and the memory qubit of the X-point. Reading is performed. The memory qubits due to the reading are as follows. Namely, the D1-point is $|-\frac{1}{2}_n>(=|1>)$. The Z1-point is $|-\frac{1}{2}_n>(=|1>)$. The D2-point is $|-\frac{1}{2}_n>(=|1>)$. The X1-point is $|+\frac{1}{2}_n>(=|0>)$. The other lattice points are $|+\frac{1}{2}_n>(=|0>)$.

Thus, the $C_D NOT_Z$ gate and the $C_X NOT_D$ gate are selectively performed. The $C_D NOT_Z$ gate operates between the memory qubit of the Z-point and the memory qubit of the D-point adjacent to the Z-point above the Z-point. The $C_X NOT_D$ gate operates between the memory qubit of the X-point and the memory qubit of the D-point adjacent to the X-point above the X-point. The operations described above are performed without performing an individual light irradiation, microwave irradiation, or radio wave irradiation on the qubit pairs 10p.

In the series of operations described above, $\Delta_D$, $\Delta_Z$, $\Delta_X$, and the irradiation time are appropriately set for the irradiation of the microwave that includes the six frequency components. The six frequencies are $v_{Z,MW1}$, $v_{Z,MW2}$, $v_{X,MW1}$, $v_{X,MW2}$, $v_{D,MW1}$, and $v_{D,MW2}$. Thus, the selective CNOT gate similarly operates between the memory qubits of the Z-point and the X-point and the memory qubits of the D-points adjacent to the Z-point and the X-point above, leftward, rightward, and below the Z-point and the X-point.

In the fourth example, the transitions of the electron spin used as the multiple broker qubits are individually caused to resonate by the measurement light of the frequency $v_a$ by the electric field application electrodes of the D-point, the Z-point, and the X-point. The transition of the electron spin used as the multiple broker qubits is individually caused to resonate by the lights of the frequency $v_b$ and the frequency $v_c$ to set the broker qubit to $|0_e>$. The transition of the electron spin used as the multiple broker qubits is individually caused to resonate by the light of the frequency $v_d$. The electron spin that is used as the multiple broker qubits and the nuclear spin that is used as the memory qubits no longer respond to the microwave or the radio wave. Accordingly, light irradiation, microwave irradiation, or radio wave irradiation is not performed individually on the multiple qubit pairs. It is possible to individually freeze the multiple memory qubits, perform an individual one-qubit gate on the multiple memory qubits, individually measure the multiple memory qubits, and individually initialize the multiple memory qubits.

Second Embodiment

A second embodiment relates to an information processing method. For example, the qubit pair structure body 10A that includes the first configuration CF1 or the second configuration CF2 is used in the information processing method according to the embodiment.

In the information processing method according to the embodiment, the electromagnetic wave 50W is irradiated on such a qubit pair structure body 10A. The electromagnetic wave 50W is irradiated on at least one of the multiple qubit pairs. The electromagnetic wave 50W includes at least one of light, a microwave, or a radio wave. One of the two physical systems 10s (e.g., a broker qubit, i.e., the at least one described above) included in the qubit pair 10p on which the electromagnetic wave 50W is irradiated is configured to resonate with the first to fourth eigenenergies $E_1$ to $E_4$ of the spin chain 10c included in the qubit pair structure body 10A. For example, a two-qubit gate operation is performed on the first and second qubit pairs 11r and 12r by the irradiation of the electromagnetic wave 50W.

The coherence time of a localized center in a solid is long. This is suited to a small physical system and a small element. There are expectations for the use of localized centers in solids as physical systems suited to quantum technology. Quantum technology includes, for example, a quantum computer, a quantum simulator, a quantum sensor, etc.

When a localized center in a solid is used as a qubit, a specific structure that is suited to a high performance error correction is unknown. Conventionally, the irradiation positions and the frequencies of the irradiated electromagnetic waves (the light, the microwave, the radio wave, etc.) when individually initializing, operating, and observing the qubit are suited to the unique position and resonant frequency of the qubit. Generally, the necessary numbers of light rays and frequencies increase as the number of qubits increases. Thereby, the device becomes more complex and larger. According to the embodiment, a more complex and larger device can be suppressed.

According to embodiments, an information processing device that can be downsized with improved performance is provided.

Embodiments may include the following configurations (e.g., technological proposals).

Configuration 1

An information processing device, comprising:

a qubit pair structure body including a plurality of qubit pairs, the plurality of qubit pairs being arranged in m rows and n columns (m being an integer not less than 3, and n being an integer not less than 3), the plurality of qubit pairs including a first qubit pair at a 2kth row and a (2l−1)th column, a second qubit pair at a (2k−1)th row and a 2lth column, a first adjacent qubit pair at a (2k−1)th row and a (2l−1)th column, a second adjacent qubit pair at a 2kth row and a (2l−2)th column, a third adjacent qubit pair at a 2kth row and a 2lth column, a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, the qubit pair structure body including a first spin chain between the first qubit pair and the first adjacent qubit pair, a second spin chain between the first qubit pair and the second adjacent qubit pair, a third spin chain between the first qubit pair and the third adjacent qubit pair, a fourth spin chain between the first qubit pair and the fourth adjacent qubit pair, a fifth spin chain between the second qubit pair and the fifth adjacent qubit pair, a sixth spin chain between the second qubit pair and the first adjacent qubit pair, a seventh spin chain between the second qubit pair and the sixth adjacent qubit pair, and an eighth spin chain between the second qubit pair and the third adjacent qubit pair, the first spin chain and the fifth spin chain including a first eigenenergy, the second spin chain and the sixth spin chain including a second eigenenergy, the third spin chain and the seventh spin chain including a third eigenenergy, the fourth spin chain and the eighth spin chain including a fourth eigenenergy, the first eigenenergy, the second eigenenergy, the third eigenenergy, and the fourth eigenenergy being different from each other, the first spin chain and the fifth spin chain not including the second, third, and fourth eigenenergies, the second spin chain and the sixth spin chain not including the first, third, and fourth eigenenergies, the third spin chain and the seventh spin chain not including the first, second, and fourth eigenenergies, the fourth spin chain and the eighth spin chain not including the first, second, and third eigenenergies.

Configuration 2

The information processing device according to Configuration 1, wherein a distance between the first qubit pair and the first adjacent qubit pair and a distance between the second qubit pair and the fifth adjacent qubit pair are a first distance, a distance between the first qubit pair and the second adjacent qubit pair and a distance between the second qubit pair and the first adjacent qubit pair are a second distance, a distance between the first qubit pair and the third adjacent qubit pair and a distance between the second qubit pair and the sixth adjacent qubit pair are a third distance, a distance between the first qubit pair and the fourth adjacent qubit pair and a distance between the second qubit pair and the third adjacent qubit pair are a fourth distance, and the first distance, the second distance, the third distance, and the fourth distance are different from each other.

Configuration 3

An information processing device, comprising:

a qubit pair structure body including a plurality of qubit pairs, the plurality of qubit pairs being arranged in m rows and n columns (m being an integer not less than 3, and n being an integer not less than 3), the plurality of qubit pairs including a first qubit pair at a 2kth row and a (2l−1)th column, a second qubit pair at a (2k−1)th row and a 2lth column, a first adjacent qubit pair at a (2k−1)th row and a (2l−1)th column, a second adjacent qubit pair at a 2kth row and a (2l−2)th column, a third adjacent qubit pair at a 2kth row and a 2lth column, a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, a distance between the first qubit pair and the first adjacent qubit pair and a distance between the second qubit pair and the fifth adjacent qubit pair being a first distance, a distance between the first qubit pair and the second adjacent qubit pair and a distance between the second qubit pair and the first adjacent qubit pair being a second distance, a distance between the first qubit pair and the third adjacent qubit pair and a distance between the second qubit pair and the sixth adjacent qubit pair being a third distance, a distance between the first qubit pair and the fourth adjacent qubit pair and a distance between the second qubit pair and the third adjacent qubit pair being a fourth distance, and the first distance, the second distance, the third distance, and the fourth distance being different from each other.

Configuration 4

The information processing device according to any one of Configurations 1 to 3, wherein the first qubit pair includes a first structure body including at least one of a first element or a first isotope, the second qubit pair includes a second structure body including at least one of a second element or a second isotope, the first adjacent qubit pair, the second adjacent qubit pair, the third adjacent qubit pair, the fourth adjacent qubit pair, the fifth adjacent qubit pair, and the sixth adjacent qubit pair include a third structure body including at least one of a third element or a third isotope, the first structure body is different from the third structure body, the first structure body is different from the second structure body, and the second structure body is different from the third structure body.

Configuration 5

An information processing device, comprising:

a qubit pair structure body including a plurality of qubit pairs, the plurality of qubit pairs being arranged in m rows and n columns (m being an integer not less than 3, and n being an integer not less than 3), the plurality of qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column,
a fifth adjacent qubit pair at a (2k−2)th row and a 2lth column, and
a sixth adjacent qubit pair at a (2k−1)th row and a (2l+1)th column,
k being an integer not less than 1 and not more than a maximum integer not greater than m/2,
l being an integer not less than 1 and not more than a maximum integer not greater than n/2,
the first qubit pair including a first structure body that includes at least one of a first element or a first isotope,
the second qubit pair including a second structure body that includes at least one of a second element or a second isotope,
the first adjacent qubit pair, the second adjacent qubit pair, the third adjacent qubit pair, the fourth adjacent qubit pair, the fifth adjacent qubit pair, and the sixth adjacent qubit pair including a third structure body that includes at least one of a third element or a third isotope,
the first structure body being different from the third structure body,
the first structure body being different from the second structure body,
the second structure body being different from the third structure body.

Configuration 6

An information processing device, comprising:
a qubit pair structure body including a plurality of qubit pairs,
the plurality of qubit pairs being arranged in m rows and n columns (m being an integer not less than 3, and n being an integer not less than 3),
the plurality of qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column,
a fifth adjacent qubit pair at a (2k−2)th row and a 2lth column, and
a sixth adjacent qubit pair at a (2k−1)th row and a (2l+1)th column,
k being an integer not less than 1 and not more than a maximum integer not greater than m/2,
l being an integer not less than 1 and not more than a maximum integer not greater than n/2,
the qubit pair structure body including
a first spin chain between the first qubit pair and the first adjacent qubit pair,
a second spin chain between the first qubit pair and the second adjacent qubit pair,
a third spin chain between the first qubit pair and the third adjacent qubit pair,
a fourth spin chain between the first qubit pair and the fourth adjacent qubit pair,
a fifth spin chain between the second qubit pair and the fifth adjacent qubit pair,
a sixth spin chain between the second qubit pair and the first adjacent qubit pair,
a seventh spin chain between the second qubit pair and the sixth adjacent qubit pair, and
an eighth spin chain between the second qubit pair and the third adjacent qubit pair,
the first spin chain and the eighth spin chain including a first eigenenergy,
the second spin chain and the seventh spin chain including a second eigenenergy,
the fourth spin chain and the fifth spin chain including a third eigenenergy,
the third spin chain and the sixth spin chain including a fourth eigenenergy,
the first eigenenergy, the second eigenenergy, the third eigenenergy, and the fourth eigenenergy being different from each other,
the first spin chain and the eighth spin chain not including the second, third, and fourth eigenenergies,
the second spin chain and the seventh spin chain not including the first, third, and fourth eigenenergies,
the fourth spin chain and the fifth spin chain not including the first, second, and fourth eigenenergies,
the third spin chain and the sixth spin chain not including the first, second, and third eigenenergies.

Configuration 7

The information processing device according to Configuration 6, wherein
a distance between the first qubit pair and the first adjacent qubit pair and a distance between the second qubit pair and the third adjacent qubit pair are a first distance,
a distance between the first qubit pair and the second adjacent qubit pair and a distance between the second qubit pair and the sixth adjacent qubit pair are a second distance,
a distance between the first qubit pair and the fourth adjacent qubit pair and a distance between the second qubit pair and the fifth adjacent qubit pair are a third distance,
a distance between the first qubit pair and the third adjacent qubit pair and a distance between the second qubit pair and the first adjacent qubit pair are a fourth distance, and
the first distance, the second distance, the third distance, and the fourth distance are different from each other.

Configuration 8

An information processing device, comprising:
a qubit pair structure body including a plurality of qubit pairs,
the plurality of qubit pairs being arranged in m rows and n columns (m being an integer not less than 3, and n being an integer not less than 3),
the plurality of qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column,
a fifth adjacent qubit pair at a (2k−2)th row and a 2lth column, and
a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, a distance between the first qubit pair and the first adjacent qubit pair and a distance between the second qubit pair and the third adjacent qubit pair being a first distance, a distance between the first qubit pair and the second adjacent qubit pair and a distance between the second qubit pair and the sixth adjacent qubit pair being a second distance, a distance between the first qubit pair and the fourth adjacent qubit pair and a distance between the second qubit pair and the fifth adjacent qubit pair being a third distance, a distance between the first qubit pair and the third adjacent qubit pair and a distance between the second qubit pair and the first adjacent qubit pair being a fourth distance, the first distance, the second distance, the third distance, and the fourth distance being different from each other.

Configuration 9

The information processing device according to Configuration 8, wherein the first qubit pair includes a first structure body including at least one of a first element or a first isotope, the second qubit pair includes a second structure body including at least one of a second element or a second isotope, the first adjacent qubit pair, the second adjacent qubit pair, the third adjacent qubit pair, the fourth adjacent qubit pair, the fifth adjacent qubit pair, and the sixth adjacent qubit pair include a third structure body including at least one of a third element or a third isotope, the first structure body is different from the third structure body, the first structure body is different from the second structure body, and the second structure body is different from the third structure body.

Configuration 10

An information processing device, comprising:

a qubit pair structure body including a plurality of qubit pairs, the plurality of qubit pairs being arranged in m rows and n columns (m being an integer not less than 3, and n being an integer not less than 3), the plurality of qubit pairs including a first qubit pair at a 2kth row and a (2l−1)th column, a second qubit pair at a (2k−1)th row and a 2lth column, a first adjacent qubit pair at a (2k−1)th row and a (2l−1)th column, a second adjacent qubit pair at a 2kth row and a (2l−2)th column, a third adjacent qubit pair at a 2kth row and a 2lth column, a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, the first qubit pair including a first structure body that includes at least one of a first element or a first isotope, the second qubit pair including a second structure body that includes at least one of a second element or a second isotope, the first adjacent qubit pair, the second adjacent qubit pair, the third adjacent qubit pair, the fourth adjacent qubit pair, the fifth adjacent qubit pair, and the sixth adjacent qubit pair including a third structure body that includes at least one of a third element or a third isotope, the first structure body being different from the third structure body, the first structure body being different from the second structure body, the second structure body being different from the third structure body.

Configuration 11

The information processing device according to any one of Configurations 1 to 10, wherein one of the plurality of qubit pairs includes one of a first pair, a second pair, a third pair, a fourth pair, or a fifth pair, the first pair includes an electron spin and a nuclear spin of a NV center of diamond, the second pair includes an electron spin of the NV center of the diamond and a nuclear spin of $^{13}C$, the third pair includes an electron spin and a nuclear spin of a NV center of SiC, the fourth pair includes an electron spin of the NV center of the SiC and a nuclear spin of $^{13}C$, and the fifth pair includes an electron spin of $VV^O$ of the SiC and a nuclear spin of $^{13}C$.

Configuration 12

The information processing device according to any one of Configurations 1 to 11, further comprising:

a plurality of first conductive members extending along a first direction, the plurality of first conductive members being arranged along a first cross direction crossing the first direction; and a plurality of second conductive members extending along a second direction, the second direction crossing the first direction and being along a plane including the first direction and the first cross direction, the plurality of second conductive members being arranged along a second cross direction, the second cross direction crossing the second direction and being along the plane, the plurality of qubit pairs being arranged along the plane, one of the plurality of qubit pairs overlapping a first region and a second region in a third direction, the third direction crossing the plane, the first region being between one of the plurality of first conductive members and an other one of the plurality of first conductive members, the other one of the plurality of first conductive members being adjacent to the one of the plurality of first conductive members, the second region being between one of the plurality of second conductive members and an other one of the plurality of second conductive members, the other one of the plurality of second conductive members being adjacent to the one of the plurality of second conductive members.

Configuration 13

The information processing device according to Configuration 12, further comprising:

a circuit part, the circuit part being configured to supply a first current of a first orientation to the one of the plurality of first conductive members, the circuit part being configured to supply a second current of a second orientation to the other one of the plurality of first conductive members, the second orientation being opposite to the first orientation, the circuit part being configured to supply a third current of a third orientation to the one of the plurality of second conductive members, the circuit part being configured to supply a fourth current of a fourth orientation to the other one of the plurality of second conductive members, the fourth orientation being opposite to the third orientation.

Configuration 14

The information processing device according to any one of Configurations 1 to 13, further comprising:

an electromagnetic wave irradiation part configured to irradiate an electromagnetic wave on the plurality of qubit pairs, the qubit pair structure body including
a plurality of electrodes, and
a light detecting part,
the plurality of electrodes being configured to individually apply an electric field to the plurality of qubit pairs,
the light detecting part being configured to detect light emitted by the plurality of qubit pairs.

Configuration 15

The information processing device according to Configuration 14, wherein the electromagnetic wave irradiation part is configured to perform at least a first operation of irradiating a first electromagnetic wave on the plurality of qubit pairs, and a second operation of irradiating a second electromagnetic wave on the plurality of qubit pairs, one of the plurality of qubit pairs including two physical systems, one of the two physical systems including a first quantum state, a second quantum state, and a third quantum state, a transition between the first quantum state and the second quantum state resonating with the first electromagnetic wave, a transition between the second quantum state and the third quantum state resonating with the second electromagnetic wave.

Configuration 16

The information processing device according to any one of Configurations 1 to 7, wherein one of the plurality of qubit pairs includes two physical systems, one of the two physical systems includes a first quantum state, a second quantum state, and a third quantum state, and a transition between the second quantum state and the third quantum state is changed by the electric field applied by the plurality of electrodes.

Configuration 17

The information processing device according to Configuration 15 or 16, wherein the first quantum state and the second quantum state can correspond to a qubit.

Configuration 18

The information processing device according to any one of Configurations 1 to 12, wherein one of the plurality of qubit pairs includes two physical systems, one of the two physical systems includes two or more quantum states, and the two or more quantum states can correspond to a qubit.

Configuration 19

An information processing method, comprising:

irradiating an electromagnetic wave on at least one of a plurality of qubit pairs included in a qubit pair structure body, the plurality of qubit pairs being arranged in m rows and n columns (m being an integer not less than 3, and n being an integer not less than 3), the plurality of qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column,
a fifth adjacent qubit pair at a (2k−2)th row and a 2lth column, and
a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, the qubit pair structure body including
a first spin chain between the first qubit pair and the first adjacent qubit pair,
a second spin chain between the first qubit pair and the second adjacent qubit pair,
a third spin chain between the first qubit pair and the third adjacent qubit pair,
a fourth spin chain between the first qubit pair and the fourth adjacent qubit pair,
a fifth spin chain between the second qubit pair and the fifth adjacent qubit pair,
a sixth spin chain between the second qubit pair and the first adjacent qubit pair,
a seventh spin chain between the second qubit pair and the sixth adjacent qubit pair, and
an eighth spin chain between the second qubit pair and the third adjacent qubit pair, the first spin chain and the fifth spin chain including a first eigenenergy, the second spin chain and the sixth spin chain including a second eigenenergy, the third spin chain and the seventh spin chain including a third eigenenergy, the fourth spin chain and the eighth spin chain including a fourth eigenenergy, the first eigenenergy, the second eigenenergy, the third eigenenergy, and the fourth eigenenergy being different from each other, the first spin chain and the fifth spin chain not including the second, third, and fourth eigenenergies, the second spin chain and the sixth spin chain not including the first, third, and fourth eigenenergies, the third spin chain and the seventh spin chain not including the first, second, and fourth eigenenergies, the fourth spin chain and the eighth spin chain not including the first, second, and third eigenenergies, one of two physical systems included in the at least one of the plurality of qubit pairs resonating with the first to fourth eigenenergies; and performing a two-qubit gate operation on the first and second qubit pairs.

Configuration 20
An information processing method, comprising:
irradiating an electromagnetic wave on at least one of a plurality of qubit pairs included in a qubit pair structure body,
the plurality of qubit pairs being arranged in m rows and n columns (m being an integer not less than 3, and n being an integer not less than 3),
the plurality of qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column,
a fifth adjacent qubit pair at a (2k−2)th row and a 2lth column, and
a sixth adjacent qubit pair at a (2k−1)th row and a (2l+1)th column,
k being an integer not less than 1 and not more than a maximum integer not greater than m/2,
l being an integer not less than 1 and not more than a maximum integer not greater than n/2,
the qubit pair structure body including
a first spin chain between the first qubit pair and the first adjacent qubit pair,
a second spin chain between the first qubit pair and the second adjacent qubit pair,
a third spin chain between the first qubit pair and the third adjacent qubit pair,
a fourth spin chain between the first qubit pair and the fourth adjacent qubit pair,
a fifth spin chain between the second qubit pair and the fifth adjacent qubit pair,
a sixth spin chain between the second qubit pair and the first adjacent qubit pair,
a seventh spin chain between the second qubit pair and the sixth adjacent qubit pair, and
an eighth spin chain between the second qubit pair and the third adjacent qubit pair,
the first spin chain and the eighth spin chain including a first eigenenergy,
the second spin chain and the seventh spin chain including a second eigenenergy,
the fourth spin chain and the fifth spin chain including a third eigenenergy,
the third spin chain and the sixth spin chain including a fourth eigenenergy,
the first eigenenergy, the second eigenenergy, the third eigenenergy, and the fourth eigenenergy being different from each other,
the first spin chain and the eighth spin chain not including the second, third, and fourth eigenenergies,
the second spin chain and the seventh spin chain not including the first, third, and fourth eigenenergies,
the fourth spin chain and the fifth spin chain not including the first, second, and fourth eigenenergies,
the third spin chain and the sixth spin chain not including the first, second, and third eigenenergies,
one of two physical systems included in the at least one of the plurality of qubit pairs resonating with the first to fourth eigenenergies; and
performing a two-qubit gate operation on the first and second qubit pairs.

In the first example above mentioned, as described above, a π-pulse of a radio wave that has the frequency of $v_{RF}$ is irradiated while irradiating an intense light of the frequency $v_{D,AE,2}$ on the D-point directly above the Z-point. Thereby, the $C_e NOT_n$ gate operates on the D-point directly above the X-point.

At this time, the following processing may be performed in the first example. Instead of the intense light of the frequency $v_{D,AE,2}$, intense light including the light of the frequency $v_e$ and the light of the frequency $v_f$ shown in the next may be irradiated. The light of the frequency $v_e$ and the light of the frequency $v_f$ are possible to be generated by at least any one of frequency setting of the light by the laser light source 51b or frequency modulation by the first element part 58a. The frequency $v_e$ is a frequency resonating with the transition from the state of $|0_e, +\frac{1}{2}_n>$ of $^3A$ to the state of $|−1_e, +\frac{1}{2}_n>$ of $^3E$ in the coupled system of the broker qubit and the memory qubit at the D-point adjacent to the Z-point above the Z-point. The frequency $v_f$ is a frequency resonating with the transition from the state of $|+1_e, +\frac{1}{2}_n>$ of $^3A$ to the state of $|+1_e, +\frac{1}{2}_n>$ of $^3E$ in the coupled system of the broker qubit and the memory qubit at the D-point adjacent to the Z-point above the Z-point. The light of the frequency $v_e$ and the light of the frequency $v_f$ may be pulse light or continuous light. For example, a radio wave π-pulse is irradiated while causing the coupled system of the broker qubit and the memory qubit at the D-point adjacent to the Z-point above the Z-point to resonate with the intense light including the light of the frequency $v_e$ and the light of the frequency $v_f$. Thereby, $C_e NOT_n$ gate operates on the D-point adjacent to the X-point above the X-point.

In the second example mentioned above, as described above, a microwave that has eight frequency components is irradiated by the microwave irradiation coil 53. The eight frequencies are $v_{Z,MW1}$, $v_{Z,MW2}$, $v_{X,MW1}$, $v_{X,MW2}$, $v_{DZ,MW1}$, $v_{DZ,MW2}$, $v_{DX,MW1}$, and $v_{DX,MW2}$. In the irradiation, $\Delta_{DZ}=\Delta_Z=5.3$ kHz. $\Delta_{DX}=\Delta_X=12.6$ kHz. The microwave irradiation time of the frequencies of $v_{Z,MW1}$, $v_{Z,MW2}$, $v_{DZ,MW1}$, and $v_{DZ,MW2}$ is 6.3 ms. The irradiation time of the microwave of the frequencies of $v_{X,MW1}$, $v_{X,MW2}$, $v_{DX,MW1}$, and $v_{DX,MW2}$ is 5.6 ms. The SWAP gate between the broker qubit of the Z-point and the broker qubit of the DZ-point adjacent to the Z-point above the Z-point is performed by the irradiation of such a microwave. A SWAP gate between the broker qubit of the X-point and the broker qubit of the DX-point adjacent to the X-point above the X-point is performed. The $C_n NOT_e$ gate is caused to operate on the DZ-point by two π/2-pulse irradiations of the frequency of $v_{DZ,0,+1}$. For example, the $C_e NOT_n$ gate is caused to operate on the DX-point by a radio wave π-pulse irradiation of the frequency of $v_{RF}$ while irradiating an intense light of the frequency $v_{DZ,AE,2}$ on the DZ-point.

At this time, the following processing may be performed in the second example. Instead of the intense light of the frequency $v_{D,AE,2}$, intense light including the light of the frequency of the frequency $v_e$ and the light of the frequency $v_f$ shown in the next may be irradiated. The light of the frequency $v_e$ and the light of the frequency $v_f$ are possible to be generated by at least any one of frequency setting of the light by the laser light source 51b or frequency modulation by the first element part 58a. The frequency $v_e$ is a frequency resonating with the transition from the state of $|0_e, +\frac{1}{2}_n>$ of $^3A$ to the state of $|−1_e, +\frac{1}{2}_n>$ of $^3E$ in the coupled system of the broker qubit and the memory qubit at the DZ-point adjacent to the Z-point above the Z-point. The frequency $v_f$ is a frequency resonating with the transition from the state of $|+1_e, +\frac{1}{2}_n\rangle$ of $^3A$ to the state of $|+1_e, +\frac{1}{2}_n\rangle$ of $^3E$ in the coupled system of the broker qubit and the memory qubit at the DZ-point adjacent to the Z-point above the Z-point. The light of the frequency $v_e$ and the light of the frequency $v_f$ may be pulse light or continuous light. For example, a radio wave π-pulse is irradiated while causing the coupled system of the broker qubit and the memory qubit at the DZ-point adjacent to the Z-point above the Z-point to resonate with the intense light including the light of the frequency $v_e$ and the light of the frequency $v_f$. Hereby, $C_eNOT_n$ gate operates on the DX-point adjacent to the X-point above the X-point.

In the fourth example mentioned above, as described above, a voltage of 1350 mV is applied to the electric field application electrode of the D-point adjacent to the Z-point above the Z-point. A radio wave π-pulse is irradiated while causing the broker qubit to resonate with an intense light of the frequency $v_d$.

At this time, the following processing may be performed in the fourth example. A voltage of 1800 mV may be applied instead of 1350 mV. At that time, the intense light of the frequency $v_d$ is changed to intense light including the light of the frequency $v_e$ and the light of the frequency $v_f$ shown in the next. The light of the frequency $v_e$ and the light of the frequency $v_f$ are possible to be generated by at least any one of frequency setting of the light from the fifth laser light source 51e or frequency modulation by the first element part 58a. The frequency $v_e$ is a frequency resonating with the transition from the state of $|0_e, +\frac{1}{2}_n\rangle$ of $^3A$ to the state of $|-1_e, +\frac{1}{2}_n\rangle$ of $^3E$ in the coupled system of the broker qubit and the memory qubit at the D-point adjacent to the Z-point above the Z-point under the application of the voltage. The frequency $v_f$ is a frequency resonating with the transition from the state of $|+1_e, +\frac{1}{2}_n\rangle$ of $^3A$ to the state of $|+1_e, +\frac{1}{2}_n\rangle$ of $^3E$ in the coupled system of the broker qubit and the memory qubit at the D-point adjacent to the Z-point above the Z-point under the application of the voltage. The light of the frequency $v_e$ and the light of the frequency $v_f$ may be generated as follows. The light of the frequency $v_d$ is used for the light from the fifth laser light source 51e and the first element part 58a. For example, a sixth laser light source 51f, a seventh laser light source 51g, and multiple first element parts 58a, multiple second element parts 58b, a light synthesis optical system 51s, and an optical fiber 58 corresponding to the sixth laser light source 51f and the seventh laser light source 51g may be prepared. The sixth laser light source 51f outputs the light of the frequency $v_e$. The seventh laser light source 51g outputs the light of the frequency $v_e$. Under the application of the voltage of 1800 mV, the intense light including the light of the frequency $v_e$ and the light of the frequency $v_f$ may be pulse light or continuous light. For example, a radio wave π-pulse is irradiated while causing the coupled system of the broker qubit and the memory qubit at the D-point adjacent to the Z-point above the Z-point to resonate with the intense light including the light of the frequency $v_e$ and the light of the frequency $v_f$.

In the fourth example, the transitions of the electron spin used as the multiple broker qubits are individually caused to resonate by the measurement light of the frequency $v_a$ by the electric field application electrodes of the D-point, the Z-point, and the X-point. The transition of the electron spin used as the multiple broker qubits is individually caused to resonate by the lights of the frequency $v_b$ and the frequency $v_c$ to set the broker qubit to $|0_e\rangle$. The transition of the electron spin used as the multiple broker qubits is individually caused to resonate by the light of the frequency $v_d$. Or the transition of the electron spin used as the multiple broker qubits is individually caused to resonate by the light of the frequency $v_e$ and the light of the frequency $v_f$. The electron spin that is used as the multiple broker qubits and the nuclear spin that is used as the memory qubits no longer respond to the microwave or the radio wave. Accordingly, light irradiation, microwave irradiation, or radio wave irradiation is not performed individually on the multiple qubit pairs. It is possible to individually freeze the multiple memory qubits, perform an individual one-qubit gate on the multiple memory qubits, individually measure the multiple memory qubits, and individually initialize the multiple memory qubits.

According to embodiments, an information processing device and an information processing method can be provided in which the processing efficiency can be increased.

Hereinabove, exemplary embodiments of the invention are described with reference to specific examples. However, the invention is not limited to these specific examples. For example, various modifications made by one skilled in the art in regard to the configurations, sizes, material qualities, arrangements, etc., of components of information processing devices are included in the scope of the invention to the extent that the purport of the invention is included.

Any two or more components of the specific examples may be combined within the extent of technical feasibility, and are included in the scope of the invention to the extent that the purport of the invention is included.

Moreover, all information processing devices and information processing methods practicable by an appropriate design modification by one skilled in the art based on the information processing devices and the information processing methods described above as exemplary embodiments of the invention also are within the scope of the invention to the extent that the purport of the invention is included.

Furthermore, various modifications and alterations within the spirit of the invention will be readily apparent to those skilled in the art. All such modifications and alterations should therefore be seen as within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
a qubit pair structure body including a plurality of qubit pairs,
the qubit pairs being arranged in m rows and n columns (m being an integer not less than 3, and n being an integer not less than 3),
the qubit pairs including
a first qubit pair at a 2kth row and a (2l−1)th column,
a second qubit pair at a (2k−1)th row and a 2lth column,
a first adjacent qubit pair at a (2k−1)th row and a (2l−1)th column,
a second adjacent qubit pair at a 2kth row and a (2l−2)th column,
a third adjacent qubit pair at a 2kth row and a 2lth column,
a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, the qubit pair structure body including
  a first spin chain between the first qubit pair and the first adjacent qubit pair,
  a second spin chain between the first qubit pair and the second adjacent qubit pair,
  a third spin chain between the first qubit pair and the third adjacent qubit pair,
  a fourth spin chain between the first qubit pair and the fourth adjacent qubit pair,
  a fifth spin chain between the second qubit pair and the fifth adjacent qubit pair,
  a sixth spin chain between the second qubit pair and the first adjacent qubit pair,
  a seventh spin chain between the second qubit pair and the sixth adjacent qubit pair, and
  an eighth spin chain between the second qubit pair and the third adjacent qubit pair, the first spin chain and the fifth spin chain including a first eigenenergy, the second spin chain and the sixth spin chain including a second eigenenergy, the third spin chain and the seventh spin chain including a third eigenenergy, the fourth spin chain and the eighth spin chain including a fourth eigenenergy, the first eigenenergy, the second eigenenergy, the third eigenenergy, and the fourth eigenenergy being different from each other, the first spin chain and the fifth spin chain not including the second, third, and fourth eigenenergies, the second spin chain and the sixth spin chain not including the first, third, and fourth eigenenergies, the third spin chain and the seventh spin chain not including the first, second, and fourth eigenenergies, the fourth spin chain and the eighth spin chain not including the first, second, and third eigenenergies.

2. The device according to claim 1, wherein a distance between the first qubit pair and the first adjacent qubit pair and a distance between the second qubit pair and the fifth adjacent qubit pair are a first distance, a distance between the first qubit pair and the second adjacent qubit pair and a distance between the second qubit pair and the first adjacent qubit pair are a second distance, a distance between the first qubit pair and the third adjacent qubit pair and a distance between the second qubit pair and the sixth adjacent qubit pair are a third distance, a distance between the first qubit pair and the fourth adjacent qubit pair and a distance between the second qubit pair and the third adjacent qubit pair are a fourth distance, and the first distance, the second distance, the third distance, and the fourth distance are different from each other.

3. An information processing device, comprising:

a qubit pair structure body including a plurality of qubit pairs, the qubit pairs being arranged in m rows and n columns (m being an integer not less than 3, and n being an integer not less than 3), the qubit pairs including
  a first qubit pair at a 2kth row and a (2l−1)th column,
  a second qubit pair at a (2k−1)th row and a 2lth column,
  a first adjacent qubit pair at a (2k−1)th row and a (2l−1)th column,
  a second adjacent qubit pair at a 2kth row and a (2l−2)th column,
  a third adjacent qubit pair at a 2kth row and 2lth column,
  a fourth adjacent qubit pair at a (2k+1)th row and a (2l−1)th column,
  a fifth adjacent qubit pair at a (2k−2)th row and a 2lth column, and
  a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, a distance between the first qubit pair and the first adjacent qubit pair and a distance between the second qubit pair and the fifth adjacent qubit pair being a first distance, a distance between the first qubit pair and the second adjacent qubit pair and a distance between the second qubit pair and the first adjacent qubit pair being a second distance, a distance between the first qubit pair and the third adjacent qubit pair and a distance between the second qubit pair and the sixth adjacent qubit pair being a third distance, a distance between the first qubit pair and the fourth adjacent qubit pair and a distance between the second qubit pair and the third adjacent qubit pair being a fourth distance, and the first distance, the second distance, the third distance, and the fourth distance being different from each other.

4. The device according to claim 1, wherein the first qubit pair includes a first structure body including at least one of a first element or a first isotope, the second qubit pair includes a second structure body including at least one of a second element or a second isotope, the first adjacent qubit pair, the second adjacent qubit pair, the third adjacent qubit pair, the fourth adjacent qubit pair, the fifth adjacent qubit pair, and the sixth adjacent qubit pair include a third structure body including at least one of a third element or a third isotope, the first structure body is different from the third structure body, the first structure body is different from the second structure body, and the second structure body is different from the third structure body.

5. An information processing device, comprising:

a qubit pair structure body including a plurality of qubit pairs, the qubit pairs being arranged in m rows and n columns (m being an integer not less than 3, and n being an integer not less than 3), the qubit pairs including
  a first qubit pair at a 2kth row and a (2l−1)th column,
  a second qubit pair at a (2k−1)th row and a 2lth column,
  a first adjacent qubit pair at a (2k−1)th row and a (2l−1)th column, a second adjacent qubit pair at a 2kth row and a (2l−2)th column, a third adjacent qubit pair at a 2kth row and a 2lth column, a fourth adjacent qubit pair at a (2k+1)th row and a (2l−1)th column, a fifth adjacent qubit pair at a (2k−2)th row and a 2lth column, and a sixth adjacent qubit pair at a (2k−1)th row and a (2l+1)th column, k being an integer not less than 1 and not more than a maximum integer not greater than m/2, l being an integer not less than 1 and not more than a maximum integer not greater than n/2, the first qubit pair including a first structure body that includes at least one of a first element or a first isotope, the second qubit pair including a second structure body that includes at least one of a second element or a second isotope, the first adjacent qubit pair, the second adjacent qubit pair, the third adjacent qubit pair, the fourth adjacent qubit pair, the fifth adjacent qubit pair, and the sixth adjacent qubit pair including a third structure body that includes at least one of a third element or a third isotope, the first structure body being different from the third structure body, the first structure body being different from the second structure body, the second structure body being different from the third structure body.

6. The device according to claim 1, wherein one of the qubit pairs includes one of a first pair, a second pair, a third pair, a fourth pair, or a fifth pair, the first pair includes an electron spin and a nuclear spin of a NV center of diamond, the second pair includes an electron spin of the NV center of the diamond and a nuclear spin of $^{13}C$, the third pair includes an electron spin and a nuclear spin of a NV center of SiC, the fourth pair includes an electron spin of the NV center of the SiC and a nuclear spin of $^{13}C$, and the fifth pair includes an electron spin of $VV^0$ of the SiC and a nuclear spin of $^{13}C$.

7. The device according to claim 1, further comprising:

a plurality of first conductive members extending along a first direction, the first conductive members being arranged along a first cross direction crossing the first direction; and a plurality of second conductive members extending along a second direction, the second direction crossing the first direction and being along a plane including the first direction and the first cross direction, the second conductive members being arranged along a second cross direction, the second cross direction crossing the second direction and being along the plane, the plurality of qubit pairs being arranged along the plane, one of the plurality of qubit pairs overlapping a first region and a second region in a third direction, the third direction crossing the plane, the first region being between one of the first conductive members and an other one of the first conductive members, the other one of the first conductive members being adjacent to the one of the first conductive members, the second region being between one of the second conductive members and an other one of the second conductive members, the other one of the second conductive members being adjacent to the one of the second conductive members.

8. The device according to claim 7, further comprising:

a circuit part, the circuit part being configured to supply a first current of a first orientation to the one of the first conductive members, the circuit part being configured to supply a second current of a second orientation to the other one of the first conductive members, the second orientation being opposite to the first orientation, the circuit part being configured to supply a third current of a third orientation to the one of the second conductive members, the circuit part being configured to supply a fourth current of a fourth orientation to the other one of the second conductive members, the fourth orientation being opposite to the third orientation.

9. The device according to claim 1, further comprising:

an electromagnetic wave irradiation part configured to irradiate an electromagnetic wave on the qubit pairs, the qubit pair structure body including
a plurality of electrodes, and
a light detecting part, the electrodes being configured to individually apply an electric field to the qubit pairs, the light detecting part being configured to detect light emitted by the qubit pairs.

10. The device according to claim 9, wherein the electromagnetic wave irradiation part is configured to perform at least a first operation of irradiating a first electromagnetic wave on the qubit pairs, and a second operation of irradiating a second electromagnetic wave on the qubit pairs, one of the qubit pairs including two physical systems, one of the two physical systems including a first quantum state, a second quantum state, and a third quantum state, a transition between the first quantum state and the second quantum state resonating with the first electromagnetic wave, a transition between the second quantum state and the third quantum state resonating with the second electromagnetic wave.

11. The device according to claim 1, wherein one of the qubit pairs includes two physical systems, one of the two physical systems includes a first quantum state, a second quantum state, and a third quantum state, and a transition between the second quantum state and the third quantum state is changed by the electric field applied by the electrodes.

12. The device according to claim 10, wherein the first quantum state and the second quantum state can correspond to a qubit.

13. The device according to claim 1, wherein one of the qubit pairs includes two physical systems, one of the two physical systems includes two or more quantum states, and the two or more quantum states can correspond to a qubit.

* * * * *